(12) United States Patent
Kurani et al.

(10) Patent No.: US 11,702,280 B2
(45) Date of Patent: Jul. 18, 2023

(54) SMART WASTE BIN SENSOR DEVICE AND METHODS FOR WASTE MANAGEMENT SYSTEM

(71) Applicants: Hemal B. Kurani, Sunnyvale, CA (US); Hetal B. Kurani, Sunnyvale, CA (US)

(72) Inventors: Hemal B. Kurani, Sunnyvale, CA (US); Hetal B. Kurani, Sunnyvale, CA (US)

( * ) Notice: Subject to any disclaimer, the term of this patent is extended or adjusted under 35 U.S.C. 154(b) by 128 days.

(21) Appl. No.: 17/106,166

(22) Filed: Nov. 29, 2020

(65) Prior Publication Data

US 2021/0188541 A1    Jun. 24, 2021

Related U.S. Application Data

(63) Continuation-in-part of application No. 16/124,189, filed on Sep. 7, 2018, now abandoned.

(51) Int. Cl.
*B65F 1/14* (2006.01)
*B09B 3/00* (2022.01)

(52) U.S. Cl.
CPC .............. *B65F 1/14* (2013.01); *B09B 3/0075* (2013.01); *B65F 2210/128* (2013.01); *B65F 2210/1443* (2013.01); *B65F 2210/152* (2013.01); *B65F 2210/168* (2013.01); *B65F 2210/17* (2013.01);
(Continued)

(58) Field of Classification Search
CPC ...... G06Q 10/30; G06Q 10/00; G01C 21/005; G01C 21/00; G01F 23/0007; G01F 23/00; G01J 1/4204; G01J 1/42; G01J 1/00; G01K 1/026; G01K 1/02; G01K 1/00; G01N 33/00; G01P 13/00; G01W 1/02; G01W 1/00; B65F 1/14; B65F 2210/128; B65F 2210/1443; B65F 2210/152; B65F 2210/168; B65F 2210/17; B65F 2210/184; B65F 2210/20; B09B 3/0075
See application file for complete search history.

(56) References Cited

U.S. PATENT DOCUMENTS 7,470,060 B1 *  12/2008  Hoben ................... G01F 23/14
                                                          73/714
2002/0086430 A1 *  7/2002  Hopmeier .............. G01N 33/02
                                                          435/5
(Continued)

*Primary Examiner* — Namrata Boveja
*Assistant Examiner* — Divesh Patel

(57) ABSTRACT

A waste management system comprises a waste bin storing waste, wherein the waste bin comprises a smart waste bin sensor device installed on the waste bin of a waste bin owner. The smart waste bin sensor device comprises a set of sensors that sends and receives signals through a wireless network to a cloud server. The set of sensors implements, operates, detects, measures, and monitors environmental conditions inside or outside the waste bin. A waste and litter sensor detects, measures, and monitors a waste type, a waste volume, a litter type, a litter level, a biohazardous waste type, and a biohazardous waste level. A pathogen biosensor detects, measures, and monitors a pathogen type and a biosafety level. The pathogen biosensor comprises a sterilizer to kill pathogens. A waste bin mobile application and a waste collection facility application functionality enable a user to monitor waste in the waste bin.

10 Claims, 65 Drawing Sheets

(52) U.S. Cl.
CPC ..... *B65F 2210/184* (2013.01); *B65F 2210/20* (2013.01)

(56) References Cited

U.S. PATENT DOCUMENTS

| | | | |
|---|---|---|---|
| 2014/0127742 A1* | 5/2014 | Field | G01N 29/032 73/64.53 |
| 2015/0298903 A1* | 10/2015 | Luxford | G06Q 10/06 340/870.16 |
| 2015/0307273 A1* | 10/2015 | Lyman | G06Q 30/0623 705/26.61 |
| 2015/0323366 A1* | 11/2015 | Kekalainen | G01D 11/30 702/188 |
| 2016/0179065 A1* | 6/2016 | Shahabdeen | H04L 67/12 700/275 |
| 2016/0300297 A1* | 10/2016 | Kekalainen | B65F 1/1484 |
| 2020/0068368 A1* | 2/2020 | Kruse | H04L 41/0806 |

* cited by examiner

Perspective view of a smart waste bin sensor device 300

Front elevation view of a smart waste bin sensor device 410
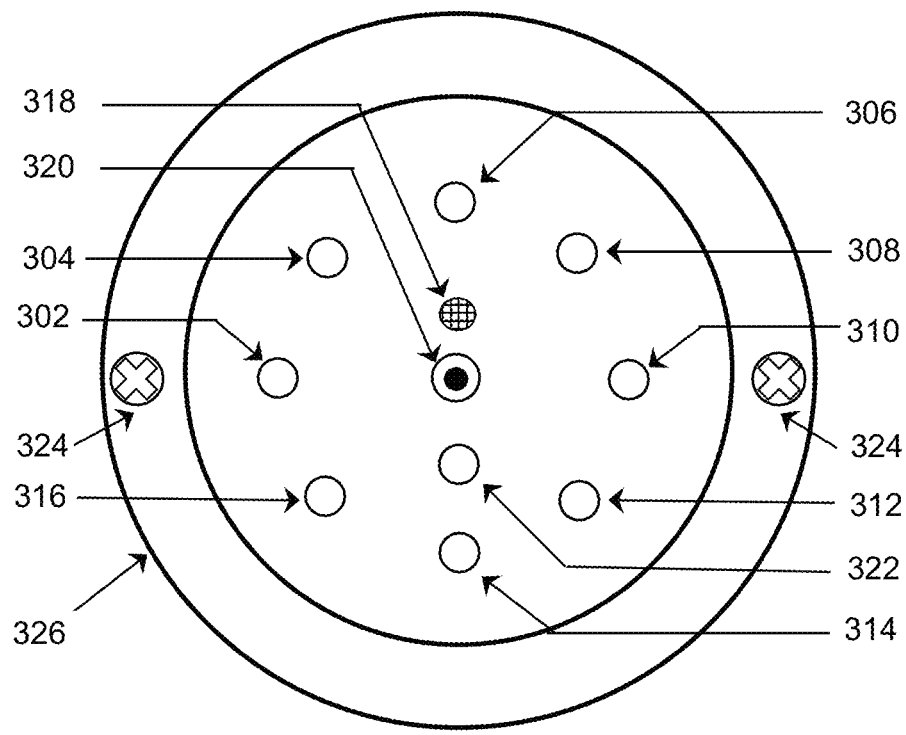
Rear elevation view of a smart waste bin sensor device 450
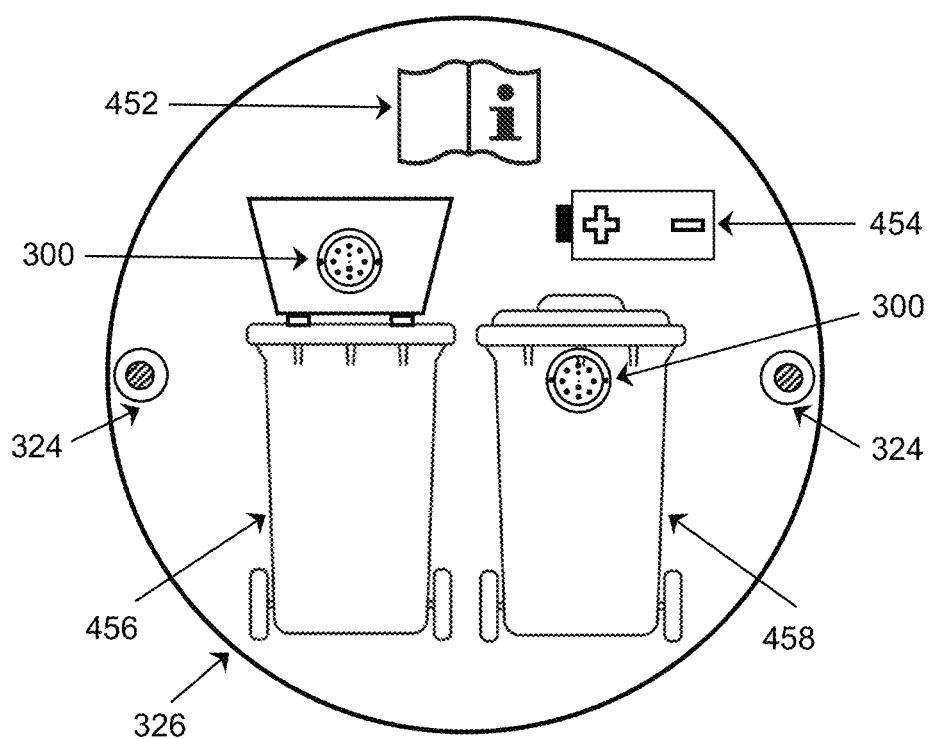
FIG. 4

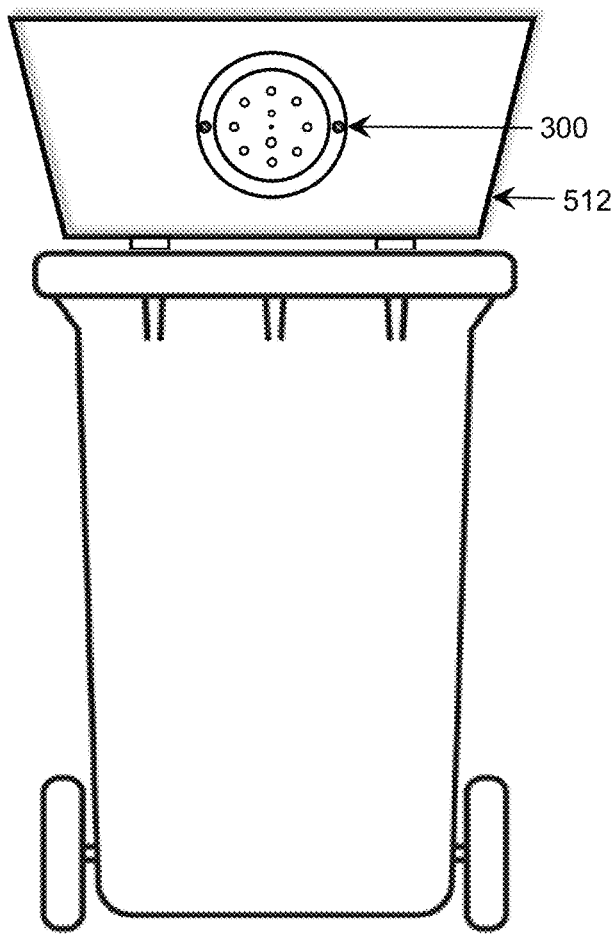
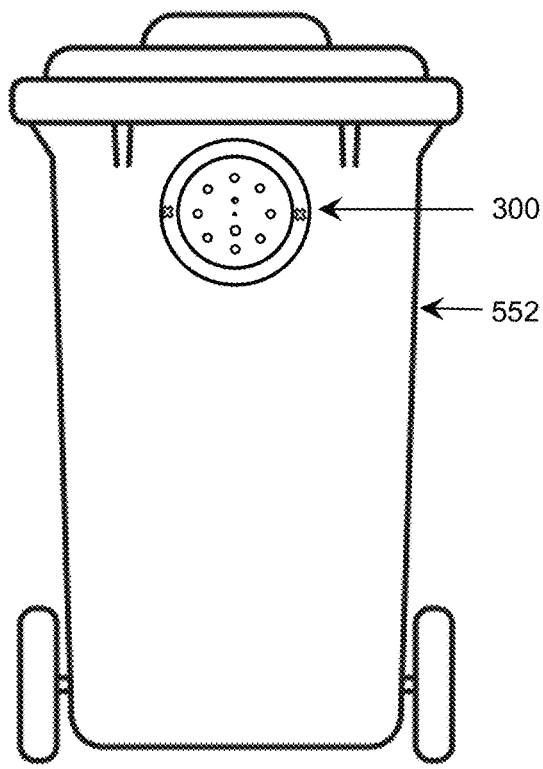
FIG. 5

General purpose input output pinout function description table 1100

| Voltage 1102 <br> ▨ GND <br> ■ Power | Three 5V pins and Three 3V3 pins are present on the single board microcomputer, and there are eight ground pins (0V), which are unconfigurable. The remaining pins are all general purpose 3V3 pins, meaning outputs are set to 3V3 and inputs are 3V3 tolerant. <br> Almost all integrated circuits (ICs) sensors have at least two pins that connect to the power rails of the circuit in which they are installed. These are known as the power-supply pins <br> A sensor component power supply pin Vcc = Collector supply voltage and $V_{DD}$ = Drain supply is connected to single board microcomputer GPIO 5V or 3V pin as per the specification. The other power-supply pin is referred to as ground (abbreviated "GND"). |
|---|---|
| Inputs 1104 <br> I  GPIO | A GPIO pin designated as an input pin can be read as high (3V3) or low (0V). This is done with the use of internal pull-up or pull-down resistors. Pins GPIO3 and GPIO5 have fixed pull-up resistors, but for other pins this can be configured in software. GPIO pin is assigned as an input pin through SBM software settings. |
| Outputs 1106 <br> O  GPIO | A GPIO pin designated as an output pin can be set to high (3V3) or low (0V). GPIO pin is assigned as an output pin through SBM software settings. |
| Alternative functions | GPIO pins can be used with a variety of alternative functions, some are available on all pins, others on specific pins as follows: |
| ⊓⊔⊓⊔ | Pulse-Width Modulation (PWM) 1108 <br> Software PWM available on all pins. <br> Hardware PWM available on GPIO 32, GPIO 33, GPIO 12, GPIO 35. |
| Master  Slave <br> SCK <br> MOSI <br> MISO | Serial Peripheral Interface (SPI) 1110 <br> SPI0: MOSI (GPIO 19); MISO (GPIO 21); SCLK (GPIO 23); CE0 (GPIO 24), CE1 (GPIO 26) <br> SPI1: MOSI (GPIO 38); MISO (GPIO 35); SCLK (GPIO 40); CE0 (GPIO 12); CE1 (GPIO 11); CE2 (GPIO 36). <br> MOSI – Master Out Slave In, MISO – Master In Slave Out, SCLK - Serial CLocK Signal, CE- Chip Enable |
| Master  Slave <br> SDA <br> SCL | Inter-Integrated Circuit (I2C) 1112 <br> SDA Data (Serial Data): (GPIO 3); SCL Clock (GPIO 5) <br> EEPROM Data: (GPIO 27); EEPROM Clock (GPIO 28) <br> EEPROM - Electrically Erasable Programmable Read-Only Memory |
| TX — RX <br> RX — TX | Serial Interface 1114 <br> TX (GPIO 8); RX (GPIO 10) <br> TX – Transmit and RX - Receive |

FIG. 11

RFID tag sensor pinout 1210

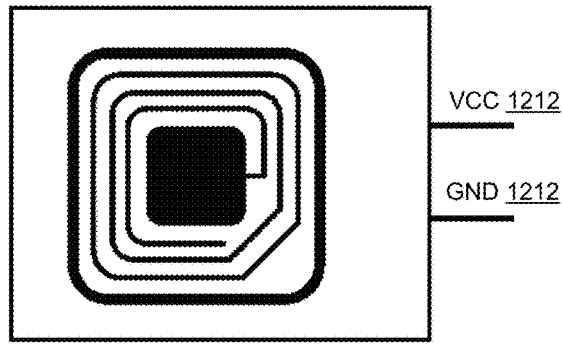

VCC 1212

GND 1212

RFID tag sensor wiring table 1250

| RFID tag sensor pinout | RFID tag sensor pin function | Steps to wire a RFID tag sensor pin to the SBM GPIO pin |
|---|---|---|
| Vcc 1212 | Vcc 1212 pin is used as positive power supply. | Connect RFID tag sensor Vcc 1212 pin to the assigned SBM GPIO pinout 850 5V power pin. |
| GND 1214 | GND 1214 pin is used as negative power ground. | Connect RFID tag sensor GND 1214 pin to the assigned SBM GPIO pinout 850 GND pin. |

FIG. 12

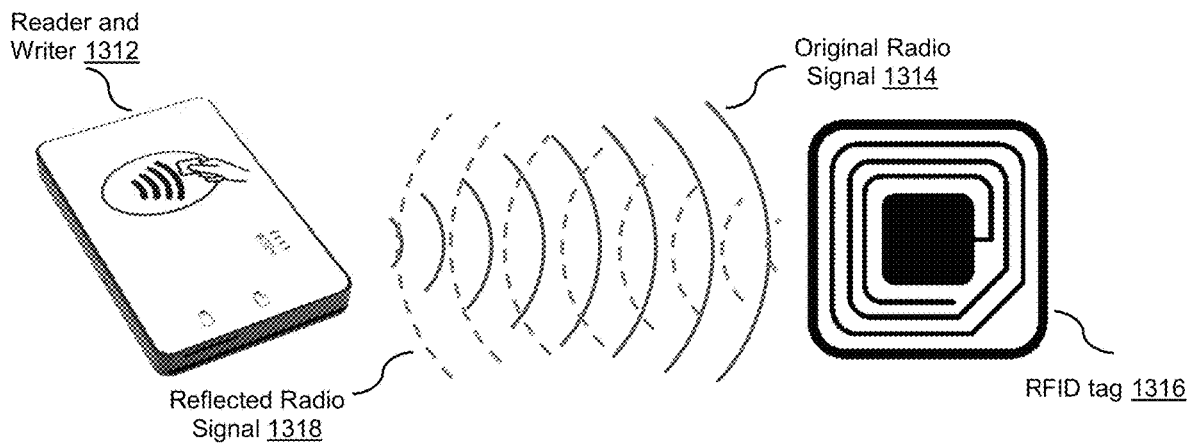
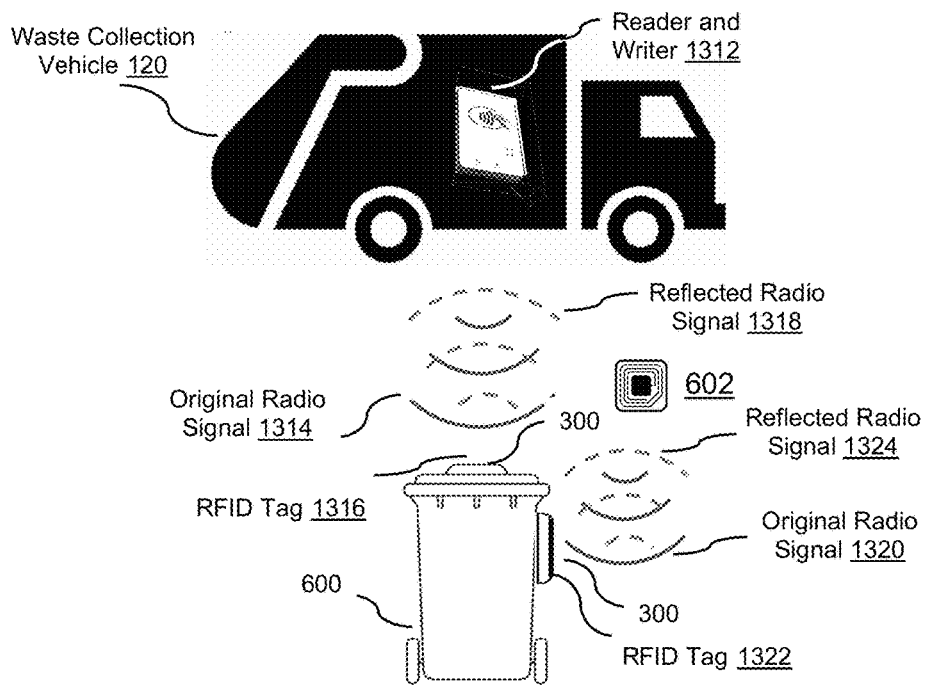
FIG. 13

Location sensor pinout 1410

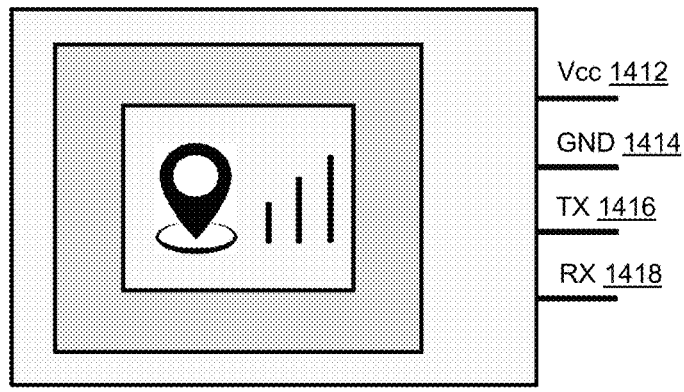

Vcc 1412
GND 1414
TX 1416
RX 1418

Location sensor wiring table 1450

| Location sensor pinout | Location sensor pin function | Steps to wire a location sensor pin to the SBM GPIO pin |
|---|---|---|
| Vcc 1412 | Vcc 1412 pin is used as positive power supply. | Connect location sensor Vcc 1412 pin to the assigned SBM GPIO pinout 850 5V power pin. |
| GND 1414 | GND 1414 pin is used as negative power ground. | Connect location sensor GND 1414 pin to the assigned SBM GPIO pinout 850 GND pin. |
| TX 1416 | TX 1416 pin transmits data from the location sensor to single board microcomputer. | Connect location sensor TX 1416 pin to the assigned SBM GPIO pinout 850 RXD pin. |
| RX 1418 | RX 1418 pin is used to configure and send data to the location sensor from single board microcomputer. | Connect location sensor RX 1418 pin to the assigned SBM GPIO pinout 850 TXD pin. |

FIG. 14

Location sensor
GPS operating principle diagram 1510
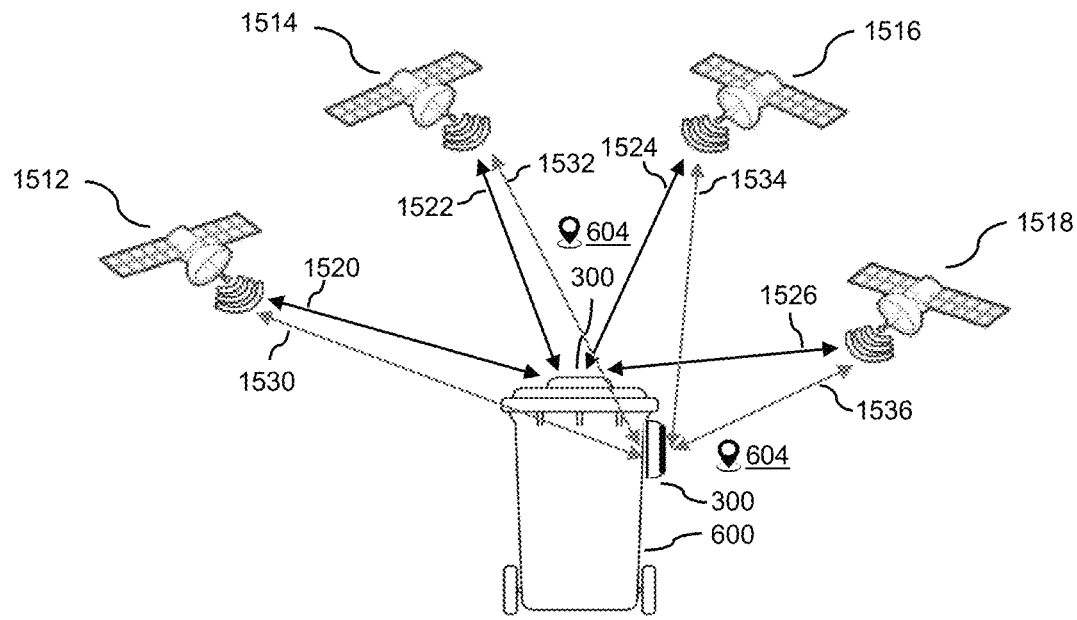
Location sensor
cellular network operating principle diagram 1550
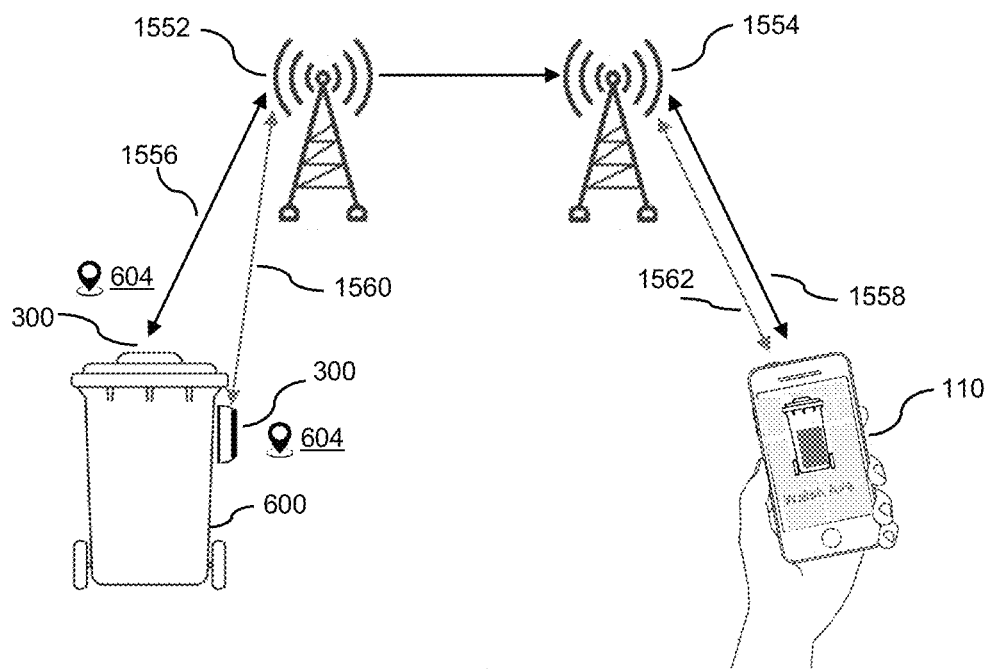
FIG. 15

Fill level sensor pinout 1610

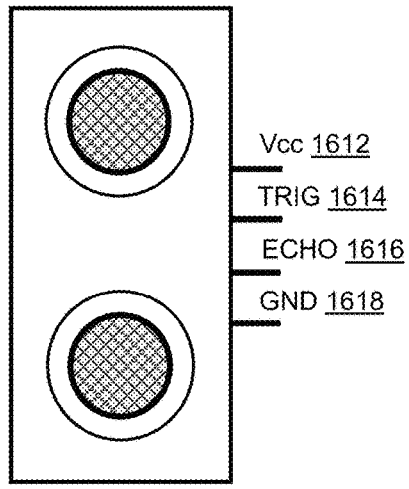

Vcc 1612
TRIG 1614
ECHO 1616
GND 1618

Fill level sensor wiring table 1650

| Fill level sensor pinout | Fill level sensor pin function | Steps to wire a fill level sensor pin to the SBM GPIO pin |
|---|---|---|
| Vcc 1612 | Vcc 1612 pin is used as positive power supply. | Connect fill level sensor Vcc 1612 pin to the assigned SBM GPIO pinout 850 5V power pin. |
| TRIG 1614 | TRIG 1614 pin is used to trigger the signal pulses such as ultrasonic sound or infrared light. | Connect fill level sensor TRIG 1614 pin to the assigned SBM GPIO pinout 850 output pin. |
| ECHO 1616 | ECHO 1616 pin produces a pulse when the reflected signal is received. | Connect fill level sensor ECHO 1616 pin to the assigned SBM GPIO pinout 850 input pin. |
| GND 1618 | GND 1618 pin is used as negative power ground. | Connect fill level sensor GND 1618 pin to the assigned SBM GPIO pinout 850 GND pin. |

FIG. 16

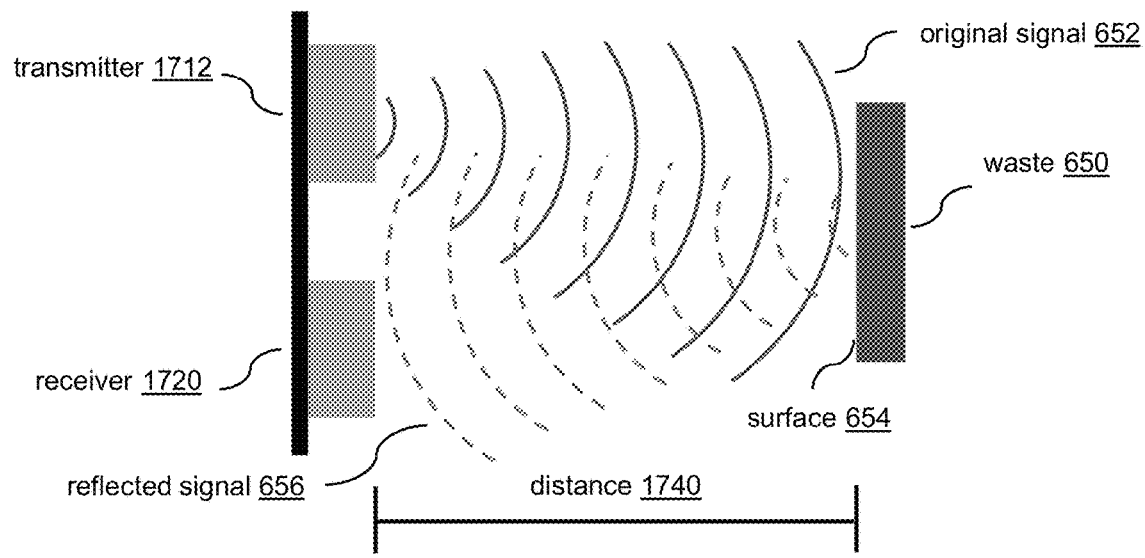
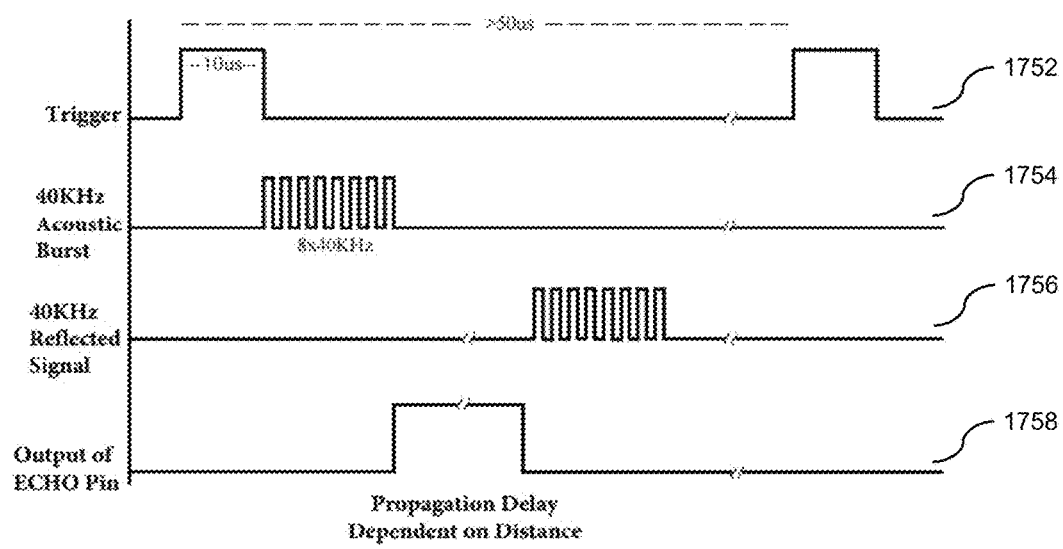
FIG. 17

Temperature, humidity, and pressure sensor pinout 1910

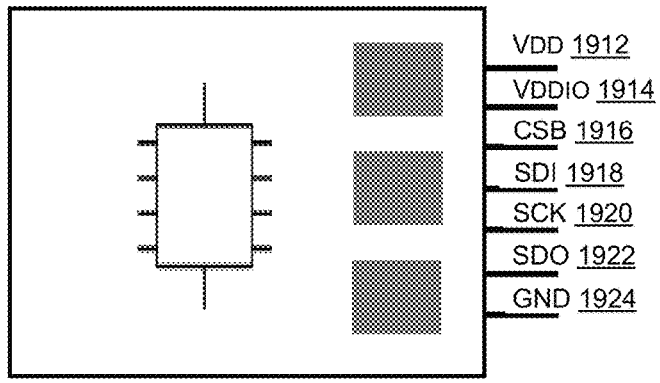

VDD 1912
VDDIO 1914
CSB 1916
SDI 1918
SCK 1920
SDO 1922
GND 1924

Temperature, humidity, and pressure sensor wiring table 1950

| Temperature, humidity, and pressure sensor pinout | Temperature, humidity, and pressure sensor pin function | Steps to wire a temperature, humidity, and pressure sensor pin to the SBM GPIO pin |
|---|---|---|
| VDD 1912 | VDD 1912 pin is used as main positive power supply for all internal analog and digital functional blocks. | Connect temperature, humidity, and pressure sensor VDD 1912 pin to the assigned SBM GPIO pinout 850 5V power pin. |
| VDDIO 1914 | VDDIO 1914 pin is a separate power supply pin used for the supply of the digital interface. | Connect temperature, humidity, and pressure sensor VDDIO 1914 pin to the assigned SBM GPIO pinout 850 3V power pin |
| CSB 1916 | CSB 1916 pin is used for chip select. To be set high for the device to be used in I2C serial protocol. | Connect temperature, humidity, and pressure sensor CSB 1916 pin to the assigned SBM GPIO pinout 850 pin. |
| SDI 1918 | SDI 1918 pin is used for serial data input. | Connect temperature, humidity, and pressure sensor SDI 1918 pin to the assigned SBM GPIO pinout 850 MOSI pin. |
| SCK 1920 | SCK 1920 pin is used for serial clock. | Connect Temperature, Humidity, and Pressure sensor SCK 1920 pin to the assigned SBM GPIO pinout 850 SCLK pin. |
| SDO 1922 | SDO 1922 pin is used for serial data output. | Connect temperature, humidity, and pressure sensor SDO 1922 pin to the assigned SBM GPIO pinout 850 MISO pin. |
| GND 1924 | GND 1924 pin is used as negative power ground. | Connect temperature, humidity, and pressure sensor GND 1924 pin to the assigned SBM GPIO 850 GND pin. |

FIG. 19

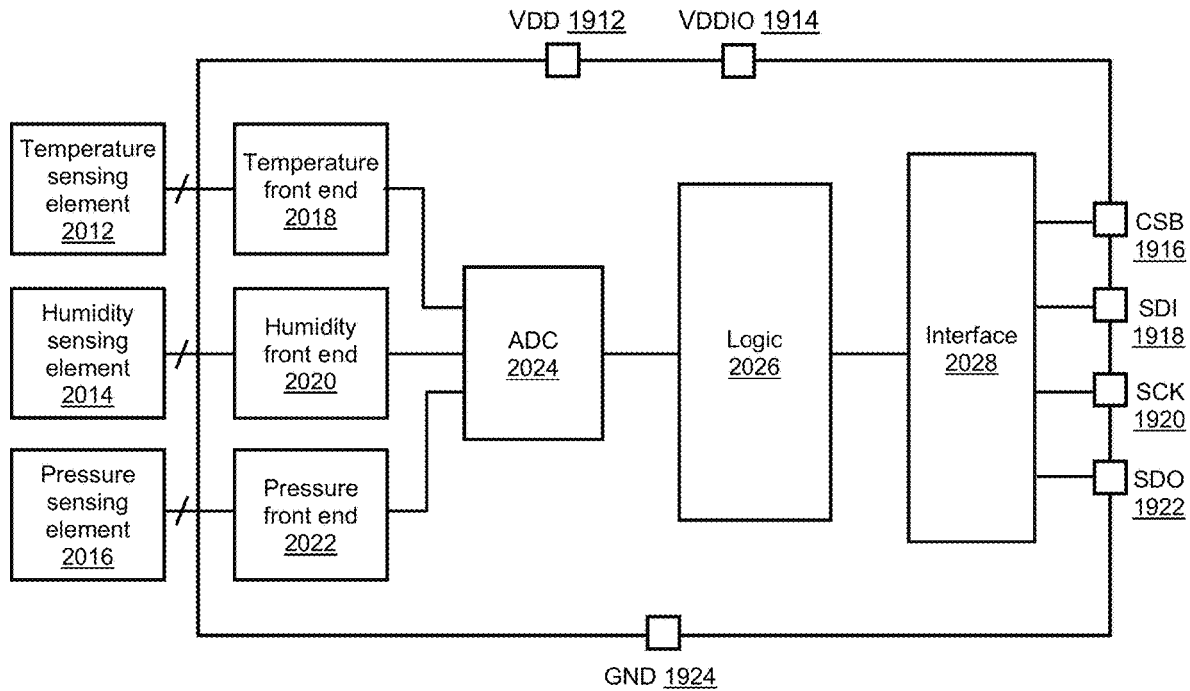
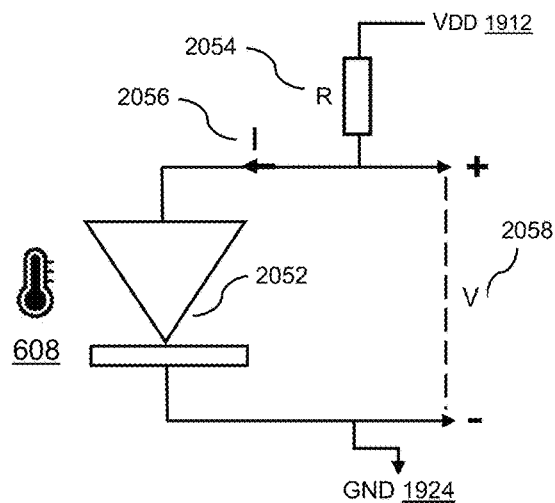
FIG. 20

Humidity sensor working principle diagram 2110
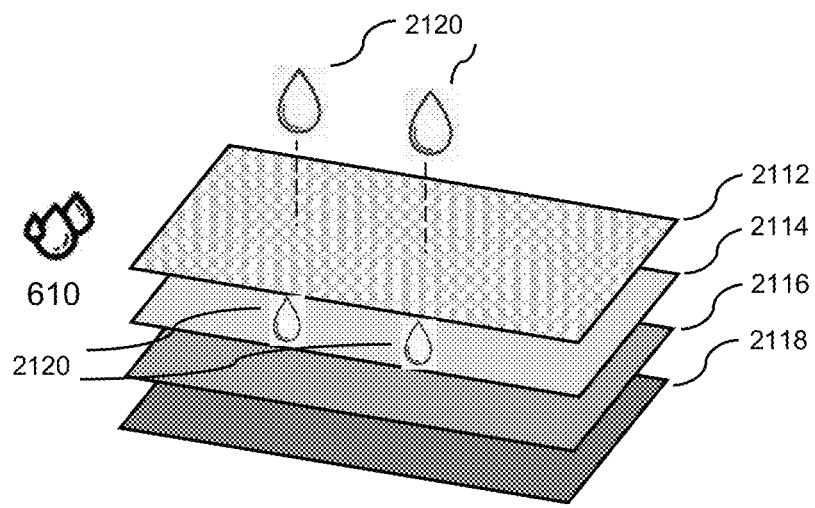
Pressure sensor working principle diagram 2150
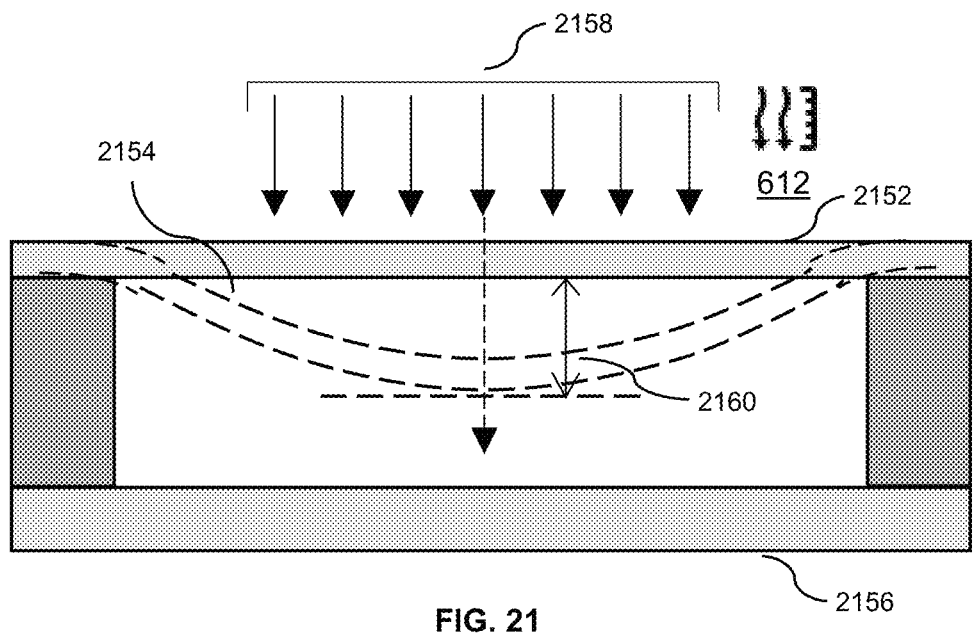
FIG. 21

Air quality sensor pinout 2310

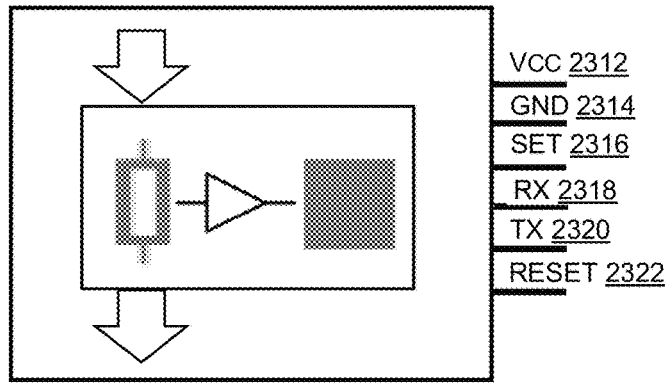

VCC 2312
GND 2314
SET 2316
RX 2318
TX 2320
RESET 2322

Air quality sensor wiring table 2350

| Air quality sensor pinout | Air quality sensor pin function | Steps to wire an air quality sensor pin to the SBM GPIO pin |
|---|---|---|
| Vcc 2312 | Vcc 2312 pin is used as positive power supply. | Connect air quality sensor Vcc 2312 pin to the assigned SBM GPIO pinout 850 5V power pin. |
| GND 2314 | GND 2314 pin is used as negative power ground. | Connect air quality sensor GND 2314 pin to the assigned SBM GPIO pinout 850 GND pin. |
| SET 2316 | SET 2316 pin is used as high level 3V3 or suspending normal working status, while low level is sleeping mode. | Connect air quality sensor SET 2316 pin to the assigned SBM GPIO pinout 850 pin. |
| RX 2318 | RX 2318 pin is used to configure and send data to the air quality control from single board microcomputer. | Connect air quality sensor RX 2318 pin to the assigned SBM GPIO pinout 850 TXD pin. |
| TX 2320 | TX 2320 pin transmits data from the air quality control sensor to single board microcomputer. | Connect air quality sensor TX 2320 pin to the assigned SBM GPIO pinout 850 RXD pin. |
| RESET 2322 | RESET 2322 pin is used to reset air quality sensor. Reset signal 3V3. | Connect air quality sensor RESET 2322 pin to the assigned SBM GPIO pinout 850 pin. |

FIG. 23

Air quality sensor working principle block diagram 2410

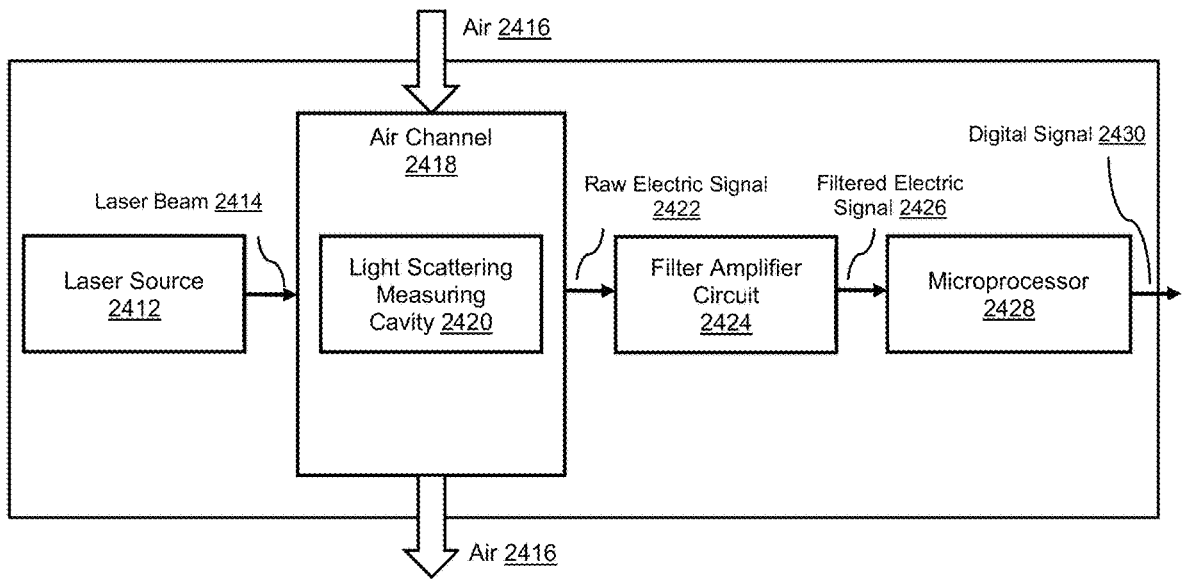

Air quality index level of concern table 2450

| AQI Color | Levels of Concern | Values of Index | Description of Air Quality |
|---|---|---|---|
| Green | Good | 0 to 50 | Air quality is satisfactory, and air pollution poses little or no risk. |
| Yellow | Moderate | 51 to 100 | Air quality is acceptable. However, there may be a risk for some people, particularly those who are unusually sensitive to air pollution. Some might require personal protective equipment (PPE) while handling waste. |
| Orange | Unhealthy for Sensitive Groups | 101 to 150 | Members of sensitive groups may experience health effects. The public is less likely to be affected. Sensitive groups may require PPE while handling waste. |
| Red | Unhealthy | 151 to 200 | Some members of the public may experience health effects; members of sensitive groups may experience more serious health effects. Wear PPE while handling waste. |
| Purple | Very Unhealthy | 201 to 300 | Health alert: The risk of health effects is increased for everyone. Wear PPE while handling waste. |
| Maroon | Hazardous | 301 and higher | Health warning of emergency conditions: everyone is more likely to be affected. Wear PPE while handling waste. |

FIG. 24

Air quality sensor operating principle diagram 2500

Smoke sensor pinout 2610

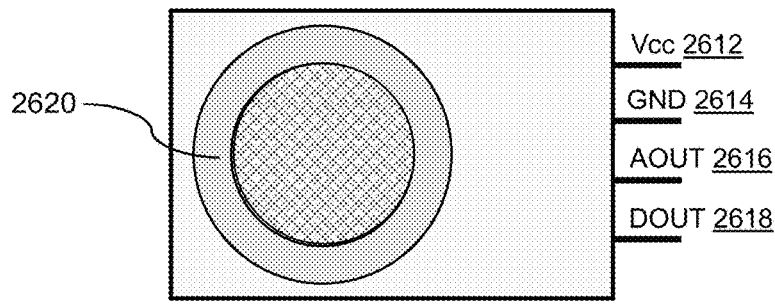

Smoke sensor wiring table 2650

| Smoke sensor pinout | Smoke sensor pin function | Steps to wire a smoke sensor pin to the SBM GPIO pin |
|---|---|---|
| Vcc 2612 | Vcc 2612 pin is used as positive power supply. | Connect smoke sensor Vcc 2612 pin to the assigned SBM GPIO pinout 850 5V power pin. |
| GND 2614 | GND 2614 pin is used as negative power ground. | Connect smoke sensor GND 2614 pin to the assigned SBM GPIO pinout 850 GND pin. |
| AOUT 2616 | AOUT 2616 pin is used as analog output. It outputs 0 to 5V variable analog voltage based on the concentration of the smoke near the smoke sensor. | Connect smoke sensor AOUT 2616 to the assigned SBM GPIO pinout 850 analog output pin. |
| DOUT 2618 | DOUT 2618 pin is used as digital output. To detect presence or absence of smoke near the smoke sensor. | Connect smoke sensor DOUT 2618 pin to the assigned SBM GPIO pinout 850 digital output pin. |

FIG. 26

Smoke sensor sensing element internal structure diagram 2710
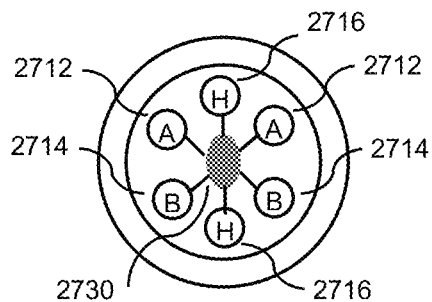
Smoke sensing element schematic circuit 2720
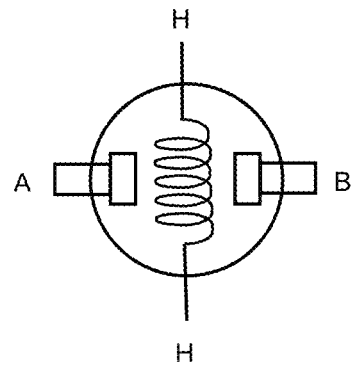
Smoke sensing element cross section view 2730
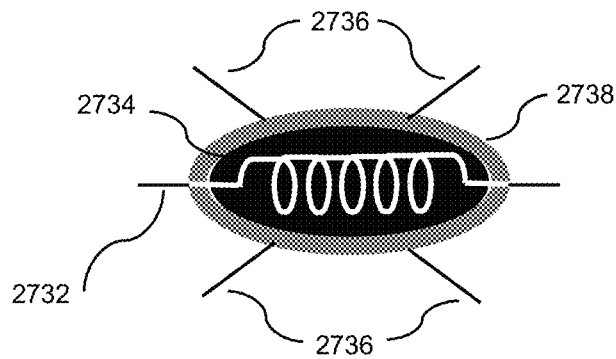
Smoke sensor circuit diagram 2750
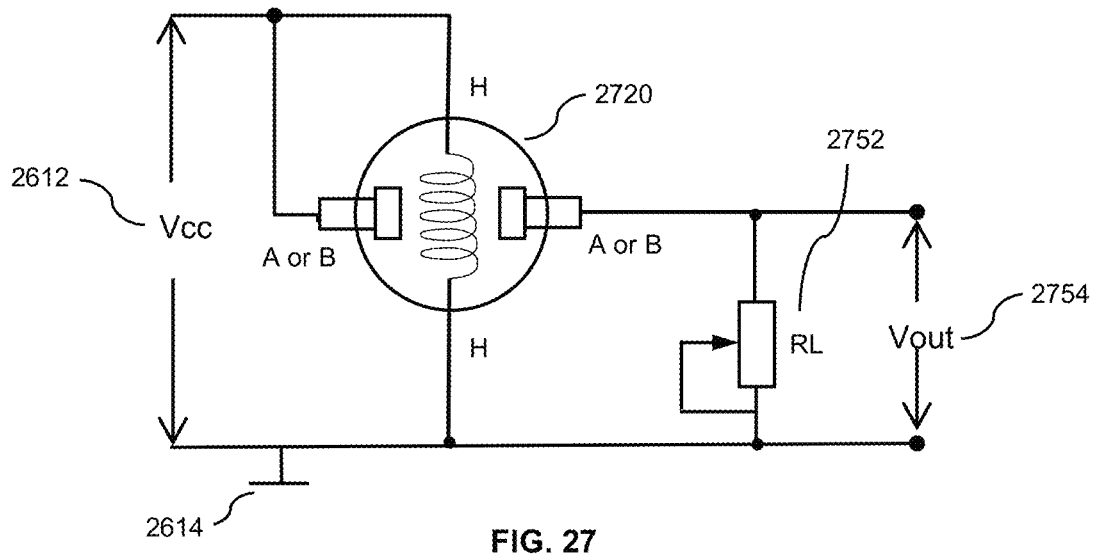
FIG. 27

PPM – Parts-per-million is the ratio of one gas to another
Ro – Resistance of the sensor in clean air
Rs – Resistance of the sensor exposed to gases
Rs/Ro – Resistance ratio of the sensor concentration of gas

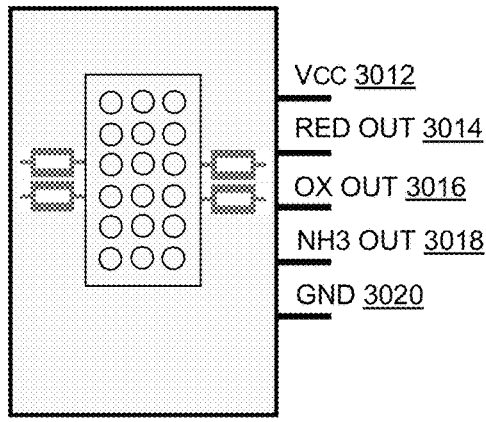

Gas sensor pinout 3010

Gas sensor wiring table 3050

| Gas sensor pinout | Gas sensor pin function | Steps to wire a gas sensor pin to the SBM GPIO pin |
|---|---|---|
| VCC 3012 | VCC 3012 pin is used as positive power supply. | Connect gas sensor VCC 3012 pin to the assigned SBM GPIO pinout 850 5V power pin. |
| RED OUT 3014 | RED OUT 3014 pin is used as output pin for reducing gas. | Connect gas sensor RED OUT 3014 pin to the assigned SBM GPIO pinout 850 pin. |
| OX OUT 3016 | OX OUT 3016 pin is used as output pin for oxidizing gas. | Connect gas sensor OX OUT 3016 pin to the assigned SBM GPIO pinout 850 pin. |
| NH3 OUT 3018 | NH3 OUT 3018 pin is used as output pin for ammonia gas. | Connect gas sensor NH3 OUT 3018 pin to the assigned SBM GPIO pinout 850 pin. |
| GND 3020 | GND 3020 pin is used as negative power ground. | Connect gas sensor GND 3020 pin to the assigned SBM GPIO pinout 850 GND pin. |

FIG. 30

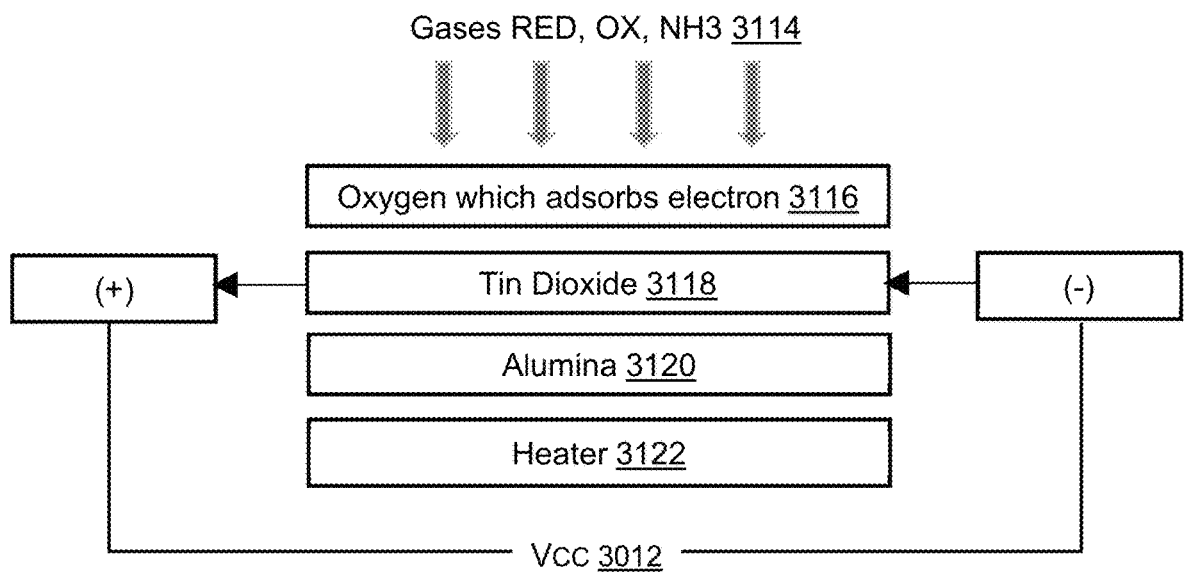
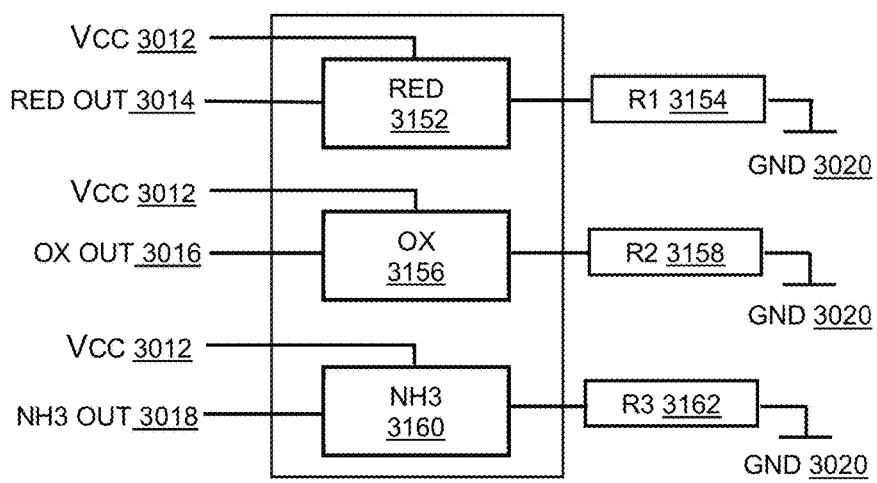
FIG. 31

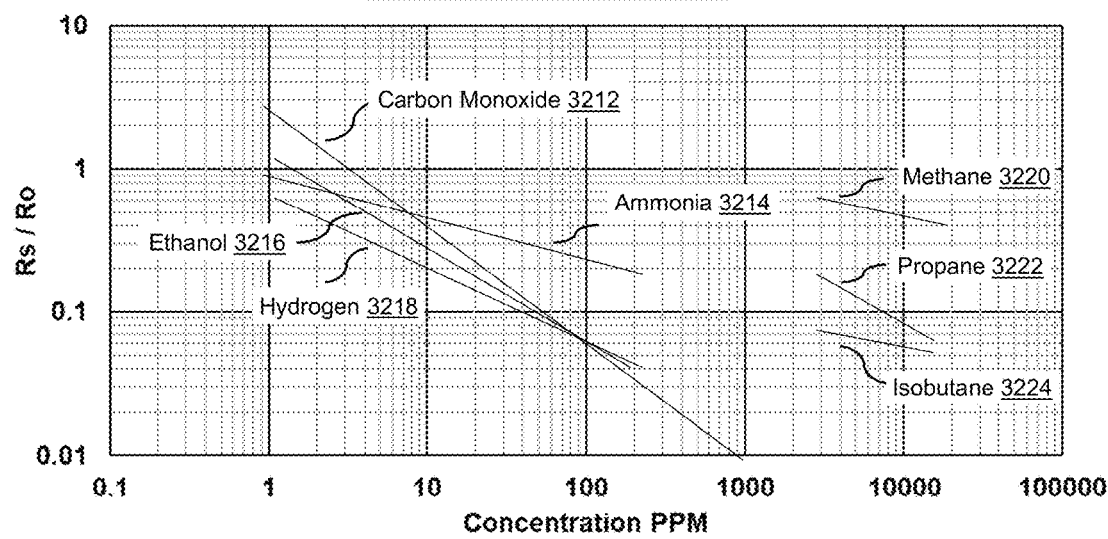
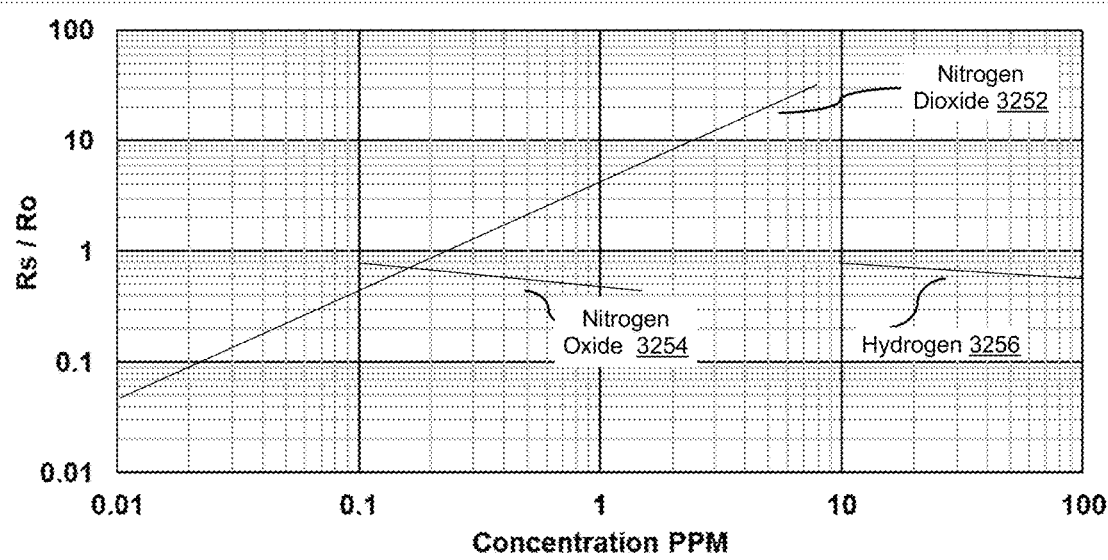
FIG. 32

PPM – Parts-per-million is the ratio of one gas to another
Ro – Resistance of the sensor in clean air
Rs – Resistance of the sensor exposed to gases
Rs/Ro – Resistance ratio of the sensor concentration of gas Ambient light sensor pinout 3510

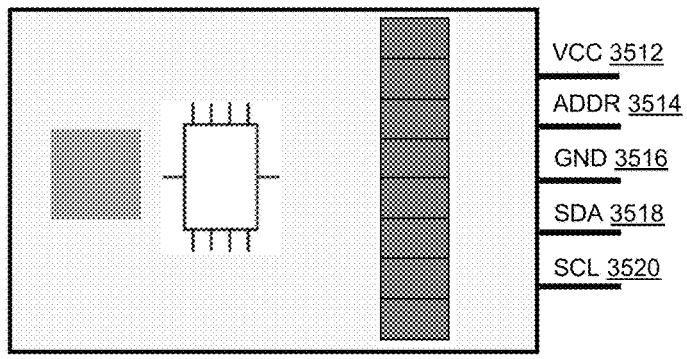

VCC 3512
ADDR 3514
GND 3516
SDA 3518
SCL 3520

Ambient light sensor wiring table 3550

| Ambient light sensor pinout | Ambient light sensor pin function | Steps to wire an ambient light sensor pin to the SBM GPIO pin |
|---|---|---|
| Vcc 3512 | Vcc 3512 pin is used as positive power supply. | Connect ambient light sensor Vcc 3512 pin to the assigned SBM GPIO pinout 850 3V power pin. |
| ADDR 3514 | ADDR 3514 pin is not connected. Pin is I2C slave address terminal. ADDR terminal is designed for internal test. | Not connected. |
| GND 3516 | GND 3516 pin is used as negative power ground. | Connect ambient light sensor GND 3516 pin to the assigned SBM GPIO pinout 850 GND pin. |
| SDA 3518 | SDA 3518 pin is for I2C bus interface Serial Data Terminal. | Connect ambient light sensor SDA 3518 pin to the assigned SBM GPIO pinout 850 SDA pin. |
| SCL 3520 | SCL 3520 pin is for I2C bus interface Serial Clock Terminal. | Connect ambient light sensor SCL 3520 pin to the assigned SBM GPIO pinout 850 SCL pin. |

FIG. 35

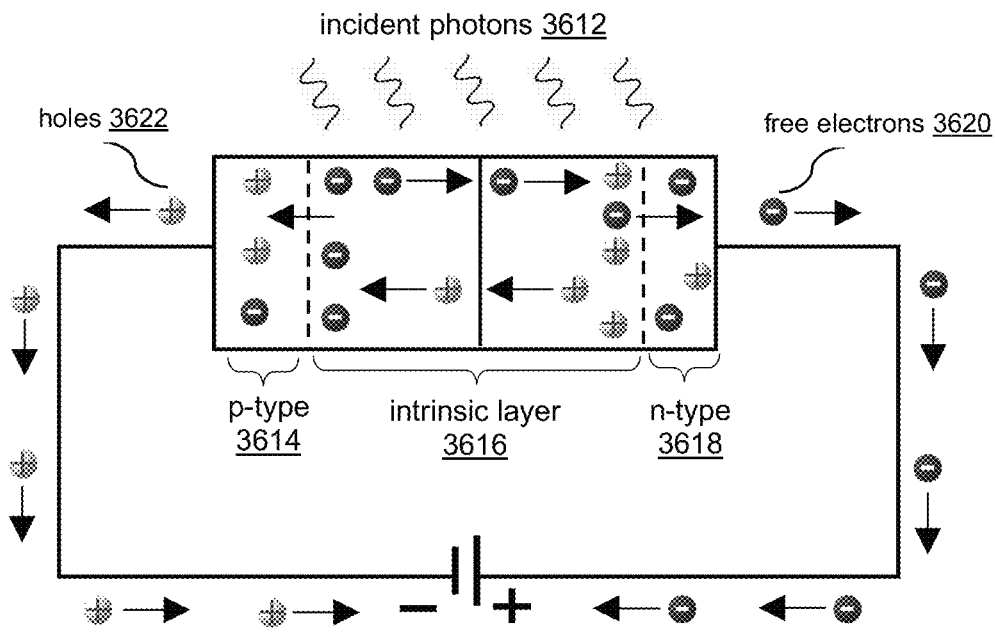
Ambient light sensor working principle diagram 3610
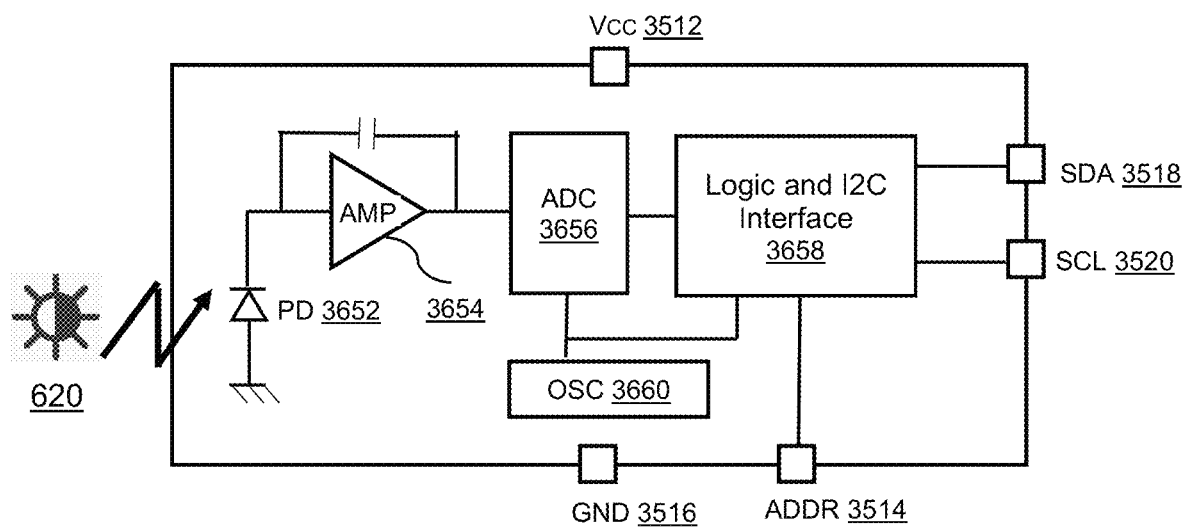
Ambient light sensor circuit block diagram 3650
FIG. 36

Ambient light sensor operating principle diagram 3700
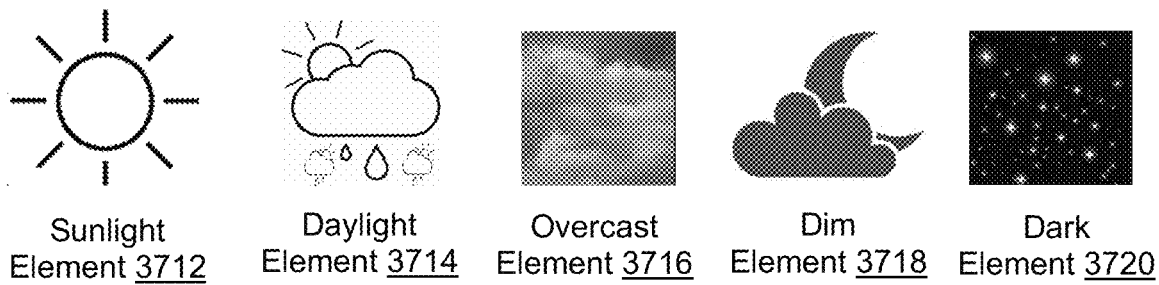
Sunlight Element 3712  Daylight Element 3714  Overcast Element 3716  Dim Element 3718  Dark Element 3720
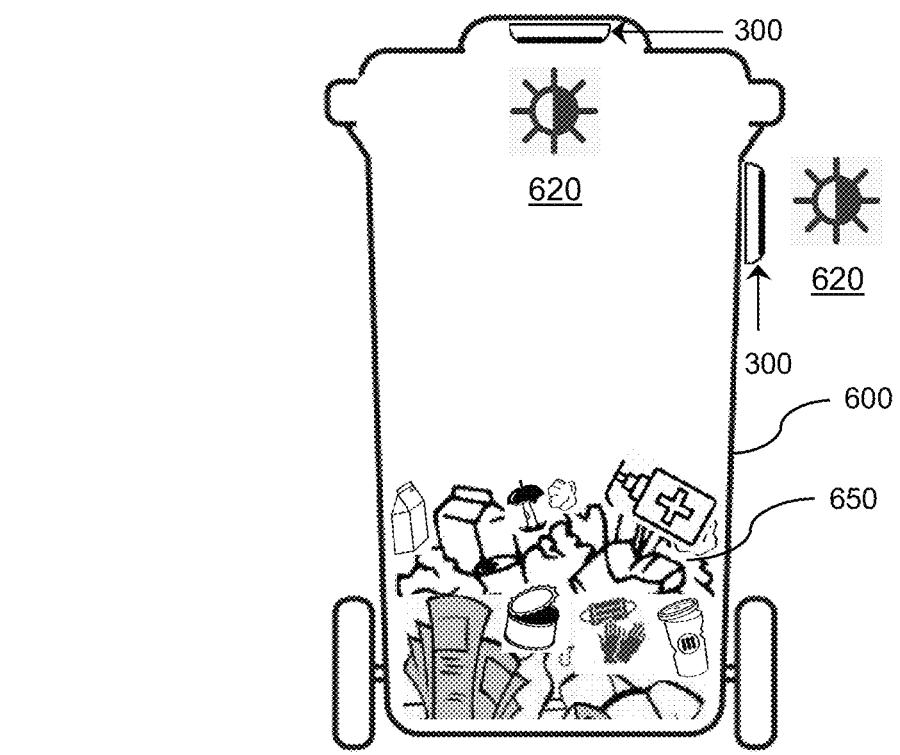
FIG. 37

Motion sensor pinout 3810

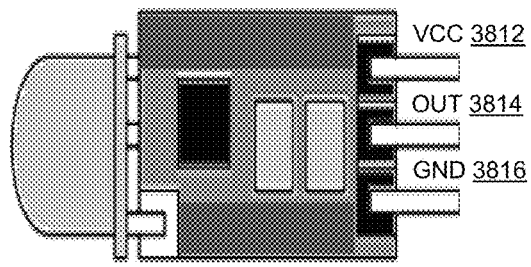

VCC 3812
OUT 3814
GND 3816

Motion sensor wiring table 3850

| Motion sensor pinout | Motion sensor pin function | Steps to wire a motion sensor pin to the SBM GPIO pin |
|---|---|---|
| Vcc 3812 | Vcc 3812 pin is used as positive power supply. | Connect motion sensor Vcc 3812 pin to the SBM GPIO pinout 850 5V power pin. |
| OUT 3814 | OUT 3814 pin is used as high / low output. | Connect motion sensor OUT 3814 pin to the assigned SBM GPIO pinout 850 pin. |
| GND 3816 | GND 3816 pin is used as negative power ground. | Connect motion sensor GND 3816 pin to the assigned SBM GPIO pinout 850 GND pin. |

FIG. 38

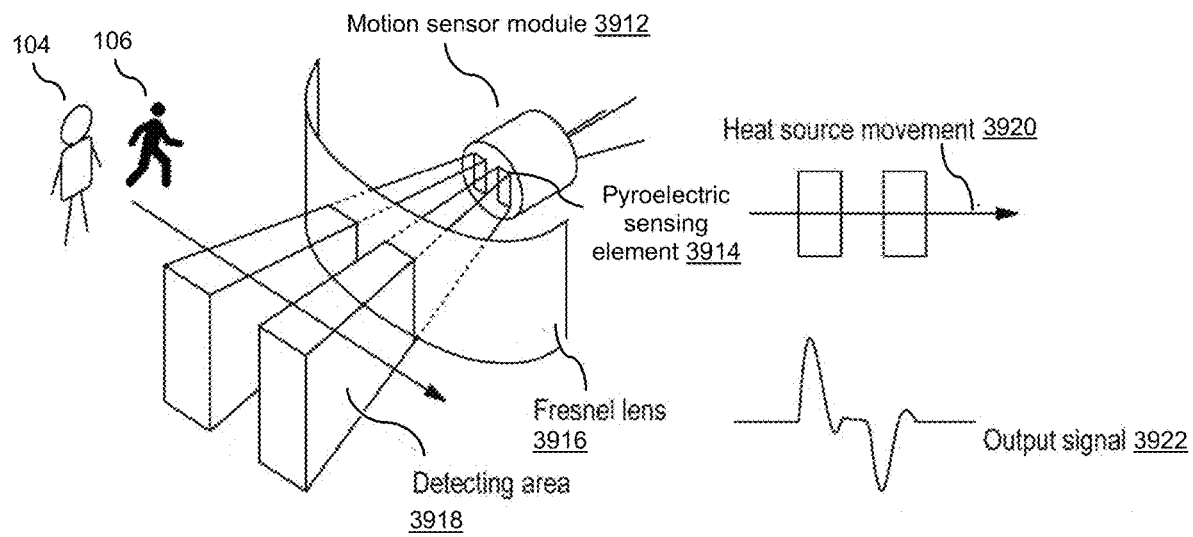
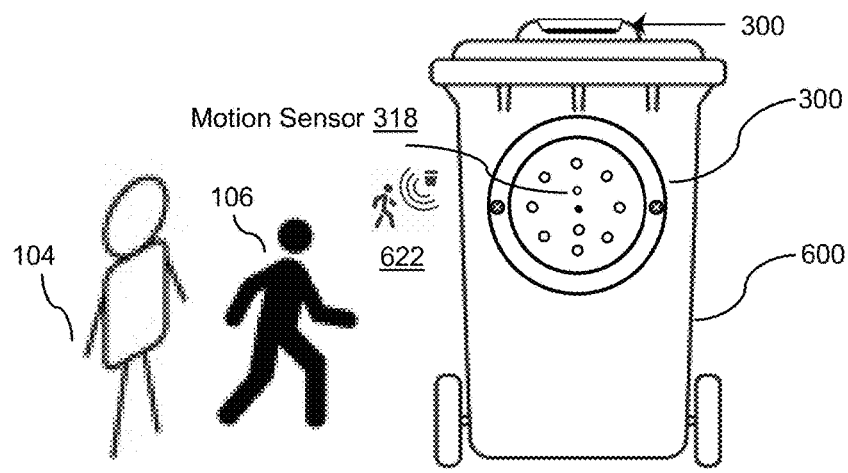
FIG. 39

Waste and litter sensor camera pinout 4010

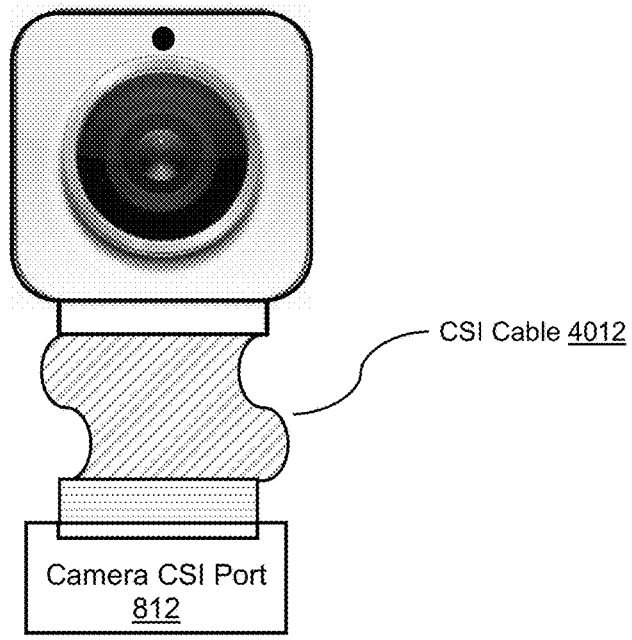

CSI Cable 4012

Camera CSI Port 812

Waste and litter sensor wiring table 4050

| Waste and litter sensor camera pinout | Waste and litter sensor camera cable function | Steps to wire a waste and litter sensor camera CSI cable to the SBM camera CSI port |
|---|---|---|
| CSI Cable 4012 | Waste and litter sensor camera pinout CSI cable 4012 is used as an electrical bus connection between the camera and single board microcomputer. | Connect waste and litter sensor camera pinout CSI cable 4012 to the SBM Camera CSI port 812. |

FIG. 40

Waste and litter sensor working principle diagram 4100
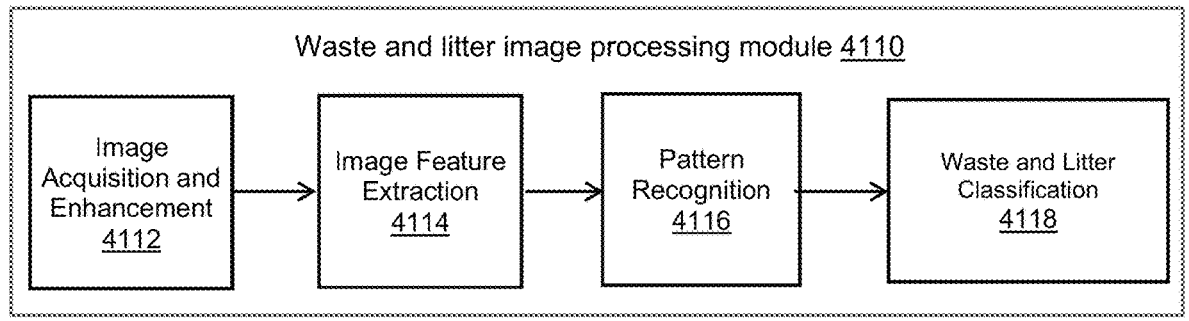
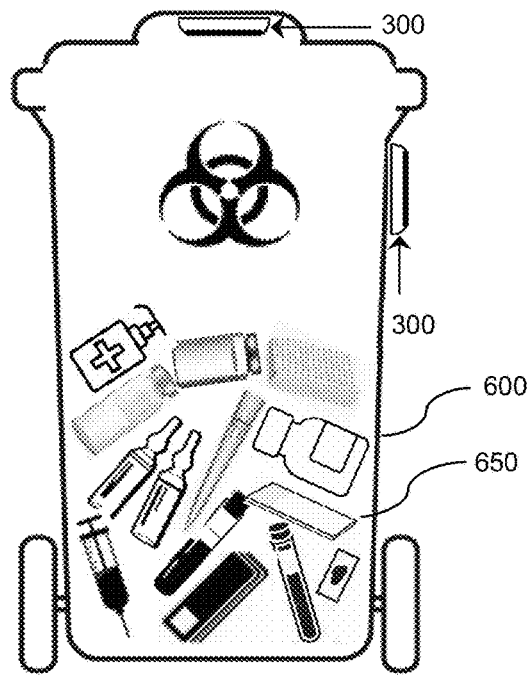
Biohazard waste bin 4150
FIG. 41

Pathogen biosensor pinout 4310

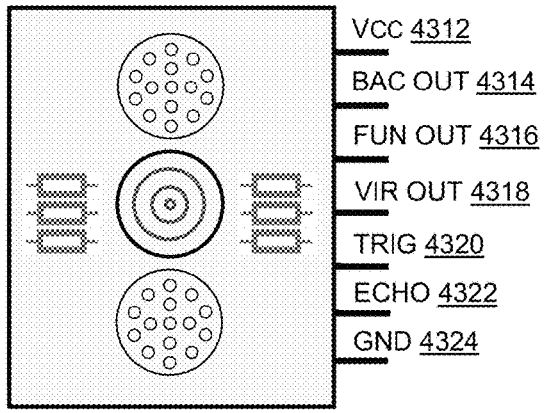

- VCC 4312
- BAC OUT 4314
- FUN OUT 4316
- VIR OUT 4318
- TRIG 4320
- ECHO 4322
- GND 4324

Pathogen biosensor wiring table 4350

| Pathogen biosensor pinout | Pathogen biosensor pin function | Steps to wire a pathogen biosensor pin to the SBM GPIO pin |
|---|---|---|
| VCC 4312 | VCC 4312 pin is used as positive power supply. | Connect pathogen biosensor VCC 4312 pin to the assigned SBM GPIO pinout 850 5V power pin. |
| BAC OUT 4314 | BAC OUT 4314 pin is used as output pin for bacteria. | Connect pathogen biosensor BAC OUT 4314 pin to the assigned SBM GPIO pinout 850 pin. |
| FUN OUT 4316 | FUN OUT 4316 pin is used as output pin for fungi. | Connect pathogen biosensor FUN 4316 pin to the assigned SBM GPIO pinout 850 pin. |
| VIR OUT 4318 | VIR OUT 4318 pin is used as output pin for virus. | Connect pathogen biosensor VIR OUT 4318 pin to the assigned SBM GPIO pinout 850 pin. |
| TRIG 4320 | TRIG 4320 pin is used to trigger the signal pulses such as light or ultrasound. | Connect pathogen biosensor TRIG 4320 pin to the assigned SBM GPIO pinout 850 TRIG pin. |
| ECHO 4322 | ECHO 4322 pin produces a pulse when the reflected signal is received. | Connect pathogen biosensor ECHO 4322 pin to the assigned SBM GPIO pinout 850 TRIG pin. |
| GND 4324 | GND 4324 pin is used as negative power ground. | Connect pathogen biosensor GND 4324 pin to the assigned SBM GPIO pinout 850 GND pin. |

FIG. 43

Pathogen biosensor optical sensing working principle diagram 4410
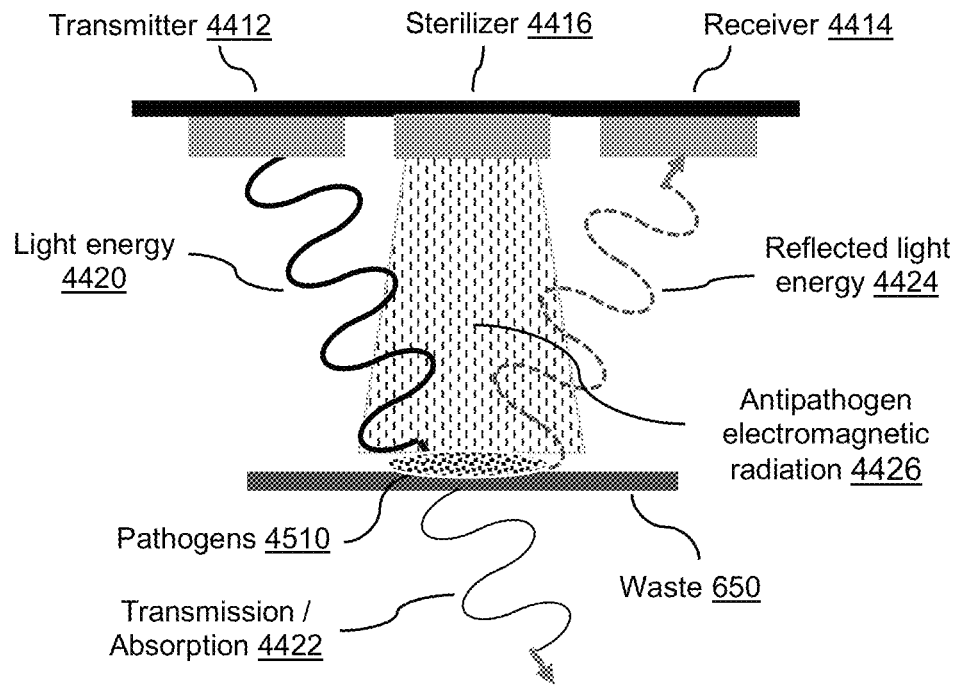
Pathogen biosensor ultrasound working principle diagram 4450
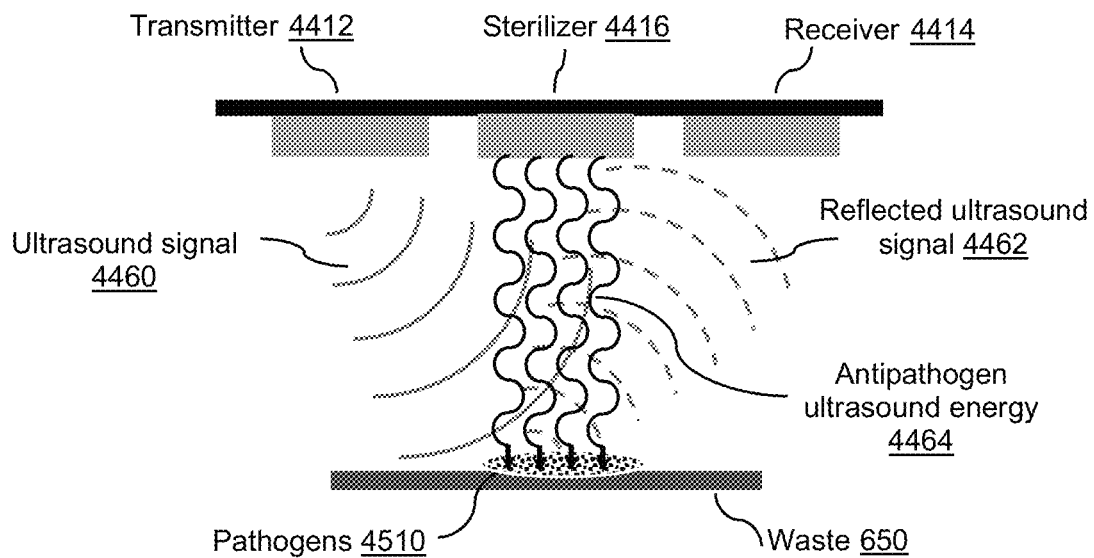
FIG. 44

Pathogens 4510
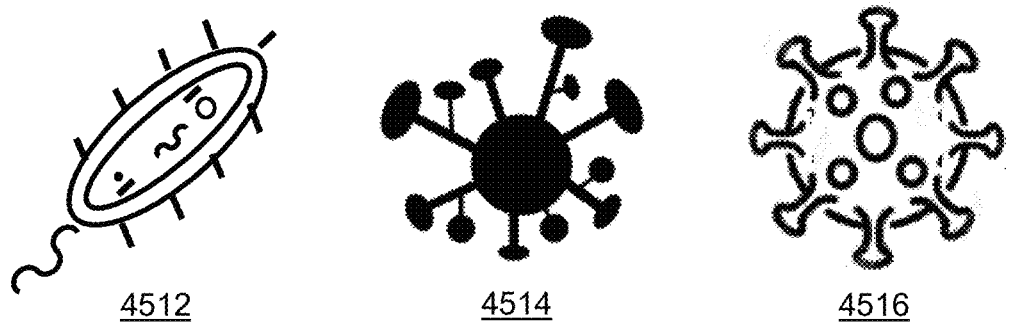
4512    4514    4516
Pathogen biosensor operating principle diagram 4550
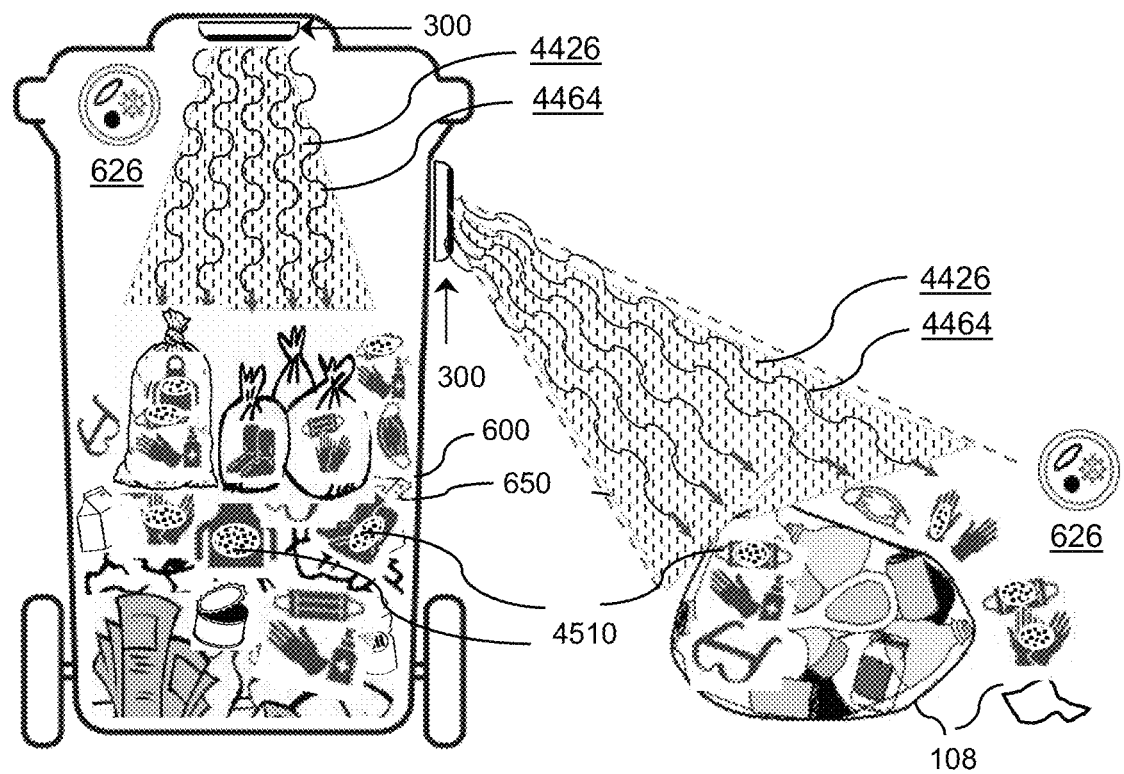
FIG. 45

Accelerometer sensor working principle diagram 4610
Dual axis tilt sensing object at rest diagram 4620
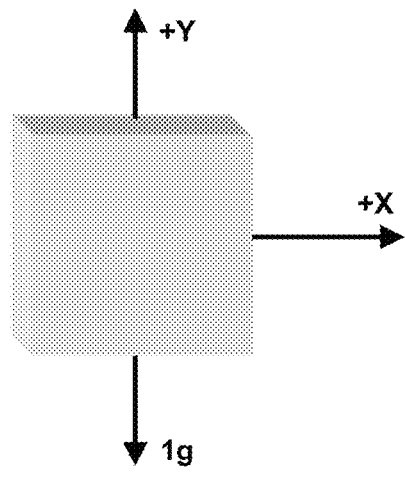
Dual axis tilt sensing object at inclination diagram 4630
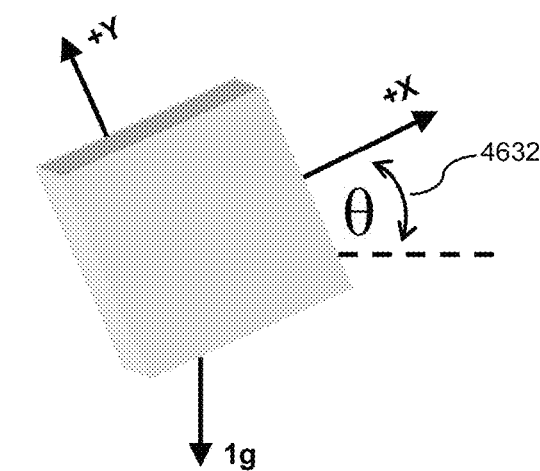
Accelerometer sensor operating principle diagram 4650
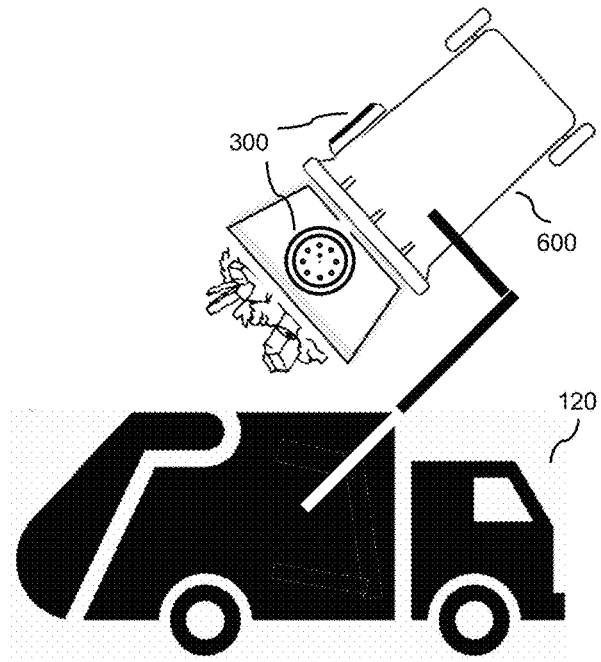
FIG. 46

Weight sensor 4710
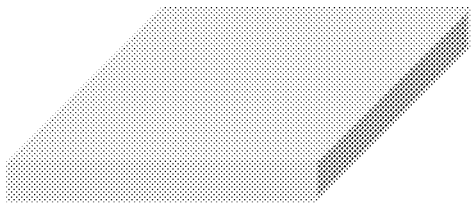
Weight sensor circuit block diagram 4720
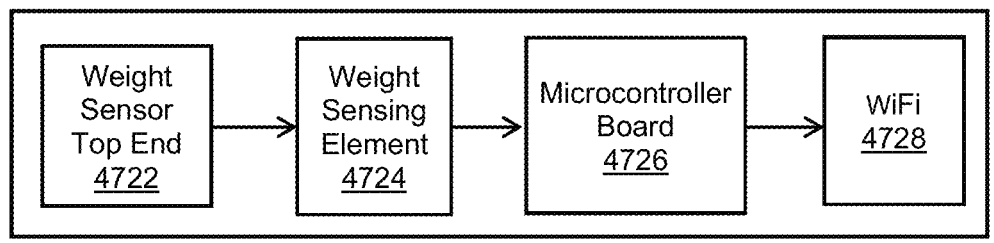
Weight sensor operating principle diagram 4750
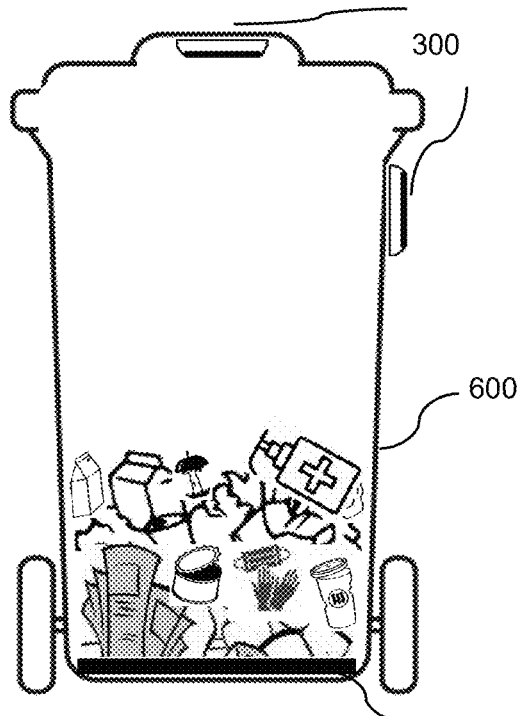
FIG. 47

Waste collection vehicle routes initial waste bins cluster graph 5210
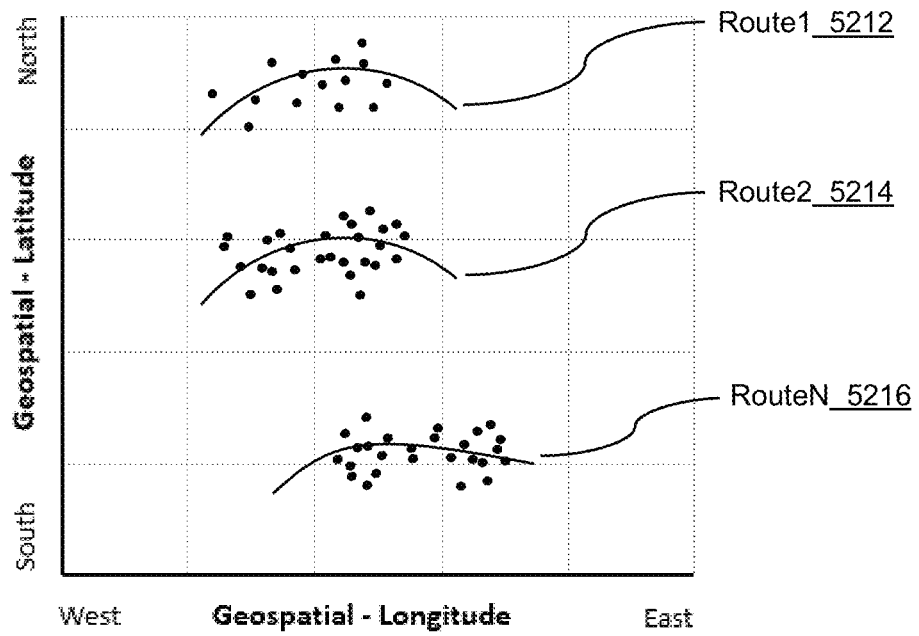
Waste collection vehicle routes real-time waste bins cluster graph 5250
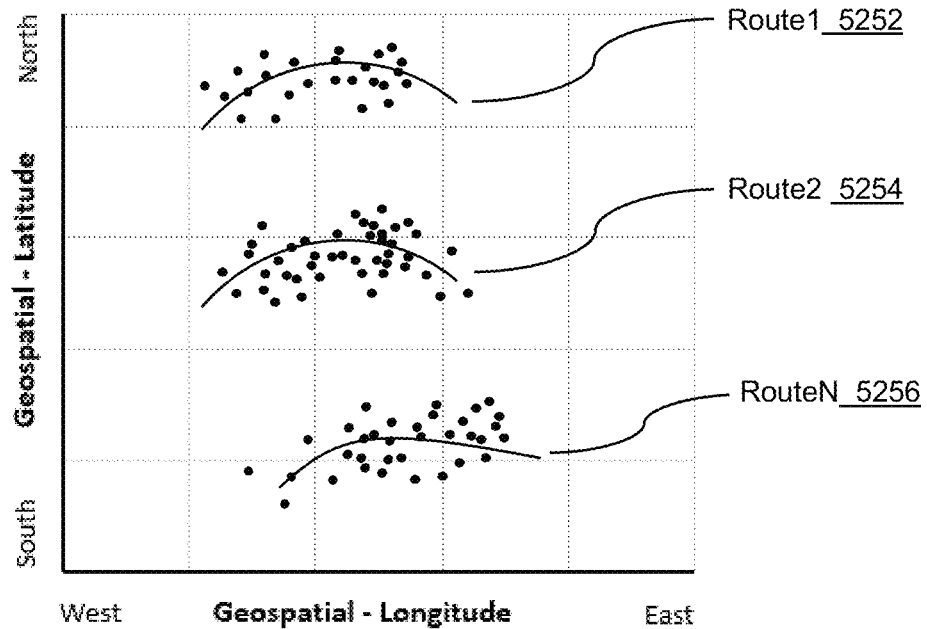
FIG. 52

Waste bin mobile application 110
detail data results page 5800

Waste Bin UDI1 – Location 1 - Altitude 1

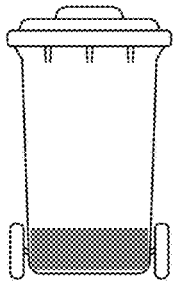

| | | | | |
|---|---|---|---|---|
| Fill Level | 22% | Temperature | 15.2 degrees C | ••• |
| Humidity | 18% | Pressure | 101.325 kPa | |
| Air Quality Index | 49 (good) | Smoke Level | 1 (white) | |
| Gas Type | Ethanol | Waste Weight | 4 kg | |
| Ambient Light | 4 (daylight) | Motion Event | 2 | |
| Waste Type | Food Waste | Litter Type | 1 (none) | |
| Biohazard Waste Type | Solid | Biohazard Waste Level | 2 (low) | |
| Pathogen Type | Bacteria | Biosafety Level | BSL-2 | |

5810

Waste Bin UDI2 – Location 2 - Altitude 2

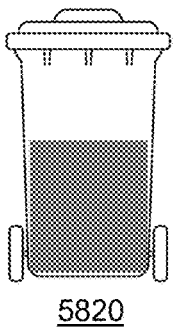

| | | | | |
|---|---|---|---|---|
| Fill Level | 58% | Temperature | 22.6 degrees C | ••• |
| Humidity | 27% | Pressure | 101.315 kPa | |
| Air Quality Index | 124 (unhealthy) | Smoke Level | 3 (grey) | |
| Gas Type | Propane | Waste Weight | 8 kg | |
| Ambient Light | 3 (overcast) | Motion Event | 6 | |
| Waste Type | Garbage | Litter Type | 1 (none) | |
| Biohazard Waste Type | Sharp | Biohazard Waste Level | 1 (none) | |
| Pathogen Type | Fungi | Biosafety Level | BSL-1 | |

5820

Waste Bin UDIN – Location N - Altitude N

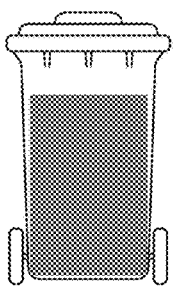

| | | | | |
|---|---|---|---|---|
| Fill Level | 85% | Temperature | 18.9 degrees C | ••• |
| Humidity | 82% | Pressure | 101.301 kPa | |
| Air Quality Index | 218 (hazardous) | Smoke Level | 5 (black) | |
| Gas Type | Methane | Waste Weight | 1 kg | |
| Ambient Light | 1 (dark) | Motion Event | 9 | |
| Waste Type | Garbage | Litter Type | 1 (none) | |
| Biohazard Waste Type | Pathological | Biohazard Waste Level | 3 (medium) | |
| Pathogen Type | Virus | Biosafety Level | BSL-3 | |

Waste collection facility application 112
main menu drop-down list 5900

---

Waste management system performance 6000

Real-time street view map 6100

Waste collection routes waste bins clusters 6200

Waste collection routes waste bins summary 6300

Biohazardous waste performance summary 6400

Pathogen waste performance summary 6500

Waste collection vehicles performance 5902

Litter performance 5904

System administrator 5906

Log out 5908

Waste collection facility application 112
Real-time street view map 6100

Waste collection facility application 112
Waste collection routes waste bins summary 6300

≡ | Search | ≡

Waste collection routes waste bins summary
Date: 2020-07-25, Time: 15:02 h

Route waste bins status 6310
1 – 95112

| Waste Bin UDI | Address | Content / Waste Type(s) | Fill Level | BSL | Litter Index | Last Serviced |
|---|---|---|---|---|---|---|
| 95112-1 | 95 N 4TH Street | Food Waste, Garbage | 83 | BSL-1 | 1 | 2020-07-15:14:26 |
| 95112-2 | 49 N 4TH Street | Plastic, Papers | 85 | NA | 2 | 2020-07-15:13:26 |
| 95112-3 | 50 N 4TH Street | Yard Waste | 60 | NA | 1 | 2020-07-15:14:40 |
| 95112-4 | 26 S 4TH Street | Biohazard, Garbage | 87 | BSL-2 | 1 | 2020-07-15:14:50 |
| 95112-5 | 150 E San Fernando St | Food Waste, Garbage | 95 | BSL-3 | 3 | 2020-07-08:14:26 |
| 95112-11 | 1 Washington Square | Yard Waste | 95 | NA | 1 | 2020-07-08:14:46 |
| 95112-12 | South 9th Street | Plastic, Papers | 60 | NA | 2 | 2020-07-15:14:59 |

< >

Route waste bins data summary 6312
Route 1 – 95112

| No | Parameter | Low | High | Mean | SD |
|---|---|---|---|---|---|
| 1 | Fill Level | 22% | 98% | 66.20% | 24.14 |
| 2 | Temperature | 15 | 22 | 17.51 | 8.52 |
| 3 | Humidity | 18 | 65 | 47.16 | 20.15 |
| 4 | Pressure | 100 | 102 | 101.24 | 0.80 |
| 5 | Air Quality Index | 49 | 218 | 270.12 | 138.44 |
| 6 | Smoke Index | 1 | 2 | 1.12 | 0.89 |
| 7 | Ambient Light | 2 | 4 | 2.24 | 1.59 |
| 8 | Litter Index | 1 | 3 | 2.28 | 0.82 |
| 9 | Gas Type | Most common – Ethanol, Methane | | | |
| 10 | Biohazard Waste Type | Solid Biohazardous Waste | | | |
| 11 | Biosafety Level | BSL-3 | | | |
| 12 | Pathogen Type(s) | Most common – Bacteria, Virus | | | |

Route 2 – 95113
...
Route N – 95148

FIG. 63

Waste collection facility application 112
Pathogen waste performance summary 6500

Pathogen waste performance summary
Date: 2020-07-15, Time: 18:29 h

List of pathogen type detected 6510
Route 1 – 95112

| No | Pathogen Type | Details |
|----|---------------|---------|
| 1 | Bacteria | Salmonella, Escherichia Coli, Shigella, Streptococcus |
| 2 | Fungi | Ringworm, dermatophytes, tinea pedis, yeasts, rusts, smuts, mildews, molds |
| 3 | Virus | SARS-CoV-2, Dengue, Ebola, Rabies, Rotavirus |

List of waste bins pathogen type details 6512
Route 1 – 95112

| Waste Bin UDI | Address | Pathogen Type | Fill Level | BSL | Litter Index | Last Serviced |
|---------------|---------|---------------|------------|-----|--------------|---------------|
| 95112-24 | 132 N 4TH Street | Bacteria - Shigella | 86 | BSL-2 | 1 | 2020-07-15:16:16 |
| 95112-35 | 156 N 4TH Street | Virus - SARS-CoV-2 | 77 | BSL-2 | 2 | 2020-07-15:16:22 |
| 95112-37 | 49 N 4TH Street | Bacteria - Salmonella | 67 | BSL-3 | 1 | 2020-07-15:16:31 |
| 95112-38 | 37 S 4TH Street | Fungi - mildews, molds | 78 | BSL-1 | 1 | 2020-07-15:16:34 |
| 95112-39 | 177 E San Fernando St | Virus - Dengue, Ebola | 69 | BSL-4 | 3 | 2020-07-08:16:38 |
| 95112-49 | 9 Washington Square | Bacteria - Streptococcus | 89 | BSL-2 | 1 | 2020-07-08:16:46 |

FIG. 65

SMART WASTE BIN SENSOR DEVICE AND METHODS FOR WASTE MANAGEMENT SYSTEM

CLAIM OF PRIORITY

This application is a continuation-in-part of U.S. patent application Ser. No. 16/124,189 filed on Sep. 7, 2018. These patent applications are incorporated herein by reference in their entirety.

FIELD OF THE INVENTION

This application relates generally to the field of waste management, and more specifically to the smart waste bin sensor device comprising a set of sensors installed to a waste bin. Smart waste bin sensor device sensing methods are enabled to detect, measure, and monitor sensor data readings inside or surrounding the waste bin and wirelessly send them to the cloud server. Moreover, the aspects of the disclosed embodiments concern methods of optimization of waste transportation and collection, as well as litter reduction.

DESCRIPTION OF THE PRIOR ART

There exist various types of sensor devices for remote monitoring of a waste bin or container. The sensor device enables the waste to be picked up based on amount of waste. The sensor devices also allow for monitoring of some of the environment parameters like pollution, gas, temperature, fire, and ultraviolet radiation surrounding the waste container. Associated with sensor devices are a waste collection system and methods. A waste collection system is responsible for monitoring of the waste containers. The methods can support a competitive bidding arrangement for implementing collection of waste, segregation of the waste, advertisement-based compensation system, and so on.

In addition to waste properly disposed of in the waste bin, there is litter found around the waste bins. Litter is defined as a piece of waste and rubbish that has been improperly disposed of, at the incorrect time, location, and without consent. Litter is very harmful and takes a negative toll on the environment. For example, it can pollute water and harm sea life, spread bacteria and disease, and start fires on hot days. Almost half of litter is unintentional, and it comes mostly from pedestrians, residents, and businesses. A few types of litter like plastic can stay in the environment for millions of years, ending up in bodies of water and forming debris. However, it can be collected effectively, recycled, or stored in landfills. Most people overproduce trash and litter, which damages and severely pollutes the environment.

U.S. Patent App. No. 2016/0300297 to Kekalainen et al. discloses a waste collection system which includes one or more waste containers for receiving waste, and a server system for receiving one or more signals via a wireless communication network from sensor arrangements included on one or more containers, to compute an optimal strategy to collect waste. The system is based on a competitive bidding arrangement for implementing collection of waste. The U.S. patent to Kekalainen et al. does not teach and claim waste bin sensors to monitor altitude, humidity, air quality, ambient light, RFID, motion, waste and litter type, accelerometer sensing tilt position, and waste weight. The sensor arrangements are pivotally mounted on the lid, requiring a special waste container with the lid to install sensors. The sensors are not user configurable through a waste bin mobile app or waste collection facility application.

U.S. Patent App. No. 2015/0324760 to Borowski et al. is an electronic waste tracking device, process, and system to track waste from one location to another location. It consists of a waste tracking method comprising of placing a first waste container at a first location, the first waste container having an electronic tag detector and an electronic waste identification, tracking, and monitoring device, and placing a second waste container in the first waste container, the second waste container having an electronic tag with an identification code. The individual bag is weighted at the recycling plant such as a paper mill. The waste tracking method is for electronically tracking the second waste container containing the waste from the first location to a second location. The claims are for various waste tracking methods. The application describes that the waste collection device preferably also includes various sensors, but there are no specifications and claims for the sensors. The U.S. patent to Borowski et al. does not teach and claim for independent sensor device installation, setup, device settings, waste bin sensors to monitor waste bin waste fill value, geospatial position, altitude, temperature, humidity, pressure, air quality, smoke, gas type, ambient light, RFID, motion event, waste and litter type, accelerometer sensing tilt position, waste weight, and associated waste bin mobile application and waste facility collection application.

U.S. Patent App. No. 2015/0298903 to Luxford is a monitoring system comprising a plurality of monitoring stations disposed in or associated with a respective rubbish bin housing or surround. The patent claim discloses a detector for a bin comprising the first sensor positioned inside the waste bin to sense the level of rubbish in the bin and a second sensor positioned outside to sense an aspect of the local environment surrounding the bin. The second detector can sense pollution, ultraviolet radiation, fire, door open, and near field identifier. The methods allow for collected waste pickup based on predetermined fill level and second sensor value. The U.S. patent to Luxford does not teach a single sensor device which can detect fill level, pollution, ultraviolet radiation, and fire. Instead, there are two sensors, one positioned inside and another one positioned outside. It does not determine the level of rubbish in the bin based on the received first signal but needs at least two discrete representations of the level of rubbish in the bin before it can be emptied. The U.S. patent to Luxford does not specify definition, ranges, and unit of measurement for pollution, ultraviolet radiation, and fire detectors. The pollution, ultraviolet radiation, and fire environment factor signals and methods may trigger reactive alerts for the maintenance of the bin but do not provide the proactive alerts to empty the bin. The U.S. patent to Luxford does not teach and claim for independent sensor device installation, setup, device settings, waste bin sensors to monitor altitude, humidity, pressure, smoke, ambient light, waste and litter type, accelerometer sensing tilt position, waste weight, and associated waste bin mobile application and waste facility collection application.

U.S. Patent App. No. 2015/0323366 to Kekalainen et al. discloses a sensor device for remote monitoring of a waste container, the sensor device including one or more sensors for sensing an amount of waste and an environment within the waste container, a data processing unit for processing sensor signals indicative of the amount of waste and the environment within the waste container consisting of temperature, gas and humidity, and a communication interface for enabling the sensor device to communicate information corresponding to the sensor signals to a remote location. The sensor device is mounted to an upper lid of the waste container in a spaced apart manner by placing one or more spacing elements and a heat reflecting layer arranged between the sensor device and the upper lid to provide a thermal barrier between an under-side surface of the waste container lid and the sensor device. The U.S. patent to Kekalainen et al. does not teach and claim for independent sensor device installation, setup, device settings through application, waste bin sensors to monitor waste bin altitude, pressure, air quality, smoke, ambient light, RFID, motion event, waste and litter type, accelerometer sensing tilt position, waste weight, and associated waste bin mobile application and waste facility collection application.

Chinese Patent App. Pub. No. 104058202A to Guoqiang teaches us about an intelligent dustbin, comprising a garbage box, where the front casing is provided with a read-out for showing, the side is provided with a sound transmitter, the top is provided with a camera, and the inside is provided with and can judge whether a pedestrian has the behavior that will throw away rubbish freely by the analysis of an image provided by a camera. The Chinese Patent to Guoqiang does not teach identification of the litter type, litter level value, photo upload by the pedestrian, reward point awarded, and litter pickup by the waste collection vehicle. The Chinese Patent to Guoqiang also does not teach, specify, and claim for independent sensor device installation, setup, device settings, waste bin sensors to monitor waste bin waste fill value, geospatial position, altitude, temperature, humidity, pressure, air quality, smoke, gas type, ambient light, RFID, motion event, waste and litter type, accelerometer sensing tilt position, waste weight, and associated waste bin mobile application and waste facility collection application.

WIPO App. Pub. No. 2017/150936 to Han teaches us about a compensation system according to the garbage disposal comprising a compensation management server and a garbage detection terminal. The compensation management server comprises: a signal receiving unit for receiving an advertising content request signal from a user terminal which is recognized through short-range communication with a waste detection terminal installed in a trash bin when waste is put in the trash bin, and an advertisement providing unit for providing one of the advertising contents stored in a database to the user terminal when an advertising content request signal is received. The compensation method is according to the cyber money that can be used when trading goods online and matching and managing the ID of the user possessing the user terminal and the ID of the advertiser that provided the advertisement content to the user terminal. The WIPO patent to Han does not teach identification of the litter type, litter level value, photo upload by pedestrian, and litter pickup by the waste collection vehicle. The WIPO patent to Han also does not teach and claim for independent sensor device installation, setup, device settings, waste bin sensors to monitor waste bin waste fill value, geospatial position, altitude, temperature, humidity, pressure, air quality, smoke, gas type, ambient light, RFID, motion event, waste and litter type, accelerometer sensing tilt position, waste weight, and associated waste bin mobile application and waste facility collection application.

EPO App. Pub. No. 2803953 to Peters teaches us about a waste container, comprising a lid and a sensor arrangement integrated in the lid, which has a first sensor, which is designed to detect an opening of the lid, and at least one second sensor, which is adapted to the degree of filling and/or to determine the level of the waste container. There is another refuse container which contains separate gas and temperature sensors. The method of operation involves the monitoring a waste container by detecting opening of a lid and activating sensors and a step for output of a radio signal via a radio device on the waste container if the determined filling level and/or level of the waste container exceeds a predefined threshold, and an alarm signal via the radio device of the waste container if the determined instantaneous temperature and/or the determined gas content exceeds a predefined alarm threshold value. The EPO Patent to Peters does not teach and claim a single sensor device which can detect fill level, temperature, and gas content. Instead, there are two devices, one integrated in the waste container cover and another one in the refuse container. Further, the waste container requires a lid to place sensors. The EPO Patent to Peters does not specify definition, ranges, and unit of measurement for fill level, temperature, and gas content. The temperature and gas content environment factor signals and methods may trigger a reactive alarm if the determined instantaneous temperature and/or the determined gas content exceeds a predefined alarm threshold to combat dangerous situations at an early stage but does not provide the proactive alerts to empty the bin. The EPO Patent to Peters also does not teach and claim waste bin sensors to monitor altitude, humidity, pressure, smoke, ambient light, waste and litter type, accelerometer sensing tilt position, and waste weight, and associated waste bin mobile application and waste facility collection application.

In summary, the scope and contents of the prior art of the above sensor devices and detectors for implementing smart waste containers including methods are limited because installation is cumbersome and requires special types of waste containers, fixed location, and does not allow for multiple sensor devices to be installed easily. Waste collection is based on limited sensor data, and methods are not comprehensive. As such there exists a need for a smart waste bin sensor device, waste management system, and method to address following challenges and unmet needs:

The waste bin detector installation is cumbersome and requires special types of waste containers or place to install. At times, there are multiple containers and detectors.

The detectors are suitable primarily for solid waste and do not take into consideration semi-solid, liquid, and biohazardous waste.

There is no setup, setting, and control of sensors or detectors through a user mobile application. The detector settings do not allow a user to choose any or all sensors to be activated or deactivated.

The sensors or detectors to detect and monitor altitude, air quality, smoke ranges, gas types, waste and litter types, pathogen biosensing, tilt position, and waste weight are not present. The sensor measurement ranges are not specified and user configurable.

The sensor-based alarms or alerts are reactive (the events have already happened).

The sensor or detector does not allow motion events and a camera to be used for security events notification.

The compensation system consists of advertisements and judges whether the pedestrian has the behavior that will throw away rubbish freely by the image of the analyzing camera.

The COVID-19 pandemic has led to an abrupt collapse of waste management chains. The waste collection method and management models are outdated and do not address biohazardous waste types and waste bin owners' and waste collectors' biosafety. In every city the amount of healthcare or medical waste generated due to COVID-19 pandemics has increased to several tons per day.

Sensor methods which implement, operate, detect, measure, monitor, and transmit data to a cloud server are inadequate or missing. The waste collection system methods do not consider the clustering based on zip codes, facility types like private, public, and commercial, waste collection vehicle types, sensor devices data analytics methods, and so on.

The present invention seeks to provide an improved smart waste bin sensor device, system, and methods. In addition, the present invention seeks to provide new sensors and improved methods for sensors implementation and waste collection as follows:

A simple installation of a single smart waste bin sensor device to the inside or outside of the waste bin body or to any type of waste bins. Most of the waste collection facility waste bins provided to the residential customers have two compartments. For example, garbage bins have one compartment for food scraps and other one for garbage. Similarly, recyclable waste bins have two compartments, one for paper and other for plastic. The present invention allows for multiple smart waste bin sensor devices to be installed on the waste bin.

The innovative smart waste bin sensor device is suitable for solid, semi-solid, liquid, and biohazardous waste. In the COVID-19 pre-pandemic era, the biohazardous waste was mostly a non-issue in the case of residential and private facility waste bin containers. Lately due to spread of infectious diseases like COVID-19, Dengue, Ebola, ringworm, strep throat, food poisoning, and other diseases, the biomedical waste includes personal protective equipment (PPE) kits, masks, shoe covers, gloves, safety glasses, respirator disposals, lab coats, aprons, human tissues, items contaminated with blood, dressings, plaster casts, cotton swabs, beddings contaminated with blood or body fluid, blood bags, needles, syringes, and so on, which are being disposed of as waste from every household. There has been an increasing number of hand sanitizer and other decontaminant containers being thrown as waste in the waste bin. Pathogenic bacteria like *Salmonella, Escherichia coli, Shigella, Yersinia, Klebsiella*, fungi like ringworm, dermatophytes, yeast *Candida*, and viruses like SARS-CoV-2, Dengue, and Ebola are also present in the waste. The smart waste sensor device can detect and decontaminate pathogenic waste. It is also very important to find out the type of waste thrown in the waste bin or litter around it. In the case of improperly disposed waste, the waste collection facility should send an immediate notification to the owner of the waste bin to decontaminate; otherwise it will not pick up the waste.

The smart waste bin sensor device and sensors address the waste management guidelines from Occupational Safety and Health Act (OSHA), Centers for Disease Control and Prevention (CDC), World Health Organization (WHO), National Waste & Recycling Association (NWRA) for solid waste, regulated medical waste, health care waste, and so on.

The smart waste bin sensor device can be set up through the waste bin mobile application or waste collection facility application. Further, the device settings interfaces allow control of individual sensors. Users can choose any or all sensor to be activated or deactivated, and so on.

The smart waste bin sensor device contains a location sensor which provides geospatial position data including altitude information, which is important to allow for the right type of waste collection vehicle to be sent when the waste bins are located in high altitude areas. The air quality sensor provides air quality information per EPA established national air quality standards to protect public health. The smoke sensor smoke information can be used to take appropriate preventive measures so that waste does not catch fire during high temperature days. In the case of waste bins located in remote forest areas, smart waste sensor devices serve as early warning devices before fire occurs. The gas types information inside or surrounding the waste bin can also be used by the waste collection vehicle drivers to take preventive measures by wearing appropriate personal protective equipment before collecting waste.

The waste and litter sensor provides information about the type of wastepaper, bin, food scraps, cardboard boxes, yard waste, litter, biohazardous waste, and so on. The pathogen biosensor noninvasive detectors allow detection, measurement, and monitoring of pathogen types like bacteria, fungi, and viruses using optical scattering for instant screening. The pathogen biosensor also provides the pathogen level information to the owner of the waste bin and waste collection operator. The pathogen's disinfection and sterilization can be done through noninvasive ultraviolet, ultrasound, and infrared methods.

The accelerometer sensor is used to set the waste fill level status to zero, when the waste bin is tipped, flipped upside down, or emptied, and the waste weight sensor is used to detect, measure, and monitor weight of waste inside the waste bin. The waste weight is useful when the waste bin monitor sensor device is installed outside the waste bin to empty the bin based on a pre-determined threshold. The sensor measurement ranges are specified and user configurable.

The smart waste bin sensor device based temperature, humidity, air quality, smoke, gas type, biohazardous waste, and pathogen alarms or alerts are proactive where appropriate preventive actions can be taken before events like rotting of the waste, foul smell, and fire have happened.

The smart waste bin sensor device motion event and camera to be used for security events notifications and to identify a person who damaged trash and recycling bins. The two-way radio communication can also be used to warn the intruder.

The compensation system consists of reward points to a pedestrian and is based on the litter picture and waste bin overflow pictures and video uploads. These reward points can also be used towards the recycling bills, local city services, and so on.

The present invention has sensor methods which implement, operate, detect, measure, monitor, and transmit sensor data to the cloud server. These sensor methods include both the working and operating principle of the sensors. The waste collection system methods consider the clustering based on zip codes, facility types like private, public, and commercial, waste collection vehicle types, and sensor methods providing the user configured waste pick up threshold value.

In conclusion, compared to prior art, the present invention incorporates the smart waste bin sensor device which comprises important sensors such as waste and litter type, providing biohazardous waste types and level, a pathogen biosensor providing pathogen types and biosafety levels, an accelerometer sensor sensing tilt position, a variety of gas types, and waste weight. The smart waste bin sensor device can be installed on any type of waste bin and inside or outside the body. There is an application to set up and control the smart waste bin sensor device, and it provides comprehensive detail information about the waste in the waste bin, and easy cost-effective waste management statistics to both the user and waste facility operator. The agile sensor methods based on machine learning algorithms implement, operate, detect, measure, monitor, and store sensors data locally and transmit to the cloud server to address unmet needs.

SUMMARY OF THE INVENTION

A waste management system comprising a waste bin storing waste, wherein the waste bin comprises a smart waste bin sensor device installed on the waste bin of a waste bin owner. The smart waste bin sensor device comprises a set of sensors that sends and receives signals through a wireless network to a cloud server. The set of sensors inside the smart waste bin sensor device comprises an RFID tag sensor, a location sensor, a fill level sensor, a temperature sensor, a humidity sensor, a pressure sensor, an air quality sensor, a smoke sensor, a gas sensor, an ambient light sensor, a waste and litter sensor, a pathogen biosensor, and an accelerometer sensor. The set of sensors implements, operates, detects, measures, and monitors environmental conditions inside or outside the waste bin. The waste and litter sensor detects, measures, and monitors a waste type, a waste volume, a litter type, a litter level, a biohazardous waste type, and a biohazardous waste level. The pathogen biosensor detects, measures, and monitors a pathogen type and a biosafety level. The pathogen biosensor comprises a sterilizer to kill pathogens. A waste bin mobile application comprises a set of functionalities to set up, control, and display results of the smart waste bin sensor device. A waste collection facility application comprises a set of functionalities to monitor, optimize, and service the waste bin. A neighborhood public biohazardous waste alert is sent to the waste bin mobile application installed on a mobile device of the set of waste bin owners within a specified distance of the waste bin in which a biohazardous waste level is above a predetermined threshold level. A neighborhood public biosafety alert is sent to the waste bin mobile application installed on a mobile device of the set of waste bin owners within a specified distance of the waste bin in which a biosafety level is above a predetermined threshold level. A method of operating a waste collection system in which a plurality of several waste bins receives waste. The biosafety alert based on type of pathogen detected can also contain information about the phase of pandemic alert as defined by world health organization (WHO). The cloud server creating with the signals from the set of sensors a set of waste bin statistics for the waste bin, wherein the cloud server uses the set of waste bin statistics to generate an optimal strategy for a real-time waste collection service of the waste bin by one or several waste collection vehicles. A method further comprising and providing the waste collection vehicle with a set of waste bin statistics for each waste bin of the plurality of waste bins to modify the current optimal strategy in real time during a collection of the waste from the plurality of waste bins for a waste collection facility to reduce the operating cost.

BRIEF DESCRIPTION OF THE DRAWINGS

FIG. 4 is an example front elevation view of a smart waste bin sensor device and a rear elevation view of a smart waste bin sensor device design that can be utilized to implement various embodiments.

FIG. 5 illustrates an example smart waste bin sensor device installed inside the bottom of waste bin lid diagram and a smart waste bin sensor device installed outside the waste bin body diagram that can be utilized to implement various embodiments.

FIG. 11 is an example single board microcomputer general purpose input output pinout function description table that can be utilized to implement various embodiments.

FIG. 12 illustrates an example RFID tag sensor pinout and an RFID tag sensor wiring table describing the hardware wiring connection steps of an RFID tag sensor pinout connected to the single board microcomputer general purpose input output pinout that can be utilized to implement various embodiments.

FIG. 13 illustrates an example RFID tag sensor working principle diagram 1310 and a RFID tag sensor operating principle diagram 1350 that can be utilized to implement various embodiments FIG. 14 illustrates an example location sensor pinout and a location sensor wiring table describing the hardware wiring connection steps of a location sensor pinout connected to the single board microcomputer general purpose input output pinout that can be utilized to implement various embodiments.

FIG. 15 illustrates an example location sensor GPS operating principle diagram and a location sensor cellular network operating principle diagram that can be utilized to implement various embodiments.

FIG. 16 illustrates an example fill level sensor pinout and a fill level sensor wiring table describing the hardware wiring connection steps of a fill level sensor pinout connected to the single board microcomputer general purpose input output pinout that can be utilized to implement various embodiments.

FIG. 17 illustrates an example fill level sensor working principle diagram and a fill level sensor timing diagram that can be utilized to implement various embodiments.

FIG. 19 illustrates an example temperature, humidity, and pressure sensor pinout and temperature, humidity, and pressure sensor wiring table describing the hardware wiring connection steps of a temperature, humidity, and pressure sensor pinout connected to the single board microcomputer general purpose input output pinout that can be utilized to implement various embodiments.

FIG. 20 illustrates an example temperature, humidity, and pressure sensor circuit block diagram and a temperature sensor working principle diagram that can be utilized to implement various embodiments.

FIG. 21 illustrates an example humidity sensor working principle diagram and a pressure sensor working principle diagram that can be utilized to implement various embodiments.

FIG. 23 illustrates an example air quality sensor pinout and an air quality sensor wiring table describing the hardware wiring connection steps of an air quality sensor pinout connected to the single board microcomputer general purpose input output pinout that can be utilized to implement various embodiments.

FIG. 24 illustrates an example air quality sensor working principle block diagram and an air quality index level of concern table that can be utilized to implement various embodiments.

FIG. 26 illustrates an example smoke sensor pinout and a smoke sensor wiring table describing the hardware wiring connection steps of a smoke sensor pinout connected to the single board microcomputer general purpose input output pinout that can be utilized to implement various embodiments.

FIG. 27 illustrates an example smoke sensor working principle diagram comprising a smoke sensor sensing element internal structure diagram, a smoke sensing element schematic circuit, a smoke sensing element cross section view, and a smoke sensor circuit diagram that can be utilized to implement various embodiments.

FIG. 30 illustrates an example gas sensor pinout and a gas sensor wiring table describing the hardware wiring connection steps of a gas sensor pinout connected to the single board microcomputer general purpose input output pinout that can be utilized to implement various embodiments.

FIG. 31 illustrates an example gas sensor working principle diagram and a gas sensor circuit diagram that can be utilized to implement various embodiments.

FIG. 32 illustrates an example gas sensor RED sensor graph and an OX sensor graph that can be utilized to implement various embodiments.

FIG. 35 illustrates an example ambient light sensor pinout and an ambient light sensor wiring table describing the hardware wiring connection steps of an ambient light sensor pinout connected to the single board microcomputer general purpose input output pinout that can be utilized to implement various embodiments.

FIG. 36 illustrates an example ambient light sensor working principle diagram and ambient light sensor circuit block diagram that can be utilized to implement various embodiments.

FIG. 37 illustrates an example ambient light sensor operating principle diagram that can be utilized to implement various embodiments.

FIG. 38 illustrates an example motion sensor pinout and a motion sensor wiring table describing the hardware wiring connection steps of a motion sensor pinout connected to the single board microcomputer general purpose input output pinout that can be utilized to implement various embodiments.

FIG. 39 illustrates an example motion sensor working principle diagram and a motion sensor operating principle diagram that can be utilized to implement various embodiments.

FIG. 40 illustrates an example waste and litter sensor camera pinout and a waste and litter sensor wiring table describing the hardware wiring connection steps of a waste and litter sensor pinout to the single board microcomputer general purpose input output pinout that can be utilized to implement various embodiments.

FIG. 41 illustrates an example waste and litter sensor working principle diagram comprising a waste and litter image processing module and a biohazardous waste bin that can be utilized to implement various embodiments.

FIG. 43 illustrates an example pathogen biosensor pinout and a pathogen biosensor wiring table describing the hardware wiring connection steps of a pathogen biosensor pinout connected to the single board microcomputer general purpose input output pinout that can be utilized to implement various embodiments.

FIG. 44 illustrates an example pathogen biosensor optical sensing working principle diagram and a pathogen biosensor ultrasound working principle diagram that can be utilized to implement various embodiments.

FIG. 45 illustrates an example set of pathogens and a pathogen biosensor operating principle diagram that can be utilized to implement various embodiments.

FIG. 46 illustrates an example accelerometer sensor working principle diagram and an accelerometer sensor operating principle diagram that can be utilized to implement various embodiments.

FIG. 47 illustrates an example weight sensor, a weight sensor circuit block diagram, and a waste sensor operating principle diagram that can be utilized to implement various embodiments.

FIG. 52 illustrates a waste collection vehicle routes initial waste bins cluster graph and a waste collection vehicle routes real-time waste bins cluster graph, according to some embodiments.

FIG. 58 illustrates an example waste bin mobile application detail data results page, according to some embodiments.

FIG. 59 illustrates an example waste collection facility application main menu drop-down list, according to some embodiments.

FIG. 63 illustrates an example waste collection facility application waste collection routes waste bins summary, according to some embodiments.

FIG. 65 illustrates an example waste collection facility application pathogen waste performance summary, according to some embodiments.

Figure 1:
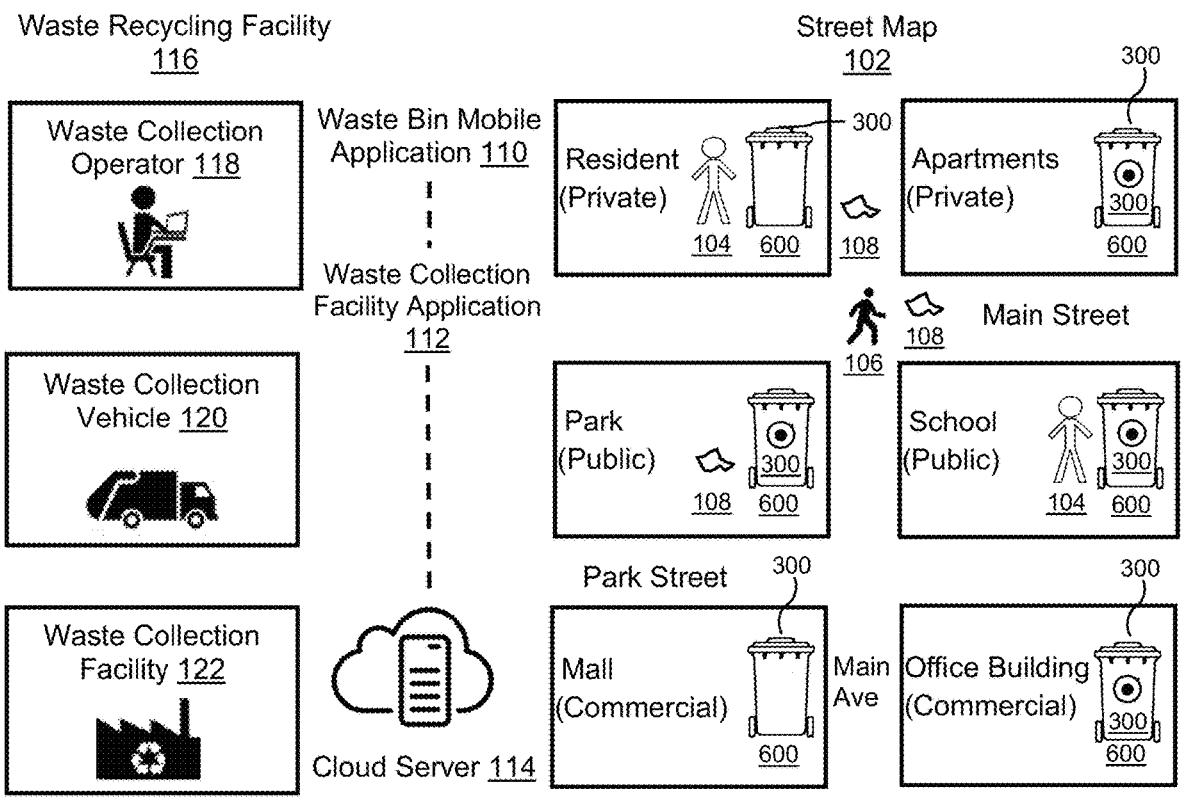
FIG. 1 illustrates an overall waste management system to continuously monitor waste bins to optimize waste collection and reduce littering, according to some embodiments.

The Figures described above are a representative set and are not exhaustive with respect to embodying the invention.

DESCRIPTION

Disclosed are a system, method, and article of manufacture for methods and systems of a smart waste bin sensor device. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of how to operate, detect, measure, and monitor environmental conditions inside or outside the waste bin using various sensors to provide a thorough understanding of embodiments of the invention. One who is skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The disclosed system consists of a smart waste bin sensor device, waste bin mobile app, waste collection facility application, and associated methods. The smart waste bin sensor device and waste bin mobile application allow a user to operate, detect, measure, and monitor environmental conditions inside or outside the waste bin. The application software provides real-time information about waste types, litter types, litter level, biohazardous waste types, biohazardous waste level, pathogen types, and biosafety level to the waste bin owner, waste collection operator, and waste collection vehicle driver.

The waste collection facility application methods empower the waste collection facility to create an optimal strategy and real-time waste collection vehicle routes to collect waste from waste bins.

In one embodiment, the waste management system is twofold, with a hardware and software system. The hardware includes a waste bin with a smart waste bin sensor device. The smart waste bin sensor device sends data through a wireless network to a cloud server. The application software program's waste bin mobile application and waste collection facility include different interactive user interfaces such as, inter alia: waste bin street map and litter hot spots, waste bin details and performance, and waste collection facility performance.

The disclosed invention runs on an end to end application workflow consisting of collecting smart waste bin sensor device sensor data, performing big data analysis, providing detailed waste bin results, assigning optimal routes, picking up waste from the waste bin, and monitoring, trending, and reporting of waste performance data.

The waste management system allows the waste bin owner and resident to monitor their waste production, and collectors to improve waste pickup quantities, collection routes, and effectively use waste collection vehicles. This is achieved by collecting waste only from the waste bins that have reached their maximum threshold level, hence minimizing extra effort and resources.

The smart waste bin sensor device sends a private biohazardous alert to the waste bin mobile application installed on the mobile devices of the waste bin owner, the waste facility collection operator, and the waste collection vehicle driver, when the biohazardous waste level is above the predetermined threshold level in the waste bin.

The smart waste bin sensor device sends a private biosafety alert to the waste bin mobile application installed on the mobile devices of the waste bin owner, the waste collection operator, and the waste collection vehicle driver when the biosafety level is above a predetermined threshold level in the waste bin.

The smart waste bin sensor device sends an illegal dumping alert to the waste bin mobile application and waste facility collection application installed on mobile devices of the waste bin owner, waste collection operator, and waste collection vehicle driver if illegal or banned items were dumped in a waste bin.

The biohazardous waste alert allows the waste bin owner to take additional measures to handle the waste, like placing all biohazardous waste in a red biohazardous waste bag. The biohazardous waste bag must then be put in a rigid waste bin for storage until it is picked up for proper disposal. All sharps should be placed in a sharps waste bin and sealed, and so on.

The biosafety alert allows the waste bin owner to take additional appropriate sterilization methods like incineration, autoclaving, gas sterilization, irradiation, and thermal inactivation measures to ensure the waste and/or litter is safe to pick up.

The biohazardous waste alert and biosafety alert also provide instruction on gowning and degowning of personal protective equipment while handling the waste and/or sending a special medical waste collection vehicle to collect the waste.

The smart waste bin sensor device and waste bin mobile application can also be operated independently and do not need to be connected to the cloud server. In this case, the waste bin owner can monitor the sensor reading details and waste performance.

The schematic flow chart diagrams included herein are generally set forth as logical flow chart diagrams. As such, the depicted order and labeled steps are indicative of one embodiment.

Exemplary Definitions

An accelerometer sensor can be used to measure the acceleration or deceleration of forces exerted upon the sensor. Such forces may be static, like the continuous force of gravity or, as is the case with many mobile or moving devices, dynamic, to sense movement or vibrations. The intended use of the accelerometer sensor is to measure the movement of the waste bin when the bin is tipped, flipped upside down, or emptied, and can be used to set the waste fill level status to zero. The unit of measurement of the accelerometer sensor is the rate of change of velocity of an object expressed in meters per second squared ($m/s^2$). The accelerometer sensor sends real-time acceleration data to the cloud server. Accelerometers can measure acceleration in one, two, or three orthogonal axes. Accelerometer sensors are typically used in one of three modes. In the case of 1 dimension as an inertial measurement of velocity and position, as a sensor of inclination, tilt, or orientation in 2 or 3 dimensions, as referenced from the acceleration of gravity (1 $g=9.8$ $m/s^2$) and as a vibration or impact sensor. Most accelerometers are micro-electromechanical Sensors (MEMS). The basic principle of operation of the MEMS accelerometer is the displacement of a small proof mass etched into the silicon surface of the integrated circuit and suspended by small beams. Per Newton's second law of motion ($F=ma$), as an acceleration is applied to the device, a force develops which displaces the mass. The support beams act as a spring and the air trapped inside integrated circuits (IC) as a damper. The common accelerometer sensor types can be capacitive sensing or use piezoelectric effect to sense the displacement of the proof mass proportional to the applied acceleration.

Air Quality Index (AQI) is an index for reporting air quality. Air Quality Index is used to provide information about how polluted the air currently is or how polluted it is forecasted to become.

An air quality sensor is an electronic component which can be used to obtain the number of suspended particles in the air, i.e., the concentration of particles, and output them in the form of a digital interface. The intended use of the air quality sensor is to detect, measure, and monitor the air quality index value inside or surrounding the waste bin, and can be used to provide the level of health concern information and disposal of the waste. The waste bin air quality index value can be used by the waste collection vehicle or the owner of the bin to empty the waste bin based on set acceptance criteria. The air quality index value can also be used to take appropriate preventive measures so that illegal burning or backyard burning of trash does not produce air pollutants, toxic gases, and so on. The improper disposal of solid waste also contributes to air pollution. The air quality index value is reported in the form of a number that runs from 0 to 500. The EPA Office of Air Quality Planning and Standards (OAQPS) has set National Ambient Air Quality Standards. The air quality sensor sends real-time air quality information, i.e., the concentration of particles data, to the cloud server. An air quality sensor can use the laser scattering principle, which produces scattering by using a laser to radiate suspending particles in the air, collects scattering light in a certain degree, and finally obtains the curve of scattering light change with time. In the end, the equivalent particle diameter and the number of particles with different diameters per unit volume can be calculated by a microprocessor based on the MIE theory of absorption and scattering of plane electromagnetic waves by uniform isotropic particles of the simplest form. The MIE theory is an analytical solution of Maxwell's equations for the scattering of electromagnetic radiation by particles of any size.

An algorithm is a precise, step-by-step plan or set of rules to be followed in calculations or computational procedure or other problem-solving operations, especially by a computer. An algorithm computational procedure begins with an input value and yields an output value in a finite number of steps. The waste bin algorithms used are a computational procedure algorithm to calculate sensor data values, various cluster algorithms, a camera machine vision algorithm, a neural network algorithm, and so on. The algorithms implemented in the method can vary.

An ambient light sensor (ALS) is an electronic component, also known as an illuminance or illumination sensor, optical sensor, brightness sensor or simply light sensor, which is used to reduce the power consumption to provide the user with increased battery life. The intended use of the ambient light sensor is to detect, measure, and monitor ambient light inside or surrounding the waste bin to reduce power consumption and increase waste bin battery life. The smart waste bin sensor device installed inside the bottom of the waste bin lid can be programmed to go into power saving sleep mode when the waste bin lid is closed. The smart waste bin sensor device installed outside the waste bin body can be set to provide real-time ambient light sensor values and/or go into power saving sleep mode when it is dark. The unit of measurement is lux, and it can be expressed in terms of ambient light level values of 1 to 5. The ambient light sensor sends real-time ambient light, i.e., illuminance data, to the cloud server. Ambient light sensor technologies can be based on photo electric cell, photodiode, photo transistor, and photo integrated circuit (IC). Ambient light sensors contain a photodiode which can sense light wavelengths visible to the human eye in the 380-nm to 780-nm range and convert it into electricity. Light is measured depending upon its intensity.

An application programming interface (API) can specify how application software components of various systems interact with each other. APIs are source code-based specifications intended to be used as interfaces by application software components to communicate with each other. Weather APIs are application programming interfaces that allow you to connect to large databases of weather forecast and historical information. For example, the waste bin mobile application and waste collection facility application can connect to weather APIs such as OpenWeatherMap API, AccuWeather API, Dark Sky API, Air Quality API, and so on. The weather data imported from weather APIs can be used to display it on the waste bin mobile application and waste collection facility application.

An audio port links the single board microcomputer's sound hardware to speakers, microphone, headsets, or other equipment.

Bluetooth is a wireless technology standard for exchanging data over short distances for, e.g., using short-wavelength UHF radio waves in the ISM band from 2.4 to 2.485 GHz from fixed and mobile devices, and building personal area networks (PANS), etc. It is noted that other communication systems which transmit signals with messages from a user's device to recipients can be used as well. Waste monitor Bluetooth can be used to connect to a mobile device or other devices like external pressure strains, weight scale, weight sensor, load cell, rooftop rain and wind weather stations, and so on.

A biohazard is risk to human health or the environment arising from biological work, especially with microorganisms. Biohazard materials are infectious agents or hazardous biologic materials that present a risk or potential risk to the health of humans, animals, or the environment. The risk can be direct through infection or indirect through damage to the environment.

A biohazardous waste is waste that potentially contains biological agents that may pose risk to the population if released in the environment. Biohazardous waste also known as medical waste or healthcare waste is any kind of waste that contains infectious material or material that is potentially infectious. This definition includes waste generated by healthcare facilities like physician's offices, hospitals, dental practices, laboratories, medical research facilities, and veterinary clinics. Increasingly due to COVID-19 pandemic the biohazardous waste is disposed of in private (residential), public and commercial waste bins. Waste bins containing biohazard materials can pose risk to the waste collection vehicle driver or waste collection operator workers.

Biohazard disposal waste containers or bins are used for the disposal of waste that may be contaminated with pathogens that present a danger to people and the environment. The biohazardous waste can be solid biohazardous waste, liquid biohazardous waste, sharp biohazardous waste, pathological biohazardous waste, and microbiological waste. All infectious wastes, for example, glassware, pipetting tips, gloves, blood collection tubes, dried blood spotting slides, tissue slides, microbiologic and tissue specimens, and other solid or liquid waste or refuse, are discarded into "biohazard" labeled bins that do not leak and have solid, tight-fitting covers that are applied before transport from the hospital, physician laboratory work area, and increasingly from residential homes, for storage and disposal. Sharp disposal consisting of sterile syringes, needles, lancets, or other blood-letting devices ("sharps") that are capable of transmitting infection are used once only, and all waste sharps are discarded in puncture-resistant containers that are easily accessible, located in areas where needles are commonly used, and properly labeled to warn handlers of the potential hazard. Increasingly due to the COVID-19 pandemic, people are also discarding biohazardous waste like gloves, mask, hair nets, gowns, boots, hand sanitizers, and drugs into garbage or plastic waste bins. This results in spread of infection if it is not detected and disposed of properly. Biohazardous type, biohazardous waste level, pathogen type, and biosafety level information allow waste collection workers to have appropriate provision and usage of personal protective equipment (PPE), for example, gloves, gowns, masks, and eye protectors, etc. while picking up the waste from waste bins. This information also allows all waste collection facility work areas to be maintained in a sanitary and reliable condition in which blood and body substances are handled and in circumstances during which exposure is likely to occur. The waste collection facility application allows for all waste facility operators and collection workers to have proper PPE instruction, at which personnel are instructed in the proper use of personal protective clothing/equipment, for example, gloves, gowns, masks, eye protectors, and footwear and for records to be retained. Personnel are also proactively provided training on hand cleaning when they remove gloves and clean hands using an effective antimicrobial method after handling the biohazardous waste.

Biosafety is the application of safety precautions that reduce waste workers' like clinical laboratory personnel's risk of exposure to a potentially infectious microbe or pathogen and limit contamination of the work environment and, ultimately, the community. The waste collection facility application and waste bin mobile application allow for automated training and instruction on biosafety policies and procedures to minimize the occupational risk of exposure to infectious agents during waste disposal or handling in the waste collection facility, in accordance with current local, county, state, and governmental recommendations regarding the biosafety levels for working with different organisms.

Biosafety levels (BSLs)—There are four biosafety levels. Each level has specific controls for containment of microbes or pathogens and biological agents. The primary risks that determine levels of containment are infectivity, severity of disease, transmissibility, and the nature of the work conducted. The origin of the pathogen or microbe, or the agent in question, and the route of exposure are also important. Each biosafety level has its own specific containment controls that are required for the following best waste collection practices, safety equipment, and facility construction. The biosafety level 1 for sample organisms like nonpathogenic strains of *E. coli, Staphylococcus, Bacillus Subtilis*, and

*Saccharomyces Cerevisiae* does not require containment and has pathogen type agents that present minimal potential hazard to personnel and the environment and are unlikely to cause disease. The biosafety level 2 for sample organism like Influenza, HIV, Lyme disease, Equine Encephalitis, and COVID-19 requires containment and has pathogen type agents associated with human disease and pose moderate hazards to personnel and the environment, but can cause severe illness in humans and are transmitted through direct contact with infected material. The biosafety level 3 for sample organisms like Yellow Fever, West Nile Virus, and Tuberculosis requires high containment and has pathogen type agents that present a potential for aerosol transmission, and agents causing serious or potentially lethal disease. The biosafety level 4 for sample organisms like Ebola Virus, Tick Borne Encephalitis, Marburg Virus, and Crimean-Congo hemorrhagic fever requires maximum containment and has pathogen type agents that pose a high risk of aerosol transmitted infections and life threating diseases. The biosafety levels 3 and 4 require the waste bin owner to sterilize the waste before it can be picked up.

Biosensors are devices used to detect the presence or concentration of a biological analyte, such as a biomolecule, a biological structure, or a microorganism. Biosensors consist of three parts: a component that recognizes the analyte and produces a signal, a signal transducer, and a reader device. Pathogens are disease-causing microorganisms.

A camera is a component or device for recording visual images in the form of photographs, film, or video signals. Cameras can have an artificial intelligence machine vision sensor with multiple functions, such as waste tracking, waste recognition, line tracking, and so on. The intended use of the camera is to take photos and videos inside or near the waste bin which can be used to refine the waste bin waste fill level data and provide type of waste information. The camera can continually learn new waste objects like paper, containers, food scraps, cardboard boxes, litter, hazardous waste, and so on, even from different angles and in various ranges. The more it learns, the more accurate it is when it is running its neural network algorithm. The camera is part of the waste and litter sensor, which also includes a flash. The camera sends real-time photo and video data files to the cloud server.

A camera serial interface (CSI) is a specification of the Mobile Industry Processor Interface (MIPI) Alliance. It defines an interface between a camera and a single board microcomputer (SBM). The high-speed protocol primarily is intended for point-to-point image and video transmission between cameras and host devices. Usually, it is in the form of a ribbon cable. The camera is connected to the single board microcomputer (SBM) through a CSI cable.

A cloud server can involve deploying groups of remote servers and/or software networks that allow centralized data storage and online access to computer application software or resources. These groups of remote servers and/or software networks can be a collection of remote computing services. A cloud server can contain algorithms, methods, and databases. Smart waste bin sensor device data is sent to the cloud server and stored in a database for further processing and can be accessed by the waste bin mobile application or waste collection facility application.

Clustering is a machine learning technique that involves the grouping of data points. It usually involves the grouping of similar things or people positioned or occurring closely together. For example, waste bins can be clustered based on waste bin type, zip code, location, content type, and so on.

A commercial facility is a business place like an office building, amusement park, medical center, sports stadium, airport, hotel, mall, retail store, car dealer, multifamily housing building, warehouse, storage center, garage, and so on.

A database is a structured set of data held in a computer, especially one that is accessible in various ways. The software computing environment allows for various operations associated with waste bin data. Waste bin data is held in a structured manner in the database. The database includes tables and records for waste bins, collection routes, collection vehicles, litter, pedestrians, waste collection facilities, system administration, external weather data, and so on. Predefined, agile models are created where extra attributes can be added to the existing models. The program logic allows waste bin data definition operations like creating databases, files, groups, tables, views, and so on; data manipulation operations like creating, inserting, reading, updating, deleting data from objects; data control operations like grant, revoke, rollback, commit; and database maintenance operations like backup, restore, and rebuild. The program logic is responsible for getting the waste bin big data and performing standard database relational operations like select, project, join, product, union, intersect, difference, divide, and so on.

A display serial interface (DSI) specifies a high-speed differential signaling point-to-point serial bus. DSI is the hardware in the single board microcomputer. The display serial interface defines a high-speed serial interface between a host processor and a display module. The display serial interface (DSI) standard allows for high-speed communication between LCD screens. DSI supports ultra-high definition such as 4K and 8K required by mobile displays. It specifies the physical link between the chip and display in devices such as smartphones, tablets, and connected cars. The DSI interface can be used to connect a capacitive touch screen to the smart waste bin sensor device to display all the sensor data. It is usually in the form of connectors or ribbon cables. The DSI can be used to connect to the touch screen for testing of the smart waste bin sensor device.

A fill level sensor is an electronic component that can sense and monitor the waste fill levels of the waste bins. The intended use of the fill level sensor is to detect, measure, and monitor waste fill levels in the waste bin. The private waste bin waste fill level value can be used by the owner of the waste bin to dispose of the waste when waste bin is full. The public waste bin waste fill level value can be used by the person to dispose of waste properly in a public waste bin. The waste bin waste fill level value can be used by a waste collection vehicle to empty the waste bin based on a set acceptance criterion. The fill level sensor is used to sense and monitor waste fill levels of waste bins of various shapes and sizes containing all material and liquid types from solid material such as food scraps, trash or garbage, plastic containers, papers, cardboard, yard waste, textiles, glass, to waste oil, lubricants, and hazardous waste. The unit of measurement of the results of the fill level sensor can be a percentage of the largest capacity of the waste bin. The waste fill level is reported in the form of a percentage that runs from 0 to 100. The fill level sensor sends the real-time waste fill level data inside the waste bin to the cloud server. The smart waste bin sensor device installed inside the bottom of the waste bin lid can be programmed to send waste fill level data when the waste bin lid is in a closed position. The smart waste bin sensor device installed outside the waste bin body can be set to provide waste bin sensor null or no data. Camera photos and videos can be used to refine and physically capture the waste bin waste fill level data. The working principle of the fill level sensor can be based on technology such as ultrasonic, infrared, image scanning, and such. The combination of a fill level sensor and a camera allows for measuring the fullness level of the waste bins in terms of volume. The camera takes photos of the waste bin interior with a wide-angle lens. Images are sent directly to the cloud server, where they are automatically analyzed through software to determine the waste bin fullness. This allows for the waste collection vehicle to optimize collection times and anticipate haul schedules.

A gas sensor is an electronic component that can be used to detect the presence or concentration of gases. The sensor has different sensitivities to different types of gases in the ambient air. The intended use of the gas sensor is to detect, measure, and monitor gas types such as reducing gases with low oxidation numbers, such as carbon monoxide (CO), ammonia (NH3), ethanol (C2H5OH), hydrogen (H), methane (CH4), propane (C3H8), and isobutane (C4H10). Oxidizing gases generally provide oxygen, cause, or contribute to the combustion of other material more than air does. They include nitrogen dioxide (NO2), nitrogen oxide (NO), and hydrogen (H). Gases that react to ammonia include hydrogen (H), ethanol (C2H5OH), ammonia (NH3), propane (C3H8), and isobutane (C4H10), either inside or surrounding the waste bin. The waste bin gas type information can be used by the waste collection vehicle or owner to empty the waste bin based on set acceptance criteria. The gas types inside or surrounding the waste bin information can also be used by the waste collection vehicle drivers to take appropriate preventive measures by wearing appropriate personal protective equipment before collecting waste. The gas type can also provide information about potential fire hazards due to the presence of highly flammable gases like methane. Improperly managed waste with harmful gases can serve as a rich source of disease and contribute to global climate change through the generation of greenhouse gases, and even promotes urban violence with the degradation of urban environments. The detection of gas is expressed as a gas type present. The gas sensor sends real-time gas types inside or surrounding the waste bin data to the cloud server. The gas sensor working principle can be based on variation to their electrical resistance or capacitance in response to the concentration of the gas. In the case of electrical resistance type, the concentration of the gas near the sensor produces a corresponding potential difference by changing the resistance of the material inside the sensor, which can be measured as output voltage. Based on this voltage value, the type and concentration of the gas can be estimated. The gas type which the sensor can detect depends on the sensing material present inside the sensor. Gas sensors are typically classified based on the type of the sensing element it is built with (i.e., a metal oxide based gas sensor uses the measurement of change in resistance, a fluorescence gas sensor uses the detection of wavelength change of fluorescence, an optical gas sensor detects gas types based on spectral range, an electrochemical gas sensor is operated based on the diffusion of gas of interest into the sensor, a capacitance-based gas sensor uses changes in the capacitance value to detect gas types, and calorimetric gas sensors and acoustic based gas sensors are based on a change in the resonant frequency). The most common gases found in landfill and waste are methane, carbon dioxide, nitrogen, oxygen, ammonia, hydrogen sulfide, and hydrogen.

General purpose input output pins, also known as GPIO pins, are uncommitted digital signal pins on an integrated circuit or electronic circuit board whose behavior—including whether they act as input or output—is controllable by the user at run time. GPIOs have no predefined purpose and are unused by default. Sensor software drivers are used to map and assign the GPIO to the sensor pinout.

A global positioning system (GPS) is a satellite-based navigation system made up of at least 24 satellites. GPS works in any weather condition, anywhere in the world, 24 hours a day, with no subscription fees or setup charges. A GPS measures elevation below the orbit of the satellites. To convert this to altitude, it subtracts the distance from the center of the earth (i.e., center of the satellites' orbits) from the average sea level. It provides geospatial position data which can be mapped to street addresses and altitudes.

A graphics processing unit (GPU) is a specialized electronic circuit designed to rapidly manipulate and alter memory to accelerate the creation of images in a frame buffer intended for output on a display device. A GPU is one of the components of a system on chip of a single board microcomputer. The GPU accelerates the processing of camera photos and videos for multiple functions, such as waste tracking, waste recognition, line tracking, and such.

A humidity sensor is an electronic component that detects and measures water vapors. The intended use of the humidity sensor is to detect, measure, and monitor the relative humidity inside or surrounding the waste bin. The waste bin humidity value can be used by the waste collection vehicle or the owner of a waste bin to empty the waste bin based on set acceptance criteria. It is very important to pick up waste with high moisture content; otherwise it can also result high microbial activity and could even facilitate growth of pathogens, foul order, unpleasant smell, and infectious diseases. High moisture in waste can cause incomplete combustion for some recyclable waste. The unit of measurement of the results of the humidity sensor can be a percentage of relative humidity surrounding the waste bin. The humidity is reported in the form of a percentage that runs from 0 to 100. The humidity sensor sends real-time humidity data inside or surrounding the waste bin to the cloud server. The moisture and pH of the waste mass are among the main parameters related to biogas generation. The humidity sensor detects the relative humidity of the immediate environments in which it is placed. It measures both the moisture and temperature in the air and expresses relative humidity as a percentage of the ratio of moisture in the air to the maximum amount that can be held in the air at the current temperature. The working principles of the humidity sensor can be based on capacitive humidity sensors, resistive humidity sensors, thermal conductive sensors, and such. A MEMS relative humidity sensor is a differential capacitance type that consists of a layer sensitive to water vapor that is sandwiched between two electrodes acting as capacitor plates. The upper water vapor permeable electrode consists of a grid that allows water vapor to pass into the humidity sensitive polymer layer below which is a backplate electrode, thus altering the capacitance between the two electrodes. The above units are on top of a base substrate. On-chip circuits carry out automatic calibration and signal processing to produce a relative humidity measurement.

Illuminance is the amount of luminous flux per unit area. The unit for the quantity of light flowing from a source in any one second or luminous flux is called the lumen. In a sensor, the unit of measurement is the lux, which is equal to one lumen per square meter.

Landfill is a modern engineered way to deposit waste into the ground and simultaneously protect the environment.

An LED flash is an electronic component device that emits light when charged with electricity. LEDs come in white and many colors, including non-visible light such as infrared and ultraviolet. Bright white LEDs are commonly used for phone camera flashes and LCD display backlights.

Litter is a small piece of rubbish that has been improperly and carelessly disposed of. This includes trash, such as paper, cans, cardboard boxes, food scraps, and plastic bottles.

A Litter Lookout Volunteer is a person who monitors the litter in the neighborhood, and identifies and uploads photos of litter to the waste management system cloud server using the waste bin mobile app.

A location sensor is an electronic component that can determine and monitor the geospatial position which includes latitude, longitude, and altitude, or the street location of an object, and provide internet access. The intended use of the location sensor is to determine the geospatial location of a waste bin and provide internet access to a smart waste bin sensor device. The information can also include time and other data. The waste bin fill location value can be used by the waste collection facility vehicle to either skip or make a stop to pick up waste from the waste bin based on set acceptance criteria. It can consist of global positioning system (GPS) receivers and cellular adapter elements. The location sensor working principle can be based on GPS and cellular network internet connectivity. The GPS is a satellite-based navigation system that provides geolocation and time information to a GPS receiver anywhere on or near the Earth where there is an unobstructed line of sight to four or more GPS satellites. The GPS part of location sensors are receivers with antennas that use a satellite-based navigation system with a network of satellites in orbit around the Earth to provide position, velocity, and timing information. A cellular adapter part of the location sensor enables cellular internet connectivity. The location sensor sends real-time data to the cloud server. The waste bin location information can be used by the owner to detect the geospatial location of a waste bin and access a smart waste bin sensor device via a cellular network. The public waste bin location can be used by the user to dispose of waste properly in an available public waste bin.

Machine learning can be a method of data analysis that automates analytical model building. Machine learning is a branch of artificial intelligence that uses statistical techniques to give computer systems the ability to learn from data, without being explicitly programmed. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Historical user data sets of other user data that are like the user, etc., can be used as training data sets. Machine learning, along with neural network algorithms, can continually learn to recognize new waste objects like paper, containers, food scraps, cardboard boxes, litter, hazardous waste, and such, from different angles and in various ranges from the photos and videos taken by the camera. It can also learn and predict when the waste bin will be full. The more it learns, the more accurate the prediction, thereby increasing the waste collection operational efficiency and reducing the cost to pick up waste.

Methane is a gas byproduct generated through the natural decomposition of solid waste in landfills. Methane is odorless and a flammable gas. When present in very high concentrations, it can be potentially explosive. Methane is nonreactive and not harmful to human health, but if there is excess methane in a room and it displaces the oxygen, one could die from suffocation. The waste bin should be emptied immediately if waste generates excessive methane gas.

A method can be a particular procedure for accomplishing a task or activity. Smart waste bin sensor devices, various other sensors, and software computing the environment use methods and algorithms to set specific waste collection acceptance criteria to dispose of waste and litter. A method can implement many algorithms. Smart waste bin sensor devices can have sensor methods to implement, operate, calculate, and monitor waste. Software computing environments can contain waste collection system methods and real-time waste collection operating methods.

Micro-electromechanical systems (MEMS) devices contain tiny integrated devices or systems that combine mechanical and electrical components. They are fabricated using integrated circuit (IC) batch processing techniques and can range in size from a few micrometers to millimeters. MEMS devices combine small mechanical and electronic components on a silicon chip. The fabrication techniques used for creating transistors, interconnects, and other components on an integrated circuit (IC) can also be used to construct mechanical components such as springs, deformable membranes, vibrating structures, valves, gears, and levers. This technology can be used to make a variety of sensors such as fill level, location, temperature, humidity, pressure, air quality, smoke, gas, ambient light, RFID tag, and motion. It enables the combination of accurate sensors, powerful processing, and wireless communication (for example, WiFi or Bluetooth) on a single IC. Large numbers of devices can be made at the same time, so they benefit from the same scaling advantages and cost efficiencies as traditional ICs. MEMS based sensors allow for the manufacturing of compact and power efficient smart waste bin sensor devices.

A microphone is a device that converts the air pressure variations of a sound wave to an electrical signal. The waste bin microphone and speaker allow users near the waste bin two-way communication with a person on the mobile device through the waste bin mobile application or waste collection facility application.

A microprocessor is an integrated circuit that contains all the functions of a central processing unit of a computer.

A middleware stack is software that lies between an operating system and the applications running on it. A middleware stack functions as a hidden translation layer and enables communication and data management for distributed applications. It connects two applications together so data and databases can be easily passed between them. For example, middleware allows users to perform such requests, allowing the web server to return dynamic web pages based on a user's profile, or submitting forms on a web browser. The waste bin mobile application and waste collection facility application dynamic web pages' interface with middleware stack to send and fetch the data and display it on the web browser.

A model can be a system or thing or procedure or a proposed structure used as an example to follow. Models are created for methods like clusters based on waste bin routes, waste types, and zip codes. Models are also created for the waste bin database structure to contain all the waste bin information.

A motion sensor is an electronic component that utilizes a sensor to detect nearby motion. The intended use of the motion sensor is to detect, measure, and monitor motion events inside or surrounding the waste bin. The most common type of active motion detector uses ultrasonic sensor technology; these motion sensors emit sound waves to detect the presence of objects. A passive infrared sensor detects the motion of a body in front of it. A motion sensor sets the smart waste bin sensor device into an active state when it detects motion inside or near the waste bin.

A pathogen biosensor is an electronic component that utilizes optical, acoustic, and magnetic biosensors to detect and kill pathogens. The intended use of the pathogen biosensor is to detect, measure, and monitor pathogen types and levels, and kill pathogens inside or surrounding the waste bin. Pathogens of all classes must have mechanisms for entering their host and for evading immediate destruction by the host immune system. Pathogens that are most contagious and cause the most severe symptoms are SARS-CoV-2, *E. coli*, Hepatitis A, Nontyphoidal *Salmonella, Norovirus, Shigella*, and *Salmonella typhi*. The pathogens can be bacteria, fungi, viruses, and so on. Bacteria are microorganisms made of a single cell, and those that cause infections are called pathogenic bacteria. Common bacterial infections are as follows: a) Strep throat caused by pathogenic Group A *Streptococcus*. b) Urinary tract infection usually caused by *Escherichia coli*. c) Food poisoning caused by Norovirus and *Salmonella*. d) Tuberculosis, a serious infectious disease that affects lungs and is caused by *Mycobacterium tuberculosis*. e) Lyme disease caused by *Borrelia burgdorfer*. It is transmitted to humans through the bite of infected blacklegged ticks. Typical symptoms include fever, headache, fatigue, and a characteristic skin rash called erythema migrans. The average size of most bacteria is between 0.2 and 5.0 micrometer (diameter). A fungus is any member of the group of eukaryotic organisms which includes yeasts, rusts, smuts, mildews, molds, and mushrooms. Only a few of the fungi cause sickness and infection. Common fungal infections are as follows: a) Ringworm, which is a contagious fungal infection caused by common mold-like parasites that live on the cells in the outer layer of the skin. b) Fungal nail infections and athlete's foot (tinea pedis), a fungal infection that usually begins between the toes caused by dermatophytes. c) Mouth, throat, esophagus, and vaginal yeast infections caused by the yeast *Candida*. Most microscopic or smaller fungi are 2 to 10 micrometers. Viruses are made up of a piece of genetic code, such as DNA or RNA, and protected by a coating of protein. Viral infection can be as follows: a) COVID-19 disease. The SARS-CoV-2 virus belongs to the same large family of viruses as SARS-CoV, known as coronaviruses, and results in severe acute respiratory syndrome. This normally happens because of poor handwashing or from consuming contaminated food or water. Common symptoms include fever, dry cough, and shortness of breath, and the disease can progress to pneumonia in severe cases. b) Flu is caused by influenza viruses that infect the nose, throat, and lungs. These viruses spread when people with flu cough, sneeze, or talk, sending droplets with the virus into the air and potentially into the mouths or noses of people who are nearby. c) Dengue is a mosquito-borne viral infection causing a severe flu-like illness. d) Ebola virus causes fatigue, fever, and muscle pain. e) Rabies virus transmitted through the infected animal saliva causes brain damage. f) HIV (human immunodeficiency virus) is a virus that attacks cells that help the body fight infection, making a person more vulnerable to other infections and disease. g) Rotavirus infection usually spreads from fecal-oral contact due to poor sanitation and causes diarrhea. h) Marburg virus causes hemorrhagic fever, meaning that infected people develop high fevers and bleeding throughout the body that can lead to shock, organ failure, and death. Most viruses vary in diameter from 5 to 300 nanometers. The biohazards associated with different pathogen types can be reported in the form of biosafety level. The biosafety level allows the waste owner, waste collection vehicle driver, and operator to take appropriate preventive measures before disposing of the waste. The pathogen biosensor optical working principle detection involves analysis of the reflection pattern of incident laser light from the outer surface of the pathogen. The transmitter transmits light energy of a certain wavelength. Some of the light penetrates the body of the pathogen and is transmitted or absorbed by the pathogen. The reflected light received by the receiver has a unique spectral mapping signature wavelength of a given pathogen. The method used can be LSPR, localized surface plasmon resonance, or SERS, surface-enhanced Raman scattering. Pathogen biosensor optical sensing allow easy-to-use, rapid, portable, multiplexed, and cost-effective detection of pathogens in waste. The pathogens are killed or sterilized by the safe antimicrobial electromagnetic radiation element of the pathogen biosensor. The electromagnetic radiation destroys the pathogen cell covering, protein, or nucleic acids by killing or inactivating the pathogens. The radiation suitable for waste sterilization can be ionizing or nonionizing radiation. The nonionizing radiation to kill pathogens using ultraviolet light is more suitable for home waste bins. The pathogen biosensor ultrasound working principle detection involves analysis of a high-resolution imaging technique that uses sound waves to detect pathogens. The transmitter transmits ultrasound of a certain wavelength. The reflected ultrasound received by the receiver has a unique ultrasound image of a given pathogen. The method used is interaction of sound waves with the pathogen to produce a signature image of the pathogen. Pathogen biosensor ultrasound sensing allows easy-to-use, rapid, portable, multiplexed, and cost-effective detection of pathogens in waste. The pathogens are killed or sterilized by the safe antimicrobial ultrasound element of the pathogen biosensor. The high frequency sound suitable for waste sterilization is used for cell disruption to kill pathogens.

A pedestrian is a person walking along a road or trail, or some pathway. A pedestrian can take litter photos and videos and upload them using the waste bin mobile app. According to the number of photos and videos taken, uploaded, and disposed, the pedestrian may gain recognition reward points.

Physical working principles of sensing is a mechanism to convert nonelectrical effects into electrical signals. The principle of sensing can be based on capacitance, magnetism, induction, resistance, piezoelectric effect, pyroelectric effect, thermoelectric effect, sound waves, temperature and thermal properties of materials, heat transfers, and so on.

A postal code, also known as a postcode, post code, PIN, or zip code, is a series of letters or digits or both, sometimes including spaces or punctuation, included in a postal address for the purpose of sorting mail. For example, in the US it is known as a zip code, a group of five or nine numbers that are added to a postal address to assist the sorting of mail. Zip codes are used for real estate property information. Waste bin clusters can be created based on zip codes, facility type, waste bin type, waste content type, waste fill level status, volume, weight, and other smart waste bin sensor device data.

A pressure sensor is an electronic component that can be used to measure atmospheric or air pressure in environments. The intended use of the pressure sensor is to detect, measure, and monitor air pressure or simply pressure inside or surrounding the waste bin. The waste bin air pressure value can be used by a waste collection vehicle to empty the waste bin based on set acceptance criteria. The unit of measurement of pressure is reported in pascal units, or in short, kilo pascal (kPa). The pressure sensor sends real-time waste bin pressure data inside or surrounding the waste bin to the cloud server. In older days, mercury and aneroid barometers were used to measure the pressure. The working principle of a pressure sensor can use membranes, thin plates, piezo resistive sensors, capacitive sensors, optoelectronic pressure sensors, and so on. The modern-day barometer uses MEMS technology, making it capable of measuring atmospheric pressure in a small and flexible structure. The pressure sensor sends real-time data to the cloud server. The landfill and waste bin methane and other gas emissions are strongly dependent on changes in barometric pressure; the rising barometric pressure suppresses the emission while falling the barometric pressure enhances the emission, a phenomenon called barometric pumping. Lower pressure will result in more gas seeping out from landfills and waste bins, and into the air.

A private facility is a place like a residential home, apartment, townhome, and multi-family unit. Private waste bin clusters can be created to pick up waste from waste bins of similar size, type, and content using waste collection vehicles meant for residential waste pickup.

Program logic is instructions in a program arranged in a prescribed order to solve a problem, usually a user request through application software. Program logic can receive the sensor data from smart waste bin sensor devices and store it into the database of the cloud server. It can also receive data and instructions from the waste bin mobile application and waste collection facility application and process them. It can send the performance data to the waste collection facility application. It can branch off and execute various methods and algorithms.

A public facility is a place like parks, streets, public squares, schools, public libraries, rest stops, beaches, and waste collection facility sites. Public waste bin clusters can be created to pick up waste from waste bins of similar size, type, and content using waste collection vehicles meant for public facility waste pickup. Usually, the waste bins at the public places are of different sizes.

RAM (random access memory) is the hardware in a single board microcomputer (SBM) where the operating system (OS), application programs, and sensors data in current use are kept so they can be quickly reached by the device's processor. RAM is the main memory in a computer, and it is much faster to read from and write to than other kinds of storage such as a hard disk drive (HDD), solid-state drive (SSD), or secure digital card (SDC). The smart waste bin sensor device SBM uses RAM to temporarily store the operating system software and sensor data.

Radio frequency identification (RFID) is a form of wireless communication that incorporates the use of electromagnetic fields in the radio frequency portion of the electromagnetic spectrum to uniquely identify an object.

A radio frequency identification tag sensor (RFID tag sensor) is an electronic tag or identification that exchanges data with an RFID reader and writer through radio waves. An RFID tag is also known as an RFID chip. The intended use of the RFID tag sensor is to detect and send RFID digital data of the waste bin. The RFID tag sensor can be passive or active. Passive RFID tag sensors have no power of their own and are powered by the radio frequency energy transmitted from RFID readers and writer antennas. The signal sent by the reader and writer is used to power on the tag and reflect the energy back to the reader. Active RFID tag sensors use battery power that continuously broadcasts its own signal. Active tags provide a much longer read range than passive tags. Smart waste bin sensor devices use active RFID tag sensors. RFID tag memory is split into three: unique tag identifier (TID) memory, electronic product code (EPC) memory, and user memory. Every smart waste bin sensor device has a unique tag identifier. The electronic product code can be waste bin type, content type, and so on. The user memory can be the zip code. There can be additional writeable memory locations called the access password and kill password. The access password can be used to prevent people from reconfiguring waste bin tags. The kill password is used to disable a waste bin tag permanently and irrevocably. This can be done if a waste bin is damaged or broken.

A radio frequency identification reader and writer (RFID reader) is a device used to gather information from an RFID tag, which is used to track individual objects. The device is used to write new RFID tag information. Waste collection vehicles are equipped with RFID readers and writers to read the smart waste bin sensor device RFID tag sensor electronic data when the waste is picked up.

A resident is a person who lives somewhere permanently or on a long-term basis and has registered waste bin(s) with smart waste bin sensor devices.

Resolution is the least count or smallest detectable change in the physical quantity, property, or condition being measured.

A route is a specifically directed course that a waste collection vehicle driver follows that has been designed for efficiency and to provide optimal waste collection service to the customers.

A secure digital card (SDC) is a tiny flash memory card designed for high-capacity memory and various portable devices such as car navigation systems, cellular phones, e-books, PDAs, smartphones, digital cameras, music players, digital video camcorders, and single board microcomputers. An SDC is used in a single board microcomputer to install smart waste bin sensor device operating software, software compilers, utilities, and sensor software drivers.

A sensor can be a module or electronic component or device that receives a stimulus or input such as quantity, property, or condition and responds with an electrical signal. It acquires a physical quantity, property, or condition and converts it into a signal suitable for processing (e.g., optical, electrical, mechanical). The intended use of the sensor is to detect and respond to some type of stimulus or input from the physical environment or motion. The stimulus or specific input can be waste bin waste fill level, geospatial position, temperature, humidity, pressure, air quality, smoke, gas, ambient light, motion event, RFID tag sensor, or any one of a great number of other environmental phenomena. The output is generally a signal that is converted to a human-readable display at the sensor location or transmitted electronically over a network to the cloud server for reading or further processing. A sensor in general is intended to detect, measure, and monitor input. Sensors are classified in several different ways. Sensors can be classified based on external excitation signals, or a power signal as an active or passive sensor. Active sensors are those which require an external excitation signal or power signal. Passive sensors, on the other hand, do not require any external power signal and directly generate output responses. The next classification is based on physical principles of sensing conversion phenomena, i.e., the input and the output. Some common conversion phenomena are capacitance, magnetism, induction, resistance, photoelectric, piezoelectric effect, thermoelectric effect, sound waves, thermal properties of materials, heat transfer, electrochemical, electromagnetic, and such. Sensors can also be classified based on output signal types, namely analog or digital sensors. An analog sensor is a sensor that outputs a signal that is continuous in both magnitude and space. A digital sensor is a sensor that outputs a signal that is discrete in time and/or magnitude. Smart waste bin sensor devices can use any of the above sensor types which are accurate, reliable, and robust.

A single board microcomputer is a complete computer built on a single board with central processing unit, memory, Wi-Fi/Bluetooth, accelerometer, microphone, speaker, general purpose input/output, ports, power supply, and other features required of a functional computer. Smart waste bin sensor device sensors are either built in or connected to a single board microcomputer using general purpose input/output pins.

A software library is a collection of non-volatile resources used by computer programs, often for application software development. These may include configuration data, documentation, help data, message templates, pre-written code and subroutines such as math, network, internet and so on, classes, values, or type specifications. In single board microcomputers, the software library can include the board configuration data, peripheral interfaces, and general purpose input/output pinout configurations.

Solid waste is garbage from non-industrial sources, such as residential homes, restaurants, retail centers, and office buildings. It can include paper, discarded food items, plastics, and other general discarded items.

Smoke is a visible suspension of carbon or other particles in air, typically emitted from a burning substance. Smoke is a collection of tiny solid, liquid and gas particles. Although smoke can contain hundreds of different chemicals and fumes, visible smoke is mostly carbon (soot), tar, oils, and ash. Smoke occurs when there is incomplete combustion (not enough oxygen to burn the fuel completely). Smoke can contain carbon dioxide, carbon monoxide, nitrogen oxide, and particulate matter. Particulate matter is a complex mixture of small solid or tar (liquid) particles. The size, shape, density, and other physical properties are highly variable, but the individual particles are too small to be seen with the naked eye.

A smoke sensor is an electronic component that can be used to detect the presence or concentration of smoke. The intended use of the smoke sensor is to detect, measure, and monitor smoke inside or surrounding the waste bin. A smoke sensor is usually used to detect the presence or concentration of smoke surrounding the waste bin. The waste bin smoke value can be used by the waste collection vehicle or owner of the waste bin to empty the waste bin based on set acceptance criteria. The smoke sensor information can also be used to take appropriate preventive measures so that waste does not catch fire during high temperature days. The smoke value is critical for the early detection of a fire and could mean the difference between life and death. In a fire, smoke and deadly gases tend to spread farther and faster than heat. Inhaling smoke for a short amount of time can cause immediate (acute) effects, especially during hot summer days. A waste bin with a waste bin sensor monitor placed in a forest or isolated areas can provide early warning and location of the fire. Smoke is irritating to the eyes, nose, and throat, and its odor may be nauseating. Exposure to heavy smoke causes temporary changes in lung function, which makes breathing more difficult. Real-time smoke sensing is important for fire detection and industrial production to detect problems in time and protect personnel safety. The unit of measurement of smoke is usually parts per million, which can be reported as smoke value such as 1 (white), 2 (slightly grey), 3 (grey), 4 (dark grey), and 5 (black) based on the opacity of the smoke. The smoke sensor sends real-time smoke data to the cloud server. The smoke sensor working principle can be based on any of the commonly used technologies like metal oxide semiconductor (MOS), also known as chemiresistors, optical scattering, filter/dilution tunnel, ringelmann scale, and interference from carbon monoxide which is incompletely burned carbon, and so on.

A software driver is a type of software program that controls a hardware device. The smart waste bin sensor device software driver is used to control the sensor hardware through a single board microcomputer. The software drivers tell the single board microcomputer what type of sensor is connected, what it can do, and how to communicate with it from other software on the single board microcomputer, including the operating system.

The software graphical user interface is a user interface that includes graphical elements, such as windows, icons, buttons, menus, tabs, and pointers, which allow users to interact with electronic software and devices. A waste bin mobile application or waste collection facility application software graphical user interface offers visual representations of the available commands and functions of an operating system or software program. The commands and functions can be methods and algorithms. These visual representations consist of elements like windows, icons, buttons, menus, tabs, and pointers.

Speakers are transducers that convert electromagnetic waves into sound waves. The waste bin microphone and speaker allow a person near the waste bin two-way communication with the person on the mobile device through the waste bin mobile application or waste collection facility application.

A system on Chip (SoC) is an integrated circuit that integrates most of the components of the single board microcomputer (SBM). The components include a central processing unit (CPU), graphical processing unit (GPU), memory input/output ports, and secondary storage, all on a single substrate or microchip.

A temperature sensor is an electronic component that measures the temperature of its environment and converts the input data into electronic data to record, monitor, or signal temperature change. The intended use of the temperature sensor is to detect, measure, and monitor temperature inside or surrounding the waste bin. The waste bin temperature value can be used by the waste collection vehicle or owner to empty the waste bin based on set acceptance criteria. The temperature value can also be used to take appropriate preventive measures so that waste does not rot and produce highly flammable gas like methane, ammonia, nitrogen, sulfur dioxide, and such. Temperature units of measurement are usually Celsius and Fahrenheit. The temperature of the waste bin can be reported in the form Celsius or Fahrenheit. The temperature sensor sends real-time temperature data to the cloud server. The temperature sensor working principle can be based on any of the four commonly used temperature sensor types such as: 1) Thermocouple, which is made from two dissimilar metals that generate electrical voltage in direct proportion to changes in temperature, 2) Resistance temperature detector (RTD), which measures temperature by correlating the resistance of the RTD element with temperature, 3) Negative temperature coefficient (NTC) thermistor, consisting of a thermally sensitive resistor that exhibits a large, predictable, and precise change in resistance correlated to variations in temperature, and 4) Semiconductor-based MEMS sensors placed on integrated circuits (ICs). These sensors are effectively two identical diodes with temperature-sensitive voltage vs current characteristics that can be used to monitor changes in temperature.

A trash picker or grabber is a tool consisting of an arm to increase the range of a person's reach when grabbing objects. A trash picker can be used by a pedestrian or litter lookout volunteer to pick litter and dispose it in the available waste bin.

A transfer station is a facility that includes a large pad where residential and commercial collection vehicles empty the contents of their trucks. Other machinery (e.g., bulldozers) is then used to push the garbage into long-haul trailers for transport to a disposal facility.

Waste is a material discarded as no longer useful or required. It can be liquid, solid, organic, recyclable, and hazardous waste.

A waste and litter sensor consists of a camera and flash. The intended use of the waste and litter sensor is to take photos and videos of the waste inside the waste bin, measure, and monitor waste volume when the smart waste bin sensor device is installed inside the bottom of the waste bin lid. For example, infrared light can be used to take photos. The waste volume measurement working principle involves taking pictures and videos of the waste inside the waste bin at a set frequency and producing a 3-dimensional (3D) depth map of the waste bin content to further refine the waste bin waste fill level value, and also provide type of waste paper, container, food scraps, cardboard boxes, litter, biohazardous waste, and related information. The waste and litter sensor's intended use is also to take litter and waste photos and videos surrounding the waste bin, measure, and monitor the litter level when the smart waste bin sensor device is installed outside the waste bin body of the waste bin. The litter level measurement working principle involves measuring the density of litter surrounding the waste bin and assigning the litter level value based on a camera machine vision algorithm and neural net algorithm.

A waste bin is a bin or container that holds waste or rubbish until it is collected and can have smart waste bin sensor devices installed inside and/or outside the waste bin body. A waste bin sensor can be installed inside the bottom of the waste bin lid or the bottom or top portion of the waste bin. Smart waste bin sensor devices can be installed outside the waste bin body. The outside installation can be at any part of the waste bin body. Waste bins can have one or more smart waste bin sensor devices installed. In this case, when more than one smart waste bin sensor device is installed in a single waste bin, each one of them can be uniquely identified using an RFID tag sensor. Smart waste bin sensor devices installed inside the bottom of the waste bin lid can be used for detecting, measuring, and monitoring of the waste bin waste fill level in addition to other sensor data. Smart waste bin sensor devices installed outside the waste bin body can be used for detecting, quantifying, and monitoring the litter surrounding the waste bin in addition to other sensor data.

A smart waste bin sensor device is a device that identifies data about a waste bin such as waste bin UDI, RFID tag, name, bin type, content type, bin photo, length, width, height, bin weight, volume capacity, facility type, location place, installation date, current date, current time, waste weight, waste fill level, geospatial position, temperature, humidity, pressure, air quality, smoke, gas type, ambient light, motion event, and litter level, plus other sets of waste bin attributes. A smart waste bin sensor device can be installed to a waste bin, and the intended use is to detect, measure, and monitor sensor data inside or surrounding a waste bin placed at a private, public, or commercial place.

A waste bin mobile application is a computer program or software application designed to run on a mobile device such as a phone, tablet, or watch, to set up a smart waste bin sensor device, access the private waste bin's sensor data and public waste bin's location, and waste fill level.

Waste collection is the collection of waste from point of production like private, commercial, and public places to a location of treatment or disposal.

A waste collection operator is a person who monitors sanitation waste collection vehicles and performs waste collection and disposal work for private (residential), public, or commercial routes.

A waste collection facility is a site responsible for collecting the waste from waste bins at private, commercial, and public places.

A waste collection facility application is a collection of computer programs and related data designed to perform waste bin sensor monitor data analysis and evaluation, assign and send waste collection vehicles to pick up waste from waste bins, and waste management system performance data monitoring, trending, and reporting for end users like waste collection operators and waste collection vehicle drivers. The waste collection facility application can have algorithms and methods like a waste collection system method, real-time waste collection system operating method, and such.

A waste collection vehicle or garbage truck refers to a truck specially designed to collect solid and other waste and haul the collected waste to a waste treatment facility for recycling or deposit in a landfill. The waste collection vehicle types can be front loader, rear loader, side loader, pneumatic, grapple trucks, and so on.

A waste collection vehicle driver refers to a person who drives the waste collection vehicle to pick up waste from private, commercial, and public waste bins.

A waste picker is a person who acquires reusable and recyclable materials thrown away by others to sell or for personal consumption.

Wi-Fi is a family of wireless networking technologies, allowing computers, smartphones, or other devices to connect to the internet or communicate with one another wirelessly within a particular area. The waste bin mobile application allows users to access the smart waste bin sensor device data through Wi-Fi. Wi-Fi can also be used to connect other sensor devices like external pressure strains, weight scale, weight sensor, load cell, rooftop rain and wind weather stations, and such.

A weight sensor or load cell is a transducer. The intended use of the weight sensor is to detect, measure, and monitor the weight of waste inside the waste bin. The weight of the waste bin can be reported in the form of kilogram or pound. The weight sensor sends real-time weight data to the cloud server. The working principle of the weight sensor depends on the conversion of a load into an electronic signal. The signal can be a change in voltage or current based on the load. The weight sensor detects changes within a physical stimulus like force, pressure, or weight and produces an output that is comparative to the physical stimulus. So, for a specific stable waste or rubbish weight or load, this sensor provides an output value that is comparative to the weight's magnitude. Waste weight and waste volume are very important measurements for the waste collection vehicle driver. Typically, the waste collection facility uses the standard waste volume to weigh conversion factors for materials like aluminum cans, appliances, automotive, carpets, electronics, food scraps, glass, mixed paper, metals, plastic, textiles, yard trimmings, and such, which are not accurate, but rather estimated weight. Usually, the waste bins or containers are of standard sizes with designated allowable volume and weight. At times, the weight of the waste might exceed capacity due to the dumping of concrete, heavy industrial metals, and so on, which will not allow the waste collection vehicle to pick up the waste. Monitoring of the waste weight also can prevent exceeding the weight limitation of the waste bin, or possibly causing damage to the waste bin. Waste bin weight data can be recorded at the time of waste pickup by the waste collection vehicle, allowing for accurate aggregate waste weight from all the waste bins from which waste was picked up. Waste bin waste weight data can be used by the waste collection operator and waste collection facility to track and trend the amount of waste generated for performance management processes.

A universal serial bus (USB) is a common interface that enables communication between devices and a single board microcomputer. A USB is a type of computer port that can be used to connect to items such as a keyboard, mouse, and camera. In the case of smart waste bin sensor devices, it can be used to connect to other sensors like weight, wind, and rain. There are several types of USB such as A, B, C, Mini-USB, and Micro-USB. The single board microcomputer is compatible with various types of USB.

Exemplary Systems and Methods

FIG. 1-65 illustrates an example waste management system 100, according to some embodiments.

FIG. 1 illustrates an overall waste management system 100 to continuously monitor waste bins 600 to optimize waste collection and reduce littering, according to some embodiments.

A waste management system 100 street map 102 comprises various elements such as one or more smart waste bin sensor devices 300 installed on the waste bin 600 located at various private, public and commercial places, a waste bin owner 104, a pedestrian 106, litter 108, a waste bin mobile application 110, a waste collection facility application 112, and a cloud server 114. The waste recycling facility 116 comprises one or more waste collection operators 118, a set of waste collection vehicles 120, and a waste collection facility 122.

FIG. 1 illustrates a waste management system 100 which comprises:

A waste bin 600 storing waste 650, wherein the waste bin 600 comprises a smart waste bin sensor device 300 installed on the waste bin 600 of a waste bin owner 104, wherein the smart waste bin sensor device 300 comprises a set of sensors 302-322 and 808, wherein the set of sensors 302-322 and 808 sends and receives signals through a wireless network to a cloud server 114. Weight sensor 4710 installed inside the bottom of the waste bin 600 also sends and receives signals through the wireless network to the smart waste bin sensor device 300 and the cloud server 114.

A waste bin mobile application 110, wherein the waste bin mobile application 110 comprises a set of functionalities to setup, control, and display data results of the smart waste bin sensor device 300. The setup functionality allows waste bin mobile application 110 to send and receive the data from smart waste bin sensor device 300. The control functionality allows to set sensor 302-322 and 808 settings. The display data results functionality displays the waste bin 600 sensor data.

A waste collection facility application 112, wherein the waste collection facility application 112 comprises a set of functionalities to monitor waste management system performance, display waste collection routes, and service the waste bin 600. The waste management system performance consists of waste bins 600 fill level status summary, routes waste volume, pathogen hotspots and so on. The real time street view map consists of waste collection routes waste bins clusters. The service functionality allows the waste bin vehicle 120 to collect waste 650 and litter 108.

A waste recycling facility 116, wherein the waste recycling facility comprises a set of waste collection operators 118, a set of waste collection vehicles 120, and a waste collection facility 122.

A neighborhood public biohazardous waste alert, wherein the neighborhood public biohazardous waste alert is sent to the waste bin mobile application 110 installed on a mobile device of the waste bin owner 104 within specified distance of the waste bin 600 in which a biohazardous waste level is above a predetermined threshold level.

The neighborhood public biohazardous waste alert can be a text alert sent to a nearby waste bin owner's 104 waste bin mobile application 110, when the biohazardous waste level, for instance, is equal to 3 and above, indicating that there is biohazardous waste nearby which can result in injury through release of chemicals or substances in harmful amounts whereat that location. Some of the toxic chemicals released in air can be odorless. The text alert can recommend waste bin owners 104 evacuate or stay indoors, and so on.

A neighborhood public biosafety alert, wherein the neighborhood public biosafety alert is sent to the waste bin mobile application 110 installed on the mobile device of the waste bin owner 104 within a specified distance of the waste bin 600 in which a biosafety level is above a predetermined threshold level.

The neighborhood public biosafety alert can also be a text alert sent to a nearby waste bin owner's 104 waste bin mobile application 110 when the biosafety level, for instance, is equal to 3 and above, indicating that there is pathogenic waste nearby which can result in disease outbreak through release of pathogens. These pathogens may spread through non-living objects like waste to a person, or the air breathed can be loaded with pathogens. The text alert can recommend waste bin owners 104 evacuate or stay indoors, and so on. Common pathogenic bacteria found in the air in and around the home are *Staphylococcus, Pseudomonas*, Parasitic *Bacillus*, and *Francisella tularensis*, a naturally occurring bacterium that causes tularemia, also known as rabbit fever, in harmful amounts. Many common viral infections can spread by airborne transmission at least in some cases, including but not limited to COVID-19, Measles Morbillivirus, Chickenpox Virus, *Mycobacterium tuberculosis*, Influenza Virus, Enterovirus, and Norovirus. Airborne fungi are also responsible for many fungal infections in humans. Some of the infectious fungi are *Aspergillus fumigatus, Blastomyces dermatitidis, Cryptococcus neoformans, Histoplasma capsulatum*, and so on.

It is possible to integrate the neighborhood public biosafety alert and neighborhood public biosafety alert to be sent to mobile devices of all nearby residents in the form of public safety alerts to quickly and effectively alert the nearby residents to serious emergencies.

The cloud server 114 comprises a cloud sever memory, wherein the cloud server memory comprises a waste bin model, wherein the waste bin model comprises a set of waste bin attributes. The set of waste bin attributes comprises a waste bin UDI, a name, a bin type, a content type, a bin photo, a length, a width, a height, a bin weight, a volume capacity, a facility type, an installation date, a current date and time, an RFID tag, a geospatial position, an altitude, a waste fill level, a temperature, a humidity, a pressure, an air quality index, a smoke level, a gas type, an ambient light level, a motion event, a tilt position, a waste weight, a waste type, a litter type, a litter level, a biohazardous waste type, a biohazardous waste level, a pathogen type, a pathogen level, and so on.

The cloud server 114 creates with a signal from the set of sensors a set of waste bin statistics for the waste bin 600, wherein the cloud server 114 uses the set of waste bin statistics to generate an optimal strategy for a real-time waste collection service of the waste bin 600 by the waste collection vehicle 120 to reduce the operating cost.

The optimal strategy can be achieved using linear programming methods which involves a process called optimization.

The waste recycling facility 116 costs consists of fixed and variable cost. The fixed costs are facility, land acquisition, permitting, employee payroll and so on. The variable operating costs are associated with waste collection service, waste collection vehicle, utilization of drivers, operation of transfer station, transfer of waste from transfer stations to waste management facilities and so on. The reduction in operating cost can be achieved through minimizing the waste collection service cost and maximizing the utilization of waste collection vehicle 120 and drivers. The waste collection service operating cost is collection of the waste 650 from the waste bin 600.

Figure 2:
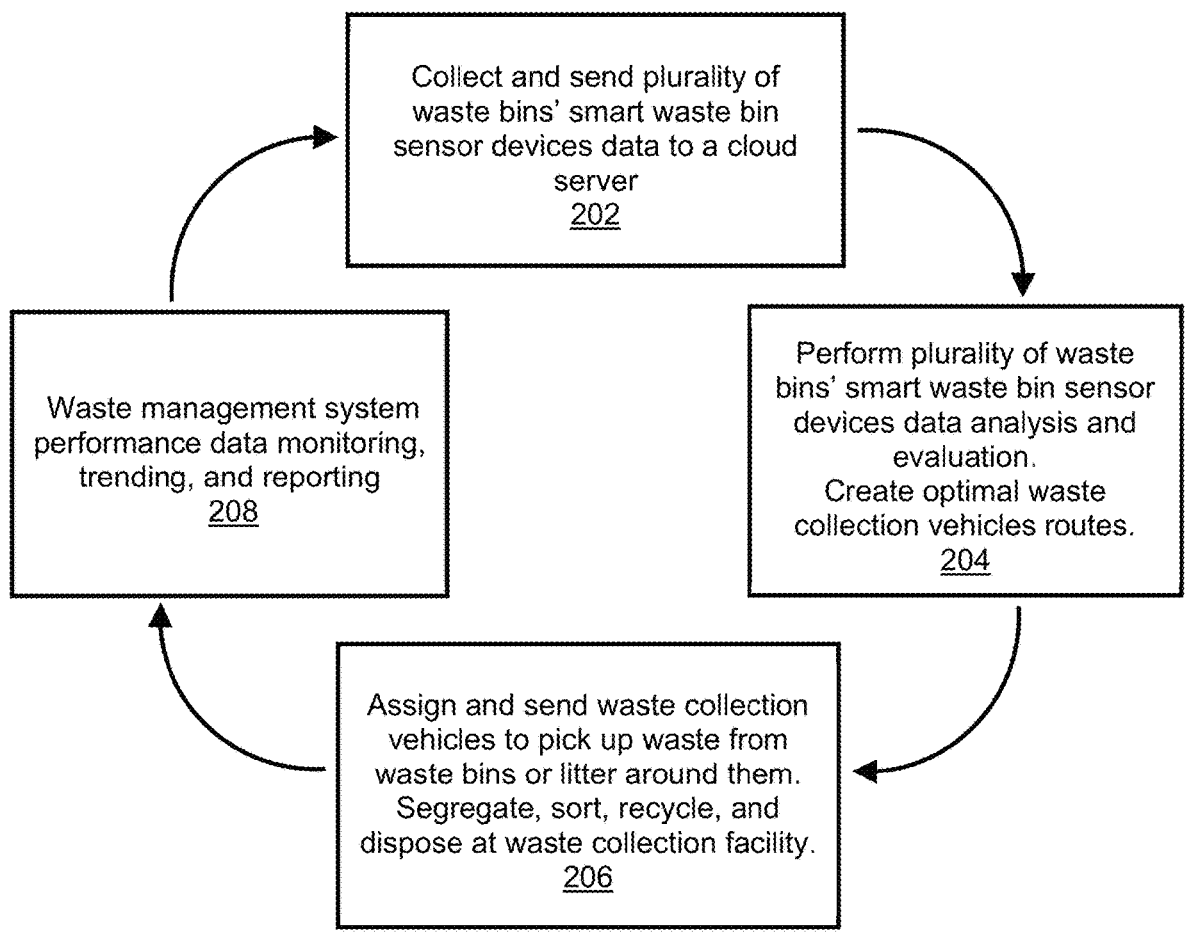
FIG. 2 depicts a waste management system application workflow that can be configured to perform any computations to optimize waste collection, according to some embodiments.

FIG. 2 depicts a waste management system application workflow 200 that can be configured to perform any computations to optimize waste collection, according to some embodiments.

In the first processing step 202 of the application workflow, the process can collect and send a plurality of waste bins' 600 smart waste bin sensor devices 300 data to a cloud server 114. In the second processing step 204 of the application workflow, the process can perform waste bins' 600 smart waste bin sensor devices 300 data analysis and evaluation. It also creates an optimal waste collection vehicle 120 route. In the processing third step 206 of the application workflow, the process can assign and send waste collection vehicles 120 to pick up waste from waste bins 600 or litter 108 around them. The waste is segregated, sorted, recycled, and disposed at waste collection facility 122. In the final processing step 208 of the application workflow, the process can provide waste management system performance data monitoring, trending, and reporting.

Various optimization methodologies can be implemented herein. For example, machine-learning techniques can be used for optimization processes to reduce the number of operators, vehicles, route collection frequency, placement of waste bins 600 in public places, and so on.

Figure 3:
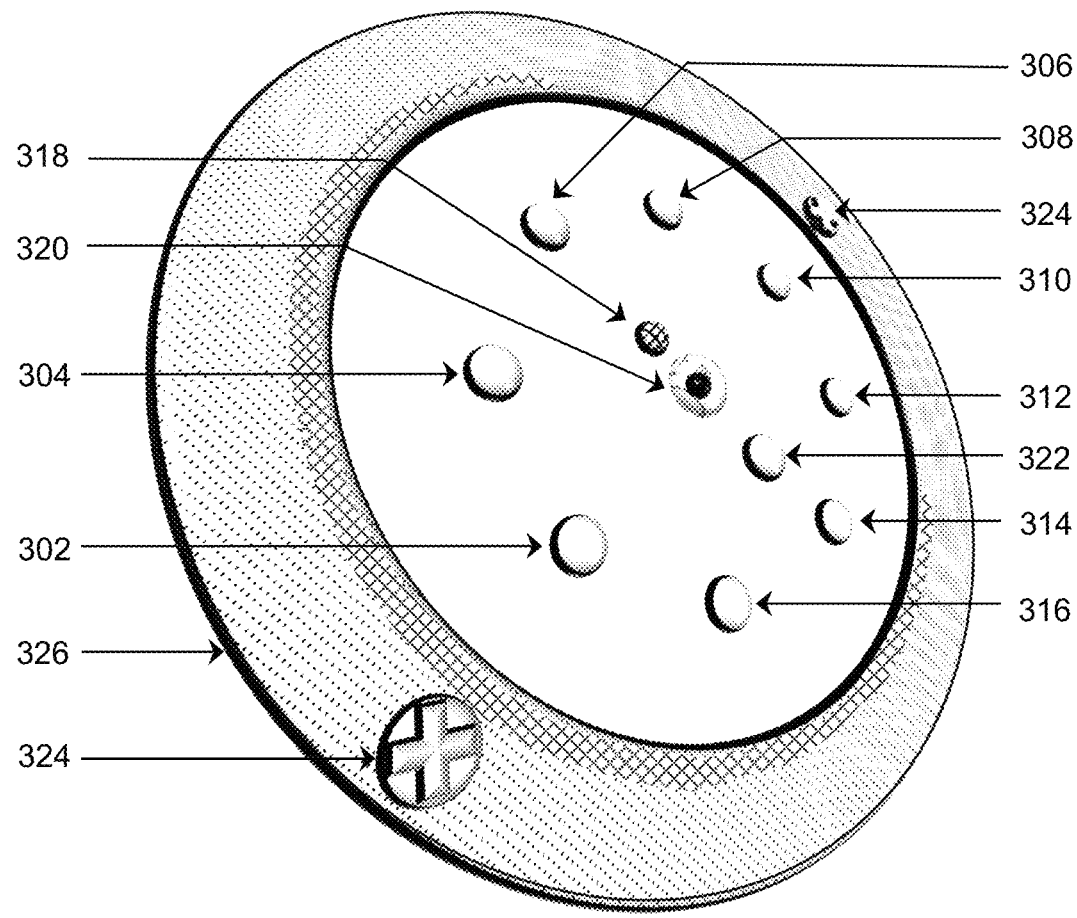
FIG. 3 is a perspective view of an example smart waste bin sensor device design that can be utilized to implement various embodiments.

FIG. 3, FIG. 4, and FIG. 5 are a perspective view, a front elevation view, and a rear elevation view, respectively, of a smart waste bin sensor device 300.

FIG. 3 is a perspective view of an example smart waste bin sensor device 300 design that can be utilized to implement various embodiments.

FIG. 3 illustrates a set of sensors inside the smart waste bin sensor device 300, which comprises:

An RFID tag sensor 302 to detect, measure, and monitor RFID tag digital data.

A location sensor 304 to detect, measure, and monitor geospatial position and altitude.

A fill level sensor 306 to detect, measure, and monitor waste fill level.

A temperature, humidity, and a pressure sensor 308 to detect, measure, and monitor temperature.

A temperature, humidity, and a pressure sensor 308 to detect, measure, and monitor humidity.

A temperature, humidity, and a pressure sensor 308 to detect, measure, and monitor pressure.

An air quality sensor 310 to detect, measure, and monitor an air quality index.

A smoke sensor 312 to detect, measure, and monitor smoke level.

A gas sensor 314 to detect, measure, and monitor gas type.

An ambient light sensor 316 to detect, measure, and monitor ambient light level.

A motion sensor 318 to detect, measure, and monitor a motion event.

A waste and litter sensor 320 to detect, measure, and monitor waste type, waste volume, litter type, litter level, biohazardous waste type, and biohazardous waste level.

A pathogen biosensor 322 to detect, measure, monitor pathogen type, and biosafety level.

An accelerometer sensor 898 to detect, measure, and monitor a waste bin tilt position.

The smart waste bin sensor device 300 consists of two mounting holes 324 near the device body 326 to install it to the waste bin 600 using two screws. The set of sensors of the smart waste bin sensor device 300 sends and receives signals through the wireless network to the cloud server 114.

FIG. 4 is an example front elevation view of a smart waste bin sensor device 410 and a rear elevation view of a smart waste bin sensor device 450 design that can be utilized to implement various embodiments.

FIG. 4 illustrates a smart waste bin sensor device 300 comprising a front side with a set of sensors, a rear side with smart waste bin sensor device installation instructions, a single board microcomputer programmed with waste bin model information, and a battery to power the smart waste bin sensor device 300.

The rear elevation view of a smart waste bin sensor device 450 comprises an instruction for use symbol 452, a battery symbol 454, a waste bin 600 with a smart waste bin sensor device 300 installed inside the bottom of the waste bin lid symbol 456, and a waste bin 600 with a smart waste bin sensor device 300 installed outside the waste bin body symbol 458. It also has mounting holes 324 on either side of the device body 326 to install the smart waste bin sensor device 300 to a waste bin 600. These instructions in the form of the symbols allow a waste bin owner 104 to install the smart waste bin sensor device 300 on a waste bin 600 easily.

FIG. 5 illustrates an example smart waste bin sensor device installed inside the bottom of the waste bin lid diagram 510 and a smart waste bin sensor device installed outside the waste bin body diagram 550 that can be utilized to implement various embodiments.

The smart waste bin sensor device 300 can be installed inside the bottom of the waste bin lid 512 or inside side walls or to the outside of the waste bin body 552 or any other location which would not block the pickup and disposal of the waste.

A smart waste bin sensor device installed inside the bottom of the waste bin lid diagram 510 illustrates the smart waste bin sensor device 300 installed inside a waste bin body, wherein the set of sensors 302-322 and 808 detect, measure, and monitor environmental conditions inside the waste bin 600, wherein the set of sensors sends and receives signals through the wireless network to the cloud server 114.

A smart waste bin sensor device installed outside the waste bin body diagram 550 illustrates the smart waste bin sensor device 300 installed outside the waste bin body. The set of sensors 302-322 and 808 detect, measure, and monitor environmental conditions surrounding the waste bin 600, wherein the set of sensors sends and receives signals through the wireless network to the cloud server 114.

Figure 6:
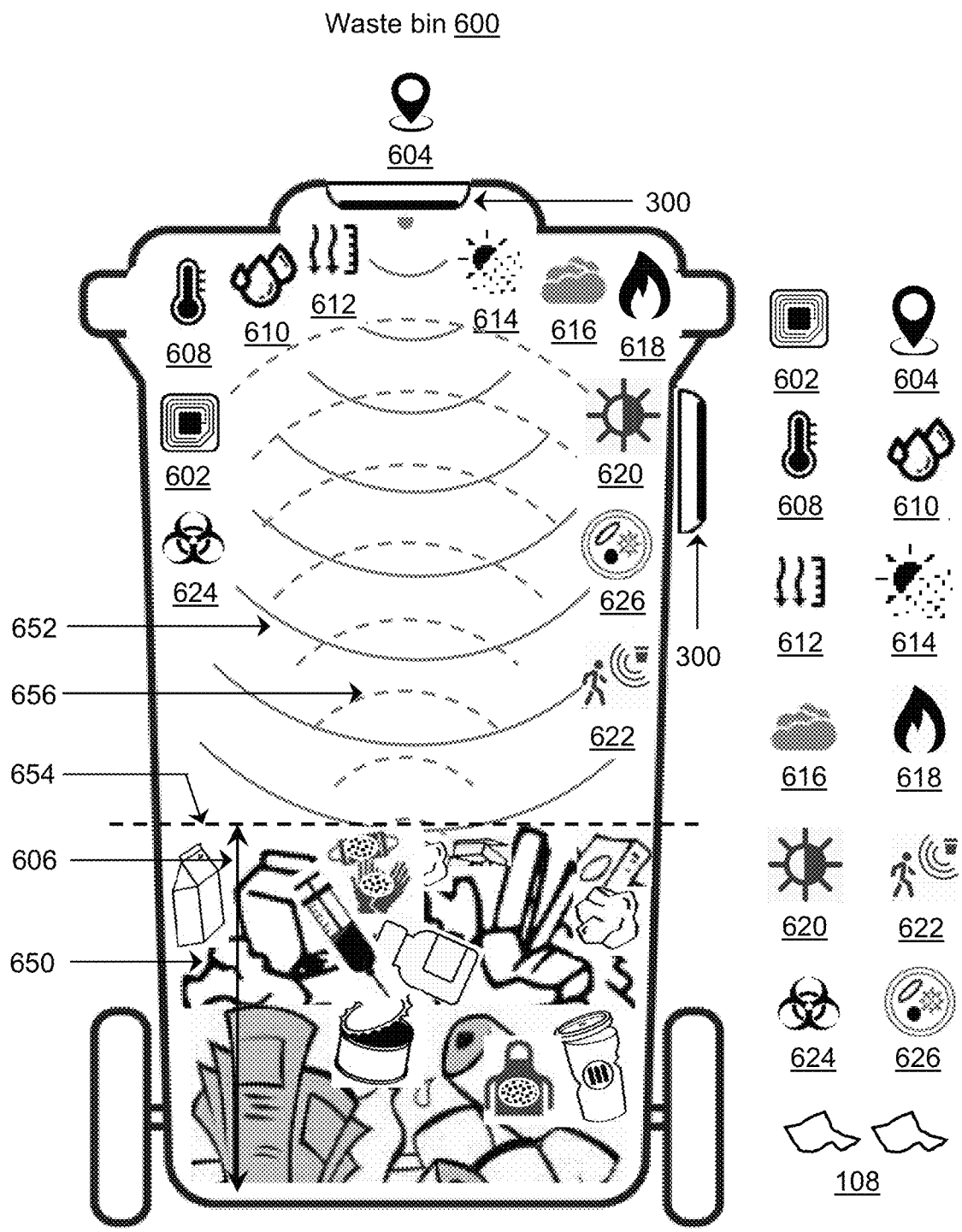
FIG. 6 is an example cross sectional view of a waste bin comprising waste and litter around the bin with a smart waste bin sensor device installed inside the bottom of waste bin lid and an another smart waste bin sensor device installed outside the waste bin body to monitor waste that can be utilized to implement various embodiments.

FIG. 6 is an example cross sectional view of a waste bin 600 comprising waste 650 and litter 108 around the bin with a smart waste bin sensor device 300 installed inside the bottom of the waste bin lid and an another smart waste bin sensor device 300 installed outside the waste bin body to monitor waste that can be utilized to implement various embodiments.

One or several smart waste bin sensor devices 300 can be installed on a waste bin 600 depending on the size of the waste bin. If multiple smart waste bin sensor devices are installed on a waste bin 600, they all can be linked together through a waste bin mobile application 110.

FIG. 6 shows an example installation of two smart waste bin sensor devices 300 installed in a waste bin 600 to detect, measure, and monitor environmental conditions inside or outside the waste bin 600. Some of the measured values are depicted in the form of icons. The detected, measured, and monitored values consist of an RFID tag digital data value 602, a geospatial position and altitude value 604, a waste fill level value 606, a temperature value 608, a humidity value 610, a pressure value 612, an air quality index value 614, a smoke level value 616, a gas type value 618, an ambient light level value 620, a motion event value 622, a set of waste types and a waste volume value, a set of litter types and a litter level value, a set of biohazardous waste types and a biohazardous level value 624, and a set of pathogen types and a biosafety level value 626. One or multiple smart waste bin sensor device 300 can be installed on the waste bin 600 based on the size. If multiple smart waste bin sensor device 300 are installed on a waste bin 600, they all can be linked to function together.

Figure 7:
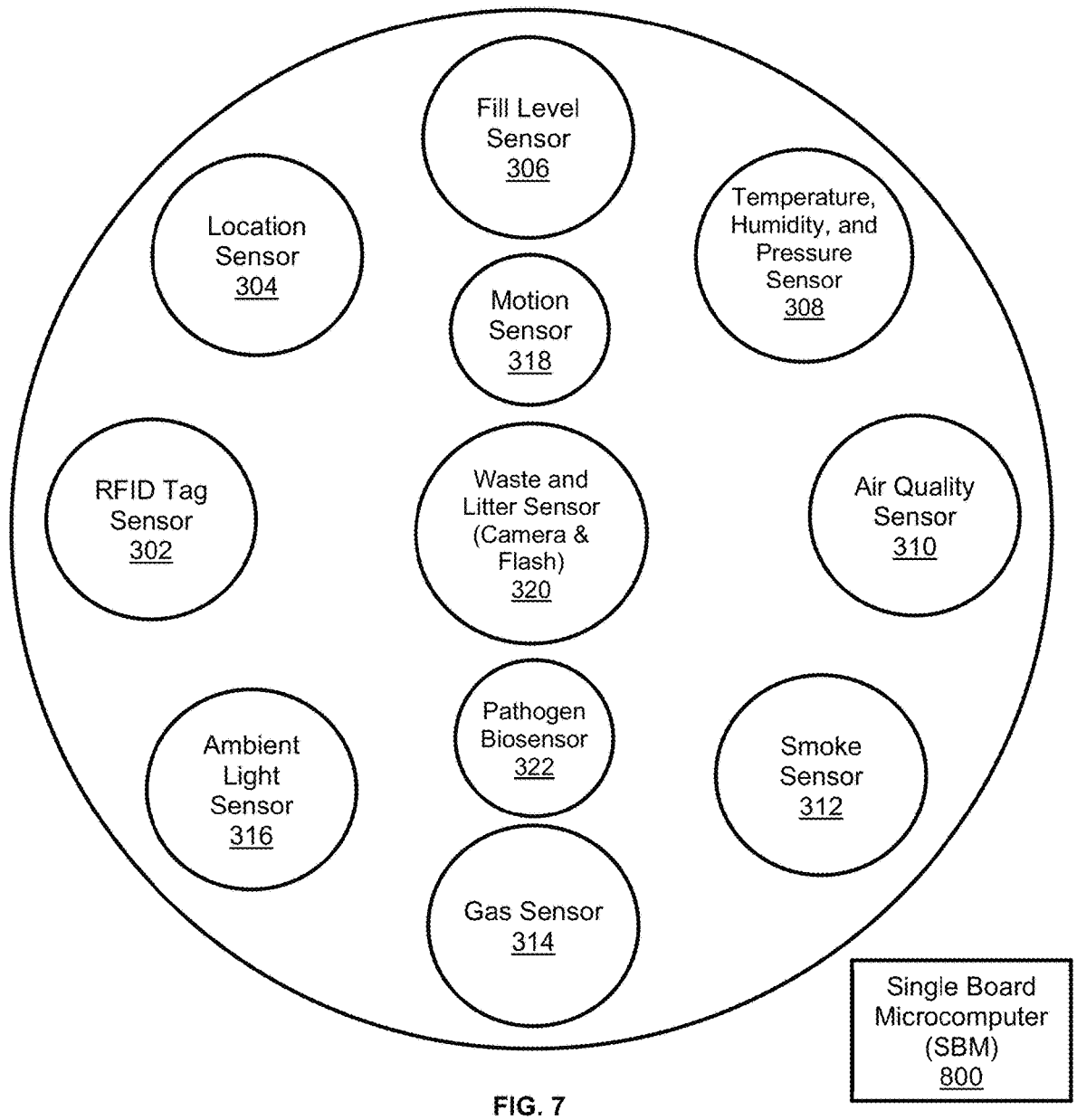
FIG. 7 is an example schematic representation of a smart waste bin sensor device hardware design with a set of sensors arrangement that can be utilized to implement various embodiments.

FIG. 7 is an example schematic representation of a smart waste bin sensor device hardware design 700 with a set of sensors arrangement that can be utilized to implement various embodiments.

The smart waste bin sensor device 300 sensors hardware comprises an RFID tag sensor 302, a location sensor 304, a fill level sensor 306, a temperature, humidity, and pressure sensor 308, an air quality sensor 310, a smoke sensor 312, a gas sensor 314, an ambient light sensor 316, a motion sensor 318, a waste and litter sensor 320 comprising a camera and flash, a pathogen biosensor 322, and a single board microcomputer 800 comprising an accelerometer sensor 808.

Figure 8:
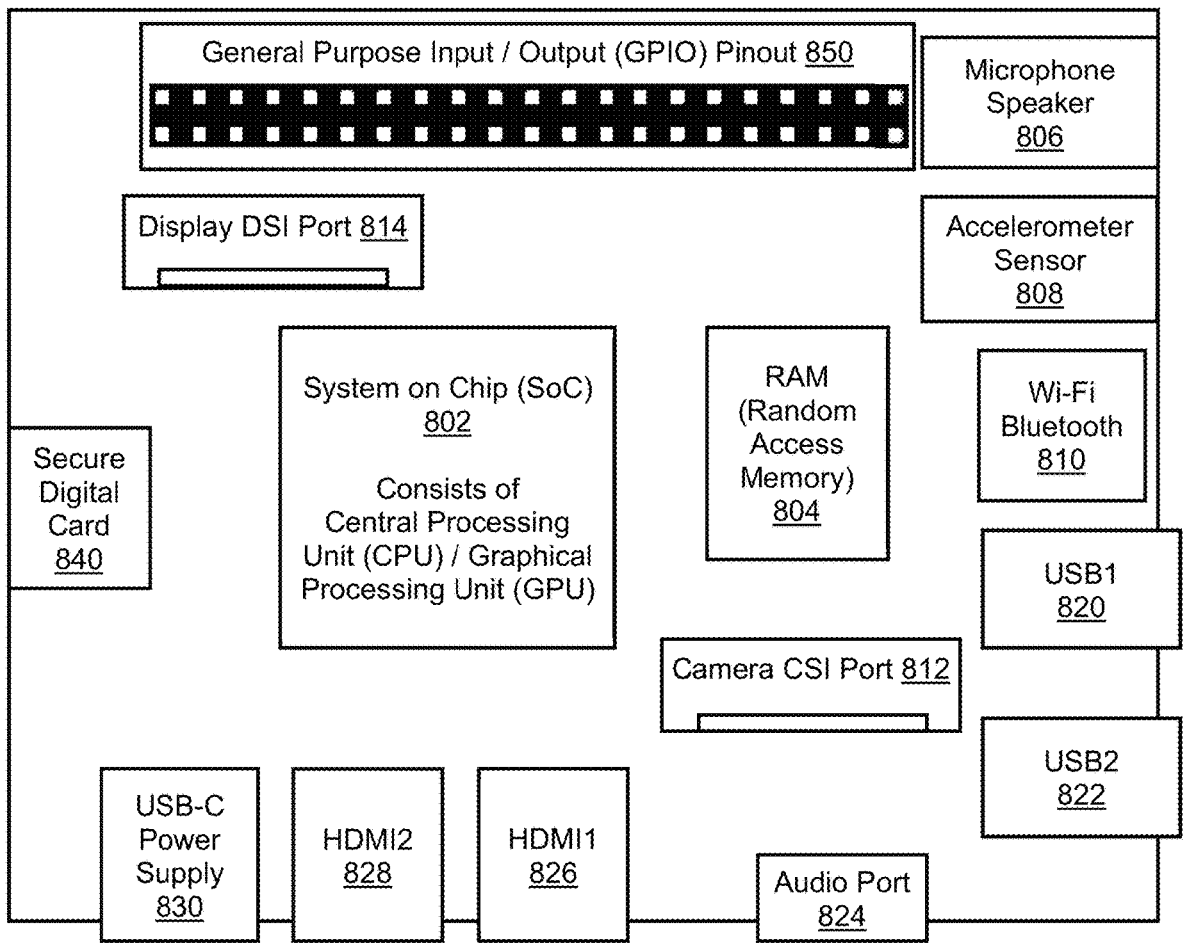
FIG. 8 is an example schematic representation of a single board microcomputer containing hardware components, peripheral interfaces, and general purpose input output pinout layouts that can be utilized to implement various embodiments.

FIG. 8 is an example schematic representation of a single board microcomputer 800 containing hardware, peripheral interfaces, and general purpose input output pinout 850 layouts that can be utilized to implement various embodiments.

The example smart waste bin sensor device 300 single board microcomputer 800 computing system can be configured to perform any one of the processes provided herein. In this context, the smart waste bin sensor device 300 single board microcomputer 800 or SBM 800 may include, for example, a system on chip (SOC) 802 consisting of a central processing unit (CPU)/graphical processing unit (GPU), a random access memory (RAM) 804, a microphone speaker 806, an accelerometer sensor 808, a Wi-Fi Bluetooth 810, a camera CSI port 812, a display DSI port 814, a universal serial bus usb1 820, a universal serial bus usb2 822, an audio port 824, a high definition multimedia interface HDMI1 826, a high definition multimedia interface HDMI2 828, a usb-c power supply 830, a secure digital card 840, and a general purpose input output pinout 850 or GPIO pinout 850. The system on chip 802, random access memory 804, and secure digital card 840 are used to implement various waste collection algorithms methods and store data locally. General purpose input output pinout 850 or GPIO pinout 850 and other ports are used to connect to the sensors. The camera CSI port 812 is used to connect to a camera. The display DSI port 814 can be used to connect a capacitive touch screen to the smart waste bin sensor device 300 to display all the sensor data, which is usually in the form of connectors or ribbon cables. The display DSI port 814 can also be used to connect to the touch screen for testing of the smart waste bin sensor device 300. The smart waste bin sensor device 300 single board microcomputer 800 may include circuitry or other specialized hardware for carrying out some or all aspects of the processes. In some operational settings, a smart waste bin sensor device 300 single board microcomputer 800 may be configured as a system that includes one or more subcomponents, each of which is configured to carry out some aspects of the processes either in software, hardware, or some combination thereof.

The smart waste bin sensor device 300 single board microcomputer 800 can communicate with other computing devices based on various computer communication protocols such a Wi-Fi, a Bluetooth (and/or other standards for exchanging data over short distances including those using short-wavelength radio transmissions), a USB, an ethernet, a cellular network, an ultrasonic local area communication protocol, and so on.

Figure 9:
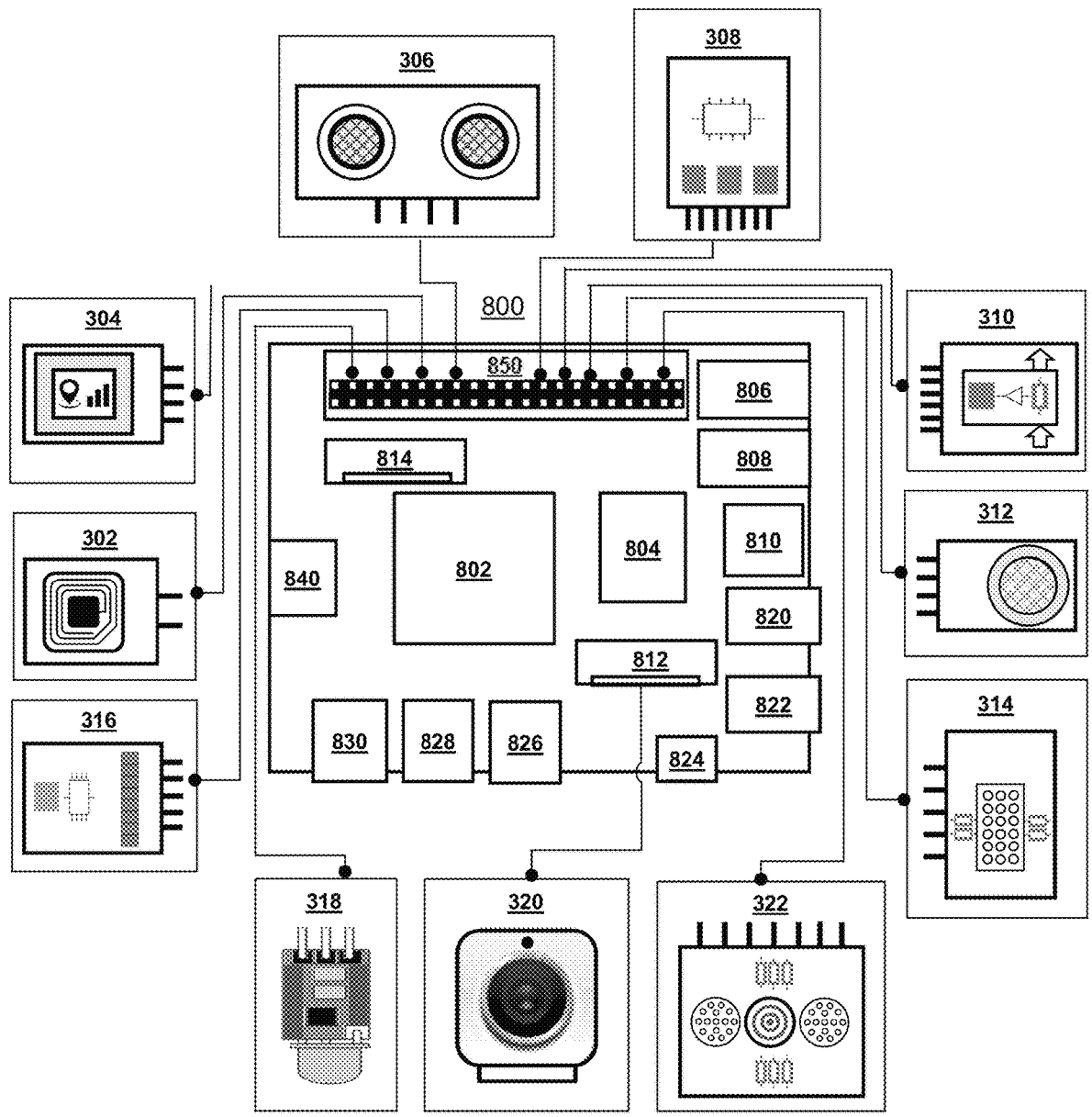
FIG. 9 is an example smart waste bin sensor device wiring diagram showing a single board microcomputer general purpose input output pinout connected to a sensor's pinout that can be utilized to implement various embodiments.

FIG. 9 is an example smart waste bin sensor device 300 wiring diagram 900 showing a single board microcomputer 800 general purpose input output pinout 850 connected to a sensor's 302-322 pinout that can be utilized to implement various embodiments.

The sensors 302-320 are made up of space saving rugged micro-electromechanical system (MEMS) components. The sensors connected to the single board microcomputer 800 general purpose input output pinout 850 are an RFID tag sensor 302, a location sensor 304, a fill level sensor 306, a temperature, humidity, and pressure sensor 308, an air quality sensor 310, a smoke sensor 312, a gas sensor, an ambient light sensor 316, a motion sensor 318, a waste and litter sensor 320 comprising a camera and flash, and a pathogen biosensor 322.

Figure 10:
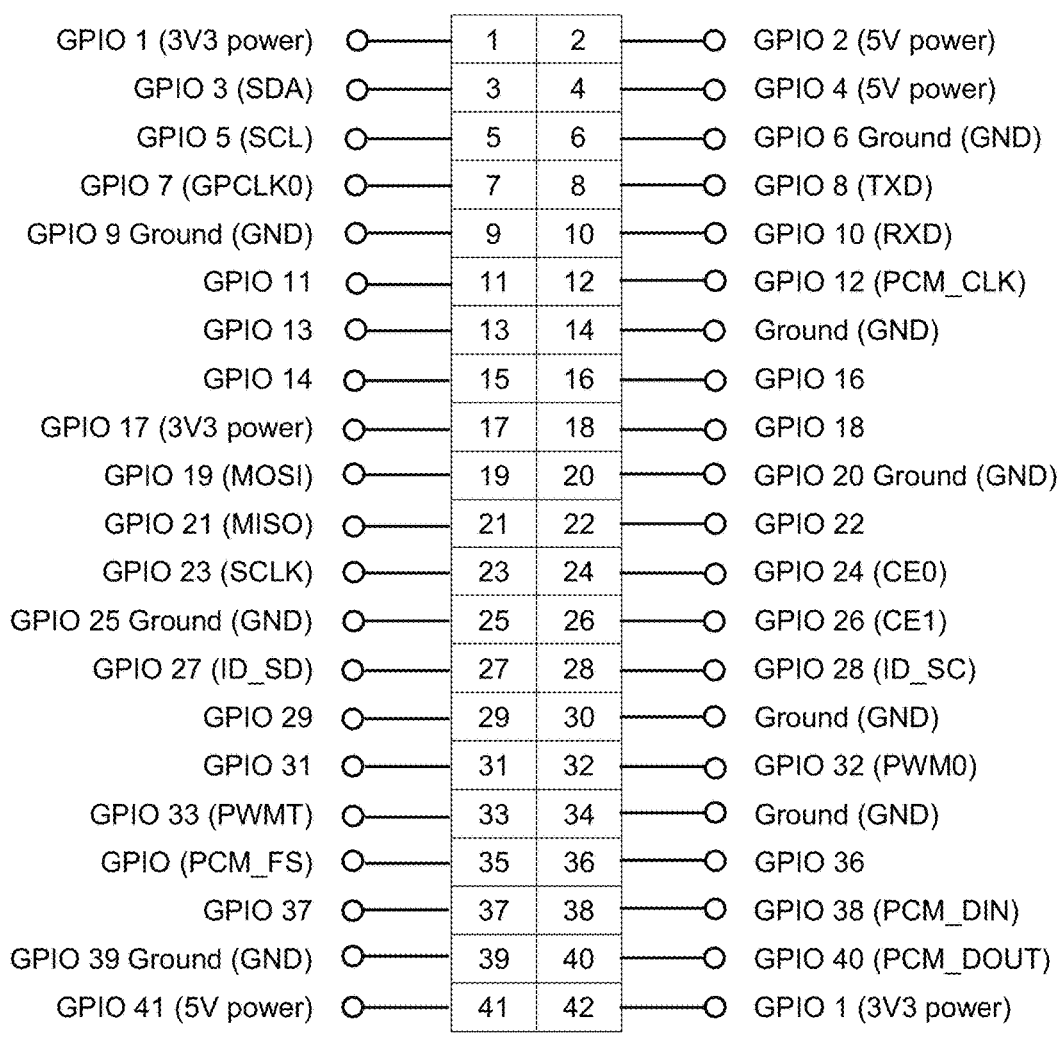
FIG. 10 is an example schematic representation of a single board microcomputer general purpose input output pin numbering diagram, and a general purpose input output pinout function that can be utilized to implement various embodiments.

FIG. 10 is an example schematic representation of a single board microcomputer 800 general purpose input output pin numbering diagram 1010, and a general purpose input output pinout function 1050 that can be utilized to implement various embodiments.

The general purpose input output pin numbering diagram 1010 shows the layout of pins 1-42 of GPIO pinout 850. The light gray pinout is either a 3V3-volt (3.3-volt) or 5-volt power supply. The black pinout is represented as Ground or GND.

The remaining GPIO pins are uncommitted digital signal pins on an integrated circuit or electronic circuit board of the single board microcomputer 800 whose behavior—including whether they act as input or output—is controllable by the user at run time. Sensor software drivers are used to map the GPIO pinout 850 to the sensor pinout.

The general purpose input output pinout function 1050 shows pins 1-42 of GPIO pinout 850 functions.

FIG. 11 is an example single board microcomputer 800 general purpose input output pinout function description table 1100 that can be utilized to implement various embodiments.

The voltage 1102 describes the ground and power functions.

The inputs 1104 describe how the GPIO pin is assigned an input pin through SBM 800 software settings.

The outputs 1106 describe how the GPIO pin is assigned an output pin through SBM 800 software settings.

The pulse width modulation (PWM) 1108 is a technique for getting analog results with digital means. Digital control is used to create a square wave, a signal switched between on and off. This on-off pattern can simulate voltages in between full on (5 volts) and off (0 volts) by changing the portion of the time the signal spends on versus the time that the signal spends off. The duration of "on time" is called the pulse width. To get varying analog values, one can change, or modulate, that pulse width. If this on-off pattern is repeated fast enough with an LED, for example, the result is as if the signal is a steady voltage between 0 and 5 v, controlling the brightness of the LED of the flash.

The serial peripheral interface (SPI) 1110 is a synchronous serial communication interface specification used for a short distance communication. The serial peripheral interface (SPI) is an interface bus commonly used to send data between the single board microcomputer 800 and small peripherals such as shift registers, sensors 302-322, and a secure digital card 840. It uses separate clock and data lines, along with a select line to connect to the sensor component. SPI allows attachment of multiple compatible sensors 302-322 to a single set of pins by assigning them different chip-select pins. SPI is another type of communication protocol for communicating between sensors. It also uses a master/slave setup but is primarily used in short distances between a main (master) controller and peripheral devices (slaves) such as sensors. SPI typically uses 3 wires to communicate with the single board microcomputer 800: SCLK, MOSI, and MISO. SPI needs to be enabled within the single board microcomputer 800 configuration menu before it can be used. There are two types of SPI modes as below:

Standard mode—In standard SPI master mode, the peripheral implements the standard 3-wire serial protocol (SCLK, MOSI, and MISO).

Bidirectional mode—In bidirectional SPI master mode, the same SPI standard is implemented, except that a single wire is used for data (MOMI) instead of the two used in standard mode (MISO and MOSI). In this mode, the MOSI pin serves as MOMI pin.

Either of the two SPI modes can be used by the sensors 302-322 based on the sensor pinout connection requirements.

The inter-integrated circuit (I2C) 1112 protocol is a synchronous protocol intended to allow multiple "slave" digital integrated circuits ("chips") to communicate with one or more "master" chips. It is widely used for attaching lower-speed peripheral ICs to processors and the single board microcomputer 800 in short-distance, intra-board communication. It only requires two signal wires to exchange information. This is a common type of communication between the single board microcomputer 800 and sensors 302-322. It works by having a master and a slave. The master in this case is the single board microcomputer 800, and the slave devices are hardware peripherals like sensors 302-322 that would normally extend the functionality of the device. The advantage of I2C is that one can connect hundreds of sensors up to the same master using the same two-wire interface, providing that each device has a different I2C address. This is very useful in the case of a smart waste bin sensor device 300 containing many sensors.

In serial interface 1114, a serial pin TX is used to transmit, and a serial pin RX is used to receive the data. In telecommunication and data transmission, serial communication is the process of sending data one bit at a time, sequentially, over a communication channel or computer bus. This contrasts with parallel communication, where several bits are sent as a whole, on a link with several parallel channels. Sensors like GPS are connected to GPIO TX and RX pins.

FIG. 12 to FIG. 47 illustrate set of sensor methods to implement, operate, detect, measure, and monitor environmental conditions inside or outside the waste bin 600.

A smart waste bin sensor device sensor 300 set of sensors comprises:

The RFID tag sensor 302, wherein the RFID tag sensor 302 implements, operates, detects, measures, and monitors the RFID tag digital data of the waste bin 600.

The location sensor 304, wherein the location sensor 304 implements, operates, detects, measures, and monitors the geospatial position and the altitude of the waste bin 600.

The fill level sensor 306, wherein the fill level sensor 306 implements, operates, detects, measures, and monitors the waste fill level inside the waste bin 600.

The temperature, humidity, and pressure sensor 308, wherein the temperature, humidity, and pressure sensor 308 implements, operates, detects, measures, and monitors the temperature inside or surrounding the waste bin 600.

The temperature, humidity, and pressure sensor 308, wherein the temperature, humidity, and pressure sensor 308 implements, operates, detects, measures, and monitors the humidity inside or surrounding the waste bin 600.

The temperature, humidity, and pressure sensor 308, wherein the temperature, humidity, and pressure sensor 308 implements, operates, measures, and monitors the pressure inside or surrounding the waste bin 600.

The air quality sensor 310, wherein the air quality sensor 310 implements, operates, detects, measures, and monitors the air quality index inside or surrounding the waste bin 600.

The smoke sensor, wherein the smoke sensor 312 implements, operates, detects, measures, and monitors the smoke level inside or surrounding the waste bin 600.

The gas sensor 314, wherein the gas sensor 314 implements, operates, detects, measures, and monitors the gas type inside or surrounding the waste bin 600.

The ambient light sensor 316, wherein the ambient light sensor 316 implements, operates, detects, measures, and monitors the ambient light level inside or surrounding the waste bin 600.

The motion sensor 318, wherein the motion sensor 318 implements, operates, detects, measures, and monitors the motion events inside or surrounding the waste bin 600.

The waste and litter sensor 320, wherein a smart waste bin sensor device 300 is installed inside the waste bin body, wherein the waste and litter sensor implements, operates, detects, measures, and monitors the waste type, the waste volume, the biohazardous waste type, and the biohazardous waste level. When the smart waste bin sensor device 300 is installed outside the waste bin body, the waste and litter sensor 300 implements, operates, detects, measures, and monitors the litter type, the litter level, the biohazardous waste type, and the biohazardous waste level.

The pathogen biosensor 322, wherein the pathogen biosensor 322 implements, operates, measures, and monitors the pathogen type and the biosafety inside or surrounding the waste bin 600.

The accelerometer sensor 808, wherein the accelerometer sensor 808 implements, operates, detects, measures, and monitors the waste bin tilt position.

The above set of sensors 302-322, 808 sends and receives signals through the wireless network to the cloud server 114.

FIG. 12 to FIG. 47 describe the detailed implementation, operation, detection, measurement, and monitoring for each of the sensors. The description also includes the detailed working principle and operating principle of the sensors.

FIG. 12 and FIG. 13 illustrate an example RFID tag sensor 302, wherein the RFID tag sensor 302 implements, operates, detects, measures, and monitors RFID tag digital data of the waste bin 600.

FIG. 12 illustrates an example RFID tag sensor pinout 1210 and an RFID tag sensor wiring table 1250 describing the hardware wiring connection steps of an RFID tag sensor pinout 1210 connected to the single board microcomputer 800 general purpose input output pinout 850 that can be utilized to implement various embodiments.

FIG. 13 illustrates an example RFID tag sensor working principle diagram 1310 and an RFID tag sensor operating principle diagram 1350 that can be utilized to implement various embodiments.

The RFID tag sensor 302 implements, operates, detects, measures, and monitors RFID tag digital data of the waste bin 600 per following procedure:

1. Log in to the single board microcomputer 800 operating software and access general purpose input output pinout 850 settings. Assign and map the general purpose input output pinout 850 to be connected to an RFID tag sensor pinout 1210. Save general purpose input output pinout 850 settings.

2. Connect the RFID tag sensor pinout 1210 to a single board microcomputer 800 assigned general purpose input output pinout 850 as listed in the RFID tag sensor wiring table 1250. The hardware implementation of the RFID tag sensor 302 is complete after the RFID tag sensor pinout 1210 is connected to a single board microcomputer 800 general purpose input output pinout 850.

3. Prepare the single board microcomputer 800 operating software to communicate with the RFID tag sensor 302 by loading the general purpose input output pinout 850 software library and installing the RFID tag sensor 302 software driver.

4. Program, install, execute, and run the RFID tag sensor 302 software on the single board microcomputer 800 operating software.

The RFID tag sensor working principle diagram 1310 illustrates functioning of the RFID tag sensor 302 as follows:

The intended use of the RFID tag sensor 302 is to detect and send an RFID tag digital data value 602 of the waste bin 600. RFID or radio frequency identification system consists of two main components, an RFID tag 1316 attached to an object to be identified, and a transceiver also known as reader and writer 1312. A reader and writer 1312 consist of a radio frequency module and an antenna which generates a high frequency electromagnetic field. On the other hand, the RFID tag 1316 is usually a passive device, meaning it does not contain a battery. Instead it contains a microchip that stores and processes information, and an antenna to receive and transmit a signal. To read the information encoded on the RFID tag 1316, it is placed near the reader and writer 1312 but does not need to be within direct line-of-sight of the reader and writer 1312. A reader generates an electromagnetic field original radio signal 1314 which causes electrons to move through the RFID tag's 1316 antenna and subsequently power the chip. The powered chip inside the RFID tag 1316 then responds by sending its stored RFID tag digital data value 602 information back to the reader and writer 1312 in the form of another reflected radio signal 1318. This is called backscatter. The backscatter, or change in the electromagnetic radio frequency wave, is detected and interpreted by the reader and writer, 1312 which then sends the RFID tag digital data value 602 out to the cloud server 114.

The RFID tag sensor operating principle diagram 1350 illustrates operation of the RFID tag sensor 302. The operation involves reading digital data of the waste bin 600 RFID tag 1316 and 1322. The waste collection vehicle 120 pulls in near the waste bin 600, and after it has emptied the waste 650, the reader and writer 1312 sends the original radio signal 1314 and 1320. The RFID tag 1316 and 1322 then responds by sending a unique RFID tag digital data value 602 for each of the smart waste bin sensor devices' 300 information back to the reader and writer 1312 in the form of another reflected radio signal 1318 and 1324. The RFID tag digital data value 602 is stored in the secure digital card 840 of the SBM 800.

5. Transmit the detected and measured RFID tag sensor 302 waste bin 600 RFID tag digital data value 602 to the cloud server 114 and store it in the database 5300.

6. Monitor the RFID tag sensor 302 waste bin 600 RFID tag digital data value 602 in the waste bin mobile application 110 and the waste collection facility application 112.

FIG. 14 and FIG. 15 illustrate an example location sensor 304, wherein the location sensor 304 implements, operates, detects, measures, and monitors the geospatial position and altitude of the waste bin 600.

FIG. 14 illustrates an example location sensor pinout 1410 and a location sensor wiring table 1450 describing the hardware wiring connection steps of a location sensor pinout 1410 connected to the single board microcomputer 800 general purpose input output pinout 850 that can be utilized to implement various embodiments.

FIG. 15 illustrates an example location sensor GPS operating principle diagram 1510 and a location sensor cellular network operating principle diagram 1550 that can be utilized to implement various embodiments.

The location sensor 304 implements, operates, detects, measures, and monitors the geospatial position and altitude of the waste bin 600 per following procedure:

1. Log in to the single board microcomputer 800 operating software and access general purpose input output pinout 850 settings. Assign and map the general purpose input output pinout 850 to be connected to the location sensor pinout 1410. Save general purpose input output pinout 850 settings.

2. Connect the location sensor pinout 1410 to a single board microcomputer 800 assigned general purpose input output pinout 850 as listed in the location sensor wiring table 1450. The hardware implementation of the location sensor 304 is complete after the location sensor pinout 1410 is connected to a single board microcomputer 800 general purpose input output pinout 850.

3. Prepare the single board microcomputer 800 operating software to communicate with the location sensor 304 by loading the general purpose input output pinout 850 software library and installing the location sensor 304 software driver.

4. Program, install, execute, and run the location sensor 304 software on the single board microcomputer 800 operating software.

The location sensor GPS operating principle diagram 1510 illustrates functioning of the location sensor 304 as follows:

The intended use of the location sensor 304 is to determine the geospatial location and altitude of the waste bin 600 and can provide internet access to the smart waste bin sensor device 300. The location sensor 304 consists of two components, a GPS receiver and cellular adapter.

The GPS receiver operating principle is based on the global positioning system. The global positioning system is a satellite navigation system that provides location and time information in all climate conditions to the user.

GPS consists of three segments, the GPS satellites space segment, control segment, and user segment.

The GPS space segment consists of at least 24 satellites circling the Earth every 12 hours at about 12,000 miles in altitude. The GPS space segment is formed by a satellite constellation with at least four simultaneous satellites 1512, 1514, 1516, and 1518 in view from any point on the Earth's surface at any time.

The GPS control segment includes a master control station, an alternate master control station, 12 command and control antennas, and 16 monitor stations outfitted with atomic clocks that are spread around the globe to correct any abnormalities and send back to the GPS satellites through ground antennas.

The GPS user segment comprises the GPS receiver, which receives the signals from the GPS satellites and detects how far away they are from each satellite.

The location sensor GPS operating principle diagram 1510 illustrates the "trilateration" mathematical principle to locate the waste bin 600. As shown in location sensor GPS operating principle diagram 1510, the waste bin 600 smart waste bin sensor device 300 position is detected from the distance 1520, 1522, 1524, 1526 or 1530, 1532, 1534, 1536 measurements to the satellites. From the smart waste bin sensor device 300 location sensor GPS working principle diagram 1510, the four satellites 1512, 1514, 1516, and 1518 are used to detect the position of the receiver, in this case smart waste bin sensor device 300 location sensor 304 of the waste bin 600 on the Earth. The target location is confirmed by the fourth satellite 1518. The three 1512, 1514, and 1516 satellites are used to trace the location of the waste bin 600. A fourth satellite 1518 is used to confirm the target location of each of those three 1512, 1514, and 1516 satellites. The GPS receiver takes the information from the satellite and uses triangulation to calculate a waste bin 600 geospatial position and altitude. The location sensor GPS uses these satellites as reference points to calculate positions accurate to just a few meters. The difference between the time the signal is sent and the time it is received, multiplied by the speed of light, enables the receiver to calculate the distance to the satellite. The location sensor 304 transmits data to the single board microcomputer 800. The location sensor values 604 are stored in the secure digital card 840 of the SBM 800. The geospatial position is converted into street address and altitude.

The location sensor cellular network operating working principle diagram 1550 illustrates the functioning of the location sensor 304 as follows:

A cellular adapter adds network connectivity to the smart waste bin sensor device 300. It uses a cellular network to connect to the internet. A cellular network is a communication network distributed over land through cells, where each cell such as a tower 1552 and 1554 includes a fixed location transceiver known as a base station. The smart waste bin sensor device 300 location sensor 304 signal 1556 and 1560 is transmitted and received through the tower 1552. The waste bin mobile application 110 sends and receives a signal 1558 and 1562 through the tower 1554. These cells together provide radio coverage over larger geographical areas. With user equipment such as mobile phones, the waste bin 600 therefore can communicate even if the equipment is moving through cells during transmission. This allows the waste bin owner 104 to access and set up the smart waste bin sensor device 300 of the waste bin 600 over a cellular network line using the waste bin mobile application 110 and waste collection facility application 112. The Wi-Fi connected devices such as the waste bin 600 can be tracked within the Wi-Fi infrastructure which is providing the service. As such, geospatial location and altitude of the waste bin 600 can be tracked. The smart waste bin sensor device 300 of the waste bin 600 is also able to access the internet and connect to weather APIs such as OpenWeatherMap API, AccuWeather API, Dark Sky API, Air Quality API, and so on. The location sensor values 604 are stored in the secure digital card 840 of the SBM 800. The geospatial position is converted into street address and altitude.

5. Transmit the detected and measured location sensor 304 waste bin 600 geospatial position and altitude values 604 to the cloud server 114 and store them in the database 5300.

6. Monitor the location sensor 304 waste bin 600 geospatial position and altitude values 604 in the waste bin mobile application 110 and waste collection facility application 112.

Figure 18:
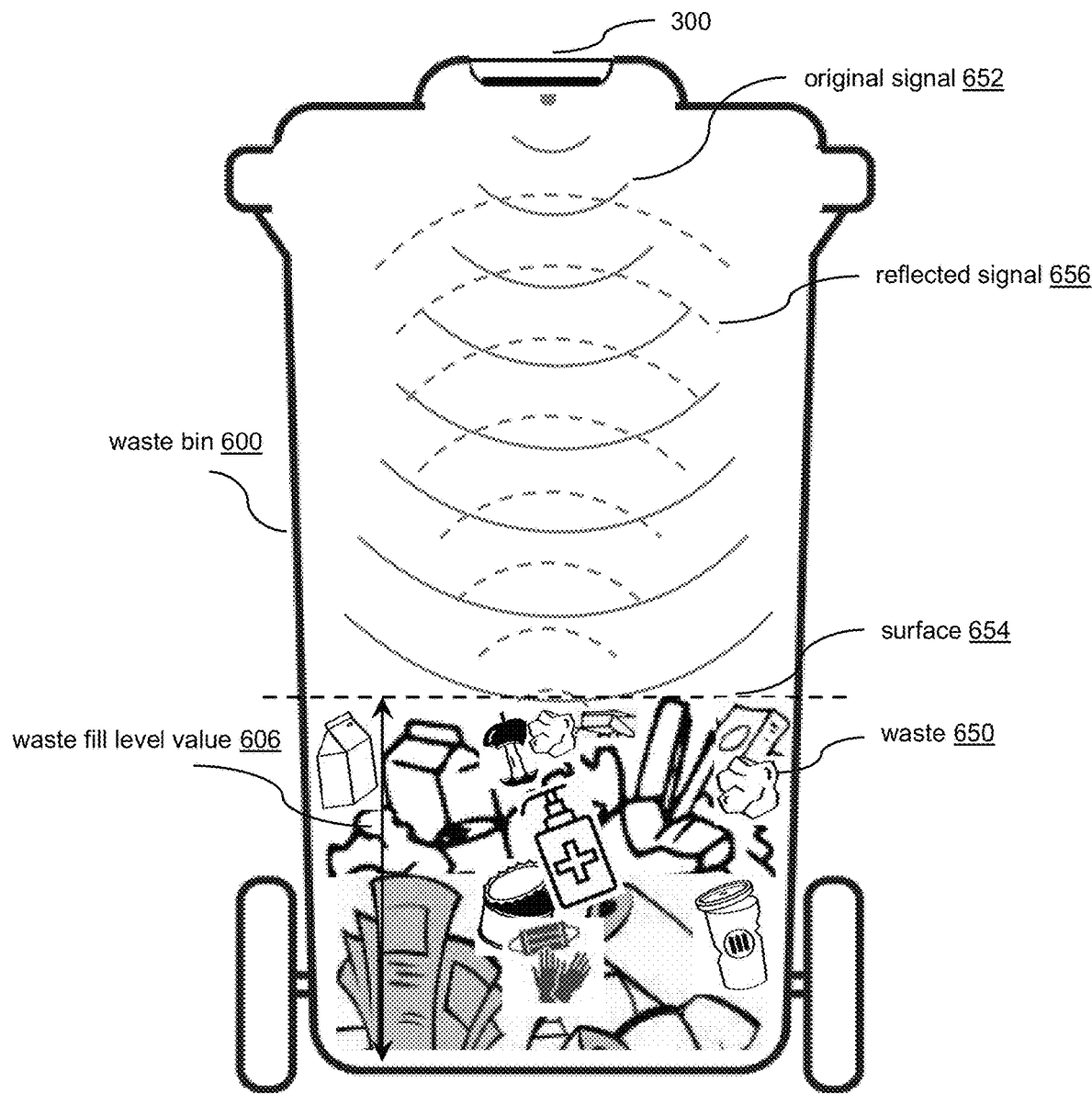
FIG. 18 illustrates an example fill level sensor operating principle diagram that can be utilized to implement various embodiments.

FIGS. 16, 17 and 18 illustrate an example fill level sensor 306, wherein the fill level sensor 306 implements, operates, detects, measures, and monitors a waste fill level inside the waste bin 600.

FIG. 16 illustrates an example fill level sensor pinout 1610 and a fill level sensor wiring table 1650 describing the hardware wiring connection steps of a fill level sensor pinout 1610 connected to the single board microcomputer 800 general purpose input output pinout 850 that can be utilized to implement various embodiments.

FIG. 17 illustrates an example fill level sensor working principle diagram 1710 and a fill level sensor timing diagram 1750 that can be utilized to implement various embodiments.

FIG. 18 illustrates an example fill level sensor operating principle diagram 1800 that can be utilized to implement various embodiments.

The fill level sensor 306 implements, operates, detects, measures, and monitors the waste bin 600 waste fill level value 606 per following procedure:

1. Log in to the single board microcomputer 800 operating software and access general purpose input output pinout 850 settings. Assign and map the general purpose input output pinout 850 to be connected to the fill level sensor pinout 1610. Save general purpose input output pinout 850 settings.

2. Connect the fill level sensor pinout 1610 to a single board microcomputer 800 assigned general purpose input output pinout 850 as listed in the fill level sensor wiring table 1650. The hardware implementation of the fill level sensor 306 is complete after the fill level sensor pinout 1610 is connected to a single board microcomputer 800 general purpose input output pinout 850.

3. Prepare the single board microcomputer 800 operating software to communicate with the fill level sensor 306 by loading the general purpose input output pinout 850 software library and installing the fill level sensor 306 software driver.

4. Program, install, execute, and run the fill level sensor 306 software on the single board microcomputer 800 operating software.

The fill level sensor working principle diagram 1710 illustrates functioning of the fill level sensor 306 as follows:

The intended use of the fill level sensor 306 is to detect, measure, and monitor the waste fill level value 606 in the waste bin 600. The transmitter 1712 sends an original signal 1714 at a specific frequency, and the receiver 1720 is listening for the reflected signal 1714 to bounce back from the surface of the object 1716. The object 1716 is the waste 650 inside the waste bin 600. By recording the elapsed time between the signal being generated and the signal wave bouncing back, the distance 1740 travelled between the sensor and the object is calculated.

It starts as shown in the fill level sensor timing diagram 1750, when a pulse of at least 10 μs (10 microseconds) in duration is applied to the trigger TRIG 1614 pin per timing diagram 1752. In response to that, the sensor transmits an ultrasonic acoustic burst of eight pulses at 40 kHz per timing diagram 1754. This 8-pulse pattern makes the device unique ultrasonic signature, allowing the receiver 1720 to differentiate the transmitted pattern from the ambient ultrasonic noise.

The eight ultrasonic pulses travel through the air away from the transmitter 1712. If those pulses are reflected as shown in the timing diagram 1756, the ECHO 1616 pin goes low as soon as the signal is received as shown in the timing diagram 1758. The width of the received pulse is then used to calculate the distance to the reflected surface of the object 1716.

The distance 1740 travelled is calculated using a distance-speed-time mathematical equation:

distance travelled=speed of sound×time

The fill level sensor operating principle diagram 1800 illustrates operation of the fill level sensor 306. The operation involves the smart waste bin sensor device 300 fill level sensor 306 transmitting the original signal 652. The signal bounces back from the surface 654 of the waste 650 as a reflected signal 656. The waste fill level value 606 of the waste 650 in the waste bin 600 is calculated based on the mathematical equation:

waste fill level=total length of the waste bin−distance travelled

The waste fill level value 602 is stored in the secure digital card 840 of the SBM 800.

5. Transmit the detected and measured fill level sensor 306 waste fill level value 606 to the cloud server 114 and store it in the database 5300.

6. Monitor the fill level sensor 306 waste fill level value 606 in the waste bin mobile application 110 and waste collection facility application 112.

FIGS. 19, 20, 21 and 22 illustrate an example temperature, humidity, and pressure sensor 308, wherein the temperature, humidity, and pressure sensor 308 implements, operates, detects, measures, and monitors temperature, humidity, and pressure inside or surrounding the waste bin 600.

FIG. 19 illustrates an example temperature, humidity, and pressure sensor pinout 1910 and temperature, humidity, and pressure sensor wiring table 1950 describing the hardware wiring connection steps of a temperature, humidity, and pressure sensor pinout 1910 connected to the single board microcomputer 800 general purpose input output pinout 850 that can be utilized to implement various embodiments.

FIG. 20 illustrates an example temperature, humidity, and pressure sensor circuit block diagram 2010 and a temperature sensor working principle diagram 2050 that can be utilized to implement various embodiments.

FIG. 21 illustrates an example humidity sensor working principle diagram 2110 and a pressure sensor working principle diagram 2150 that can be utilized to implement various embodiments.

Figure 22:
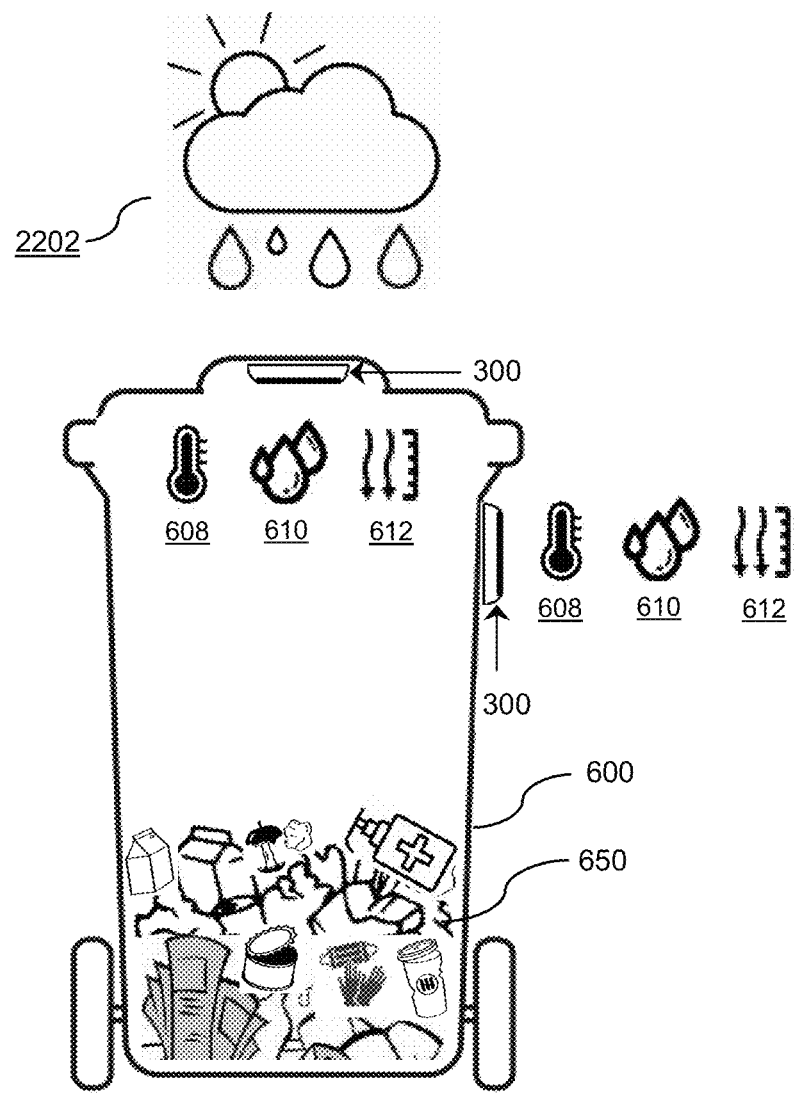
FIG. 22 illustrates an example temperature, humidity, and pressure sensor operating principle diagram that can be utilized to implement various embodiments.

FIG. 22 illustrates an example temperature, humidity, and pressure sensor operating principle diagram 2200 that can be utilized to implement various embodiments.

The temperature, humidity, and pressure sensor 308 implements, operates, detects, measures, and monitors temperature, humidity, and pressure inside or surrounding the waste bin 600 per following procedure:

1. Log in to the single board microcomputer 800 operating software and access general purpose input output pinout 850 settings. Assign and map the general purpose input output pinout 850 to be connected to the temperature, humidity, and pressure sensor pinout 1910. Save general purpose input output pinout 850 settings.

2. Connect the temperature, humidity, and pressure sensor pinout 1910 to a single board microcomputer 800 assigned general purpose input output pinout 850 as listed in the temperature, humidity, and pressure sensor wiring table 1950. The hardware implementation of the temperature, humidity, and pressure sensor 308 is complete after the temperature, humidity, and pressure sensor pinout 1910 is connected to a single board microcomputer 800 general purpose input output pinout 850.

3. Prepare the single board microcomputer 800 operating software to communicate with the temperature, humidity, and pressure sensor 308 by loading the general purpose input output pinout 850 software library and installing the temperature, humidity, and pressure sensor 308 software driver.

4. Program, install, execute, and run the temperature, humidity, and pressure sensor 308 software on the single board microcomputer 800 operating software.

The temperature, humidity, and pressure sensor circuit block diagram 2010 illustrates the functioning of the temperature, humidity, and pressure sensor 308 as follows:

The temperature, humidity, and pressure sensor 308 consists of three components: a temperature sensing element 2012, a humidity sensing element 2014, and a pressure sensing element 2016 connected to a corresponding temperature front end 2018, a humidity front end 2020, and a pressure front end 2022. The ADC 2024 converts the analog signal to a digital signal. The logic 2026 is responsible for calibration and filtering data. The interface 2028 is connected to the temperature, humidity, and pressure sensor pinout 1910. The sensor is available to be used in both I2C and SPI interfaces.

The temperature sensor working principle diagram 2050 illustrates temperature detection and monitoring. The intended use of the temperature sensor is to detect, measure, and monitor temperature value 608 inside or surrounding the waste bin 600. The temperature sensing element 2012 working principle is based on using a diode 2052 as a temperature sensor. The functioning consists of a constant current I 2056 being applied across the junction of the diode 2052, and output voltage V 2058 is proportional to the temperature. The voltage V 2058 change across a diode or PN junction can be used with a lookup table or an equation to calculate a temperature for any given diode voltage. The MEMS semiconductor temperature sensors are based on these fundamental temperature and current characteristics of the bipolar transistor or diode 2052. If the forward biased junction is connected to a constant current I 2056 generator, through positive power supply VDD 1912 and GND 1924 via resistor R 2054, the voltage V 2058 across the diode 2052 becomes a measure of the junction temperature. The sensor has high degree of linearity and simple calibration.

The humidity sensor working principle diagram 2110 illustrates humidity detection and monitoring. The intended use of the humidity sensor is to detect, measure, and monitor the humidity value 610 inside or surrounding the waste bin 600. The humidity sensing element 2014 working principle is based on using a differential capacitance as a humidity sensor. The MEMS humidity sensor is a differential capacitance type that consists of a humidity sensitive polymer layer 2114 sensitive to the water vapor 610 that is sandwiched between two electrodes 2112 and 2116 that act as capacitor plates. The upper water vapor permeability electrode 2112 consists of a grid that allows water vapor 2120 to pass into the humidity sensitive polymer layer 2114 below, which is a backplate electrode 2116, thus altering the capacitance between the two electrodes. The capacitance of the humidity sensing element 2014 is proportional to humidity. The above elements are on top of a base substrate 2118. On-chip circuits carry out automatic calibration and signal processing to produce a humidity measurement.

The pressure sensor working principle diagram 2150 illustrates pressure detection and monitoring. The pressure sensor use is to detect, measure, and monitor a pressure value 612 inside or surrounding the waste bin 600. The pressure sensing element 2016 working principle is based on using a change in capacitance as a pressure sensor. The MEMS technology allows a small and flexible structure in the form of a capacitive sensor. It contains an original diaphragm 2152 that is formed through one capacitive plate that is in contact with the atmosphere with respect to the reference backplate 2156. The atmospheric pressure 2158 is detected through how much the original diaphragm 2152 is deformed (diaphragm 2154) due to resulting pressure. The higher the atmospheric pressure 2158, the more the deformed diaphragm 2154 moves, which results in a higher barometer reading. The deformation of the diaphragm changes the spacing between the conductors and hence changes the capacitance. The deflection 2160 in the diaphragm due to change in pressure produces a change in capacitance. The capacitance change can be measured by including the sensor in a tuned circuit, which changes its frequency with changing pressure.

The temperature, humidity, and pressure sensor operating principle diagram 2200 illustrates the waste bin 600 exposed to the weather element 2202. The smart waste bin sensor device 300 temperature, humidity, and pressure sensor 308 detects the temperature value 608, humidity value 610, and pressure value 612 inside or surrounding the waste bin 600. The temperature value 608, humidity value 610, and pressure value 612 are stored in the secure digital card 840 of the SBM 800.

5. Transmit the detected and measured temperature, humidity, and pressure sensor 308 waste bin 600 temperature value 608, humidity value 610, and pressure value 612 to the cloud server 114 and store them in the database 5300.

6. Monitor the temperature, humidity, and pressure sensor 308 waste bin 600 temperature value 608, humidity value 610, and pressure value 612 in the waste bin mobile application 110 and waste collection facility application 112.

Figure 25:
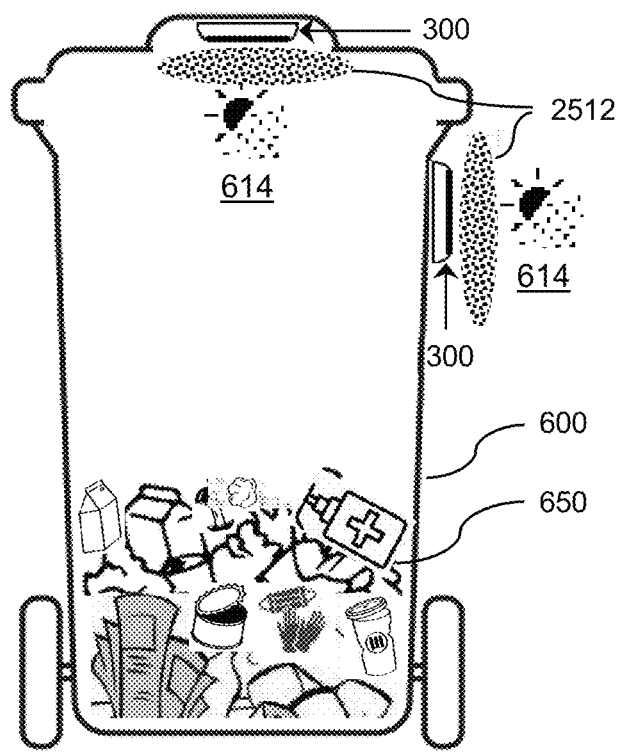
FIG. 25 illustrates an example air quality sensor operating principle diagram that can be utilized to implement various embodiments.

FIGS. 23, 24 and 25 illustrate an example air quality sensor 310, wherein the air quality sensor 310 implements, operates, detects, measures, and monitors the air quality index inside or surrounding the waste bin 600.

FIG. 23 illustrates an example air quality sensor pinout 2310 and an air quality sensor wiring table 2350 describing the hardware wiring connection steps of an air quality sensor pinout 2310 connected to the single board microcomputer 800 general purpose input output pinout 850 that can be utilized to implement various embodiments.

FIG. 24 illustrates an example air quality sensor working principle block diagram 2410 and an air quality index level of concern table 2450 that can be utilized to implement various embodiments.

FIG. 25 illustrates an example air quality sensor operating principle diagram 2500 that can be utilized to implement various embodiments.

The air quality sensor 310 implements, operates, detects, measures, and monitors the air quality index value 614 inside or surrounding the waste bin 600 per the following procedure:

1. Log in to the single board microcomputer 800 operating software and access general purpose input output pinout 850 settings. Assign and map the general purpose input output pinout 850 to be connected to an air quality sensor pinout 2310. Save general purpose input output pinout 850 settings.

2. Connect the air quality sensor pinout 2310 to a single board microcomputer 800 assigned general purpose input output pinout 850 as listed in the air quality sensor wiring table 2350. The hardware implementation of the air quality sensor 310 is complete after the air quality sensor pinout 2310 is connected to a single board microcomputer 800 general purpose input output pinout 850.

3. Prepare the single board microcomputer 800 operating software to communicate with the air quality sensor 310 by loading the general purpose input output pinout 850 software library and installing the air quality sensor 310 software driver.

4. Program, install, execute, and run the air quality sensor 310 software on the single board microcomputer 800 operating software.

The air quality sensor working principle block diagram 2410 illustrates the functioning of the air quality sensor 310 as follows:

The intended use of the air quality sensor 310 is to detect, measure, and monitor the air quality index value 614 inside or surrounding the waste bin 600 and can be used to provide level of health concern information and dispose of the waste. The air quality sensor working principle block diagram 2410 uses a laser scattering principle. The laser scattering principle used for such sensor produces scattering by using a laser source 2412 to produce a laser beam 2414 to radiate suspending particles in the air 2416 entering through an air channel 2418, passing through the light scattering measuring cavity 2420, and then collecting scattering light in a certain degree, and finally obtaining the curve of scattering light change with time. The raw electric signal 2422 is amplified when it passes through a filter amplifier circuit 2424. In the end, the filtered electric signal 2426 is processed by an on-chip microprocessor 2428. Equivalent particle diameter and the number of particles with different diameters per unit volume can be calculated by the on-chip microprocessor 2428 based on the MIE theory of absorption and scattering of plane electromagnetic waves by uniform isotropic particles of the simplest form. MIE theory is an analytical solution of Maxwell's equations for the scattering of electromagnetic radiation by particles of any size. The output digital signal 2430 is the quality and number of each particle with different size per unit volume. The unit volume of the particle number is 0.1 L, and the unit of mass concentration is $\mu g/m^3$.

An air quality index (AQI) is used by government agencies to communicate to the public how polluted the air currently is or how polluted it is forecast to become. Public health risks increase as the AQI rises. The air quality index level of concern table 2450 lists the AQI color, levels of concern, values of the index, and corresponding different level of health concern. The description of the air quality also provides information about what kind of personal protective equipment (PPE) is required while handling waste. The air quality index data obtained through the air quality sensor 310 can be further augmented by the Environmental Protection Agency AirNow Application Program Interface (API), which allows for access to real-time data and forecasts.

The air quality sensor operating principle diagram 2500 illustrates the waste bin 600 exposed to the air particle element 2512. The smart waste bin sensor device 300 air quality sensor 310 detects the air quality index value 614 inside or surrounding the waste bin 600. The air quality index values 614 are stored in the secure digital card 840 of the SBM 800.

5. Transmit the detected and measured air quality sensor 310 waste bin 600 air quality index value 614 to the cloud server 114 and store it in the database 5300.

6. Monitor the air quality sensor 310 waste bin 600 air quality index value 614 in the waste bin mobile application 110 and waste collection facility application 112.

FIGS. 26, 27, 28 and 29 illustrate an example smoke sensor 312, wherein the smoke sensor 312 implements, operates, detects, measures, and monitors the smoke level inside or surrounding the waste bin 600.

FIG. 26 illustrates an example smoke sensor pinout 2610 and a smoke sensor wiring table 2650 describing the hardware wiring connection steps of a smoke sensor pinout 2610 connected to the single board microcomputer 800 general purpose input output pinout 850 that can be utilized to implement various embodiments.

FIG. 27 illustrates an example smoke sensor working principle diagram comprising a smoke sensor sensing element internal structure diagram 2710, a smoke sensing element schematic circuit 2720, a smoke sensing element cross section view 2730, and a smoke sensor circuit diagram 2750 that can be utilized to implement various embodiments.

Figure 28:
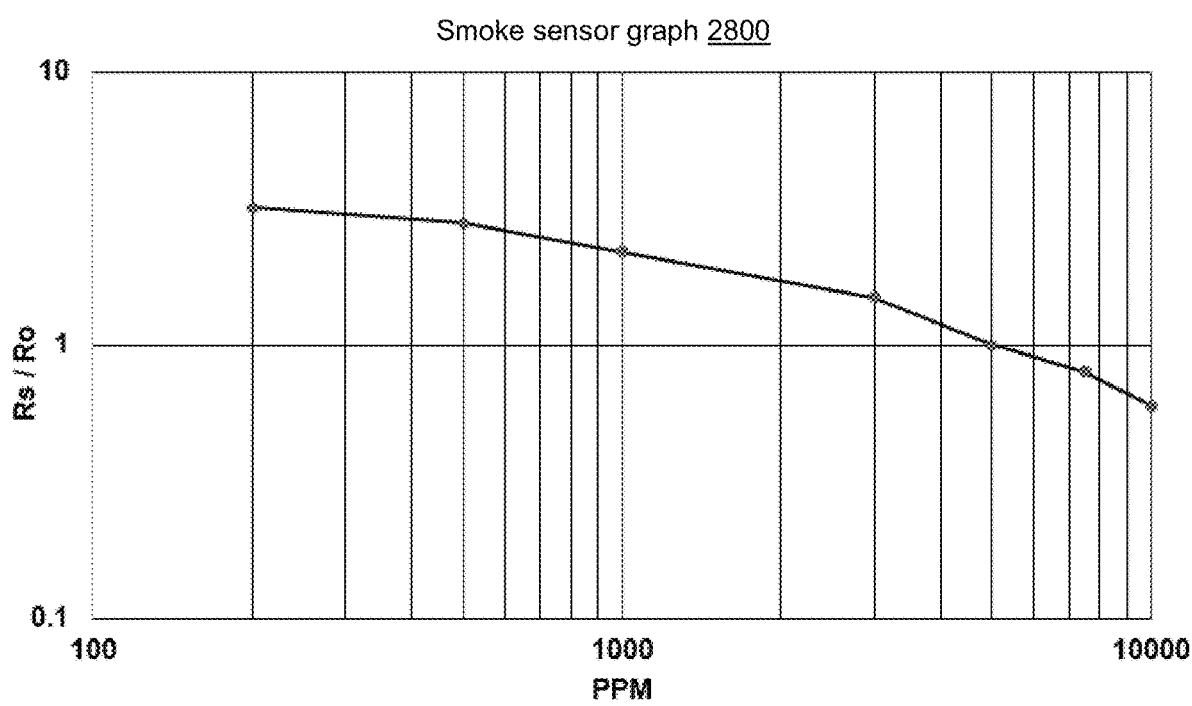
FIG. 28 illustrates an example smoke sensor graph that can be utilized to implement various embodiments.

FIG. 28 illustrates an example smoke sensor graph 2810 that can be utilized to implement various embodiments.

Figure 29:
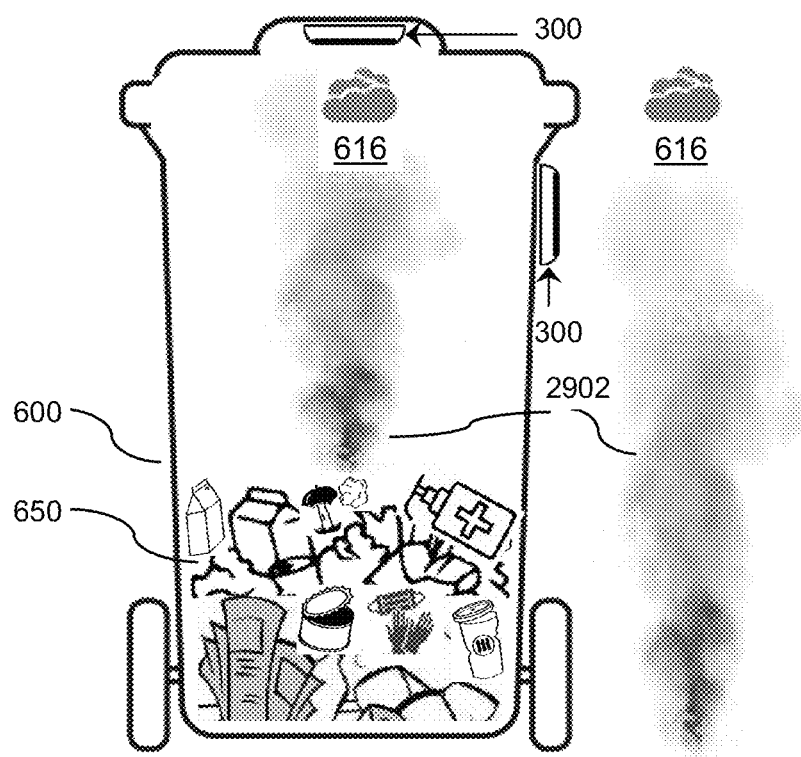
FIG. 29 illustrates an example smoke sensor operating principle diagram that can be utilized to implement various embodiments.

FIG. 29 illustrates an example smoke sensor operating principle diagram 2900 that can be utilized to implement various embodiments.

The smoke sensor 312 implements, operates, detects, measures, and monitors the smoke level value 616 inside or surrounding the waste bin 600 as follows:

1. Log in to the single board microcomputer 800 operating software and access general purpose input output pinout 850 settings. Assign and map the general purpose input output pinout 850 to be connected to a smoke sensor pinout 2610. Save general purpose input output pinout 850 settings.

2. Connect the smoke sensor pinout 2610 to a single board microcomputer 800 assigned general purpose input output pinout 850 as listed in the smoke sensor wiring table 2650. The hardware implementation of the smoke sensor 312 is complete after the smoke sensor pinout 2610 is connected to a single board microcomputer 800 general purpose input output pinout 850.

3. Prepare the single board microcomputer 800 operating software to communicate with the smoke sensor 312 by loading the general purpose input output pinout 850 software library and installing the smoke sensor 312 software driver.

4. Program, install, execute, and run the smoke sensor 312 software on the single board microcomputer 800 operating software.

The smoke sensor working principle diagram 2700 illustrates the functioning of the smoke sensor 312 as follows:

The intended use of the smoke sensor 312 is to detect, measure, and monitor smoke inside or surrounding the waste bin 600. The smoke sensor sensing element internal structure diagram 2710 and corresponding smoke sensing element schematic circuit 2720 are part of the smoke sensor steel mesh chamber 2620 when the outer mesh is removed. The star-shaped structure is formed by the smoke sensor sensing element internal structure diagram 2710 and six connecting legs that extend beyond the base. Out of six, two leads H 2716 are responsible for heating the sensing element and are connected through a nickel-chromium coil, a well-known conductive alloy. The remaining two A 2712 and two B 2714 leads are responsible for output signals and are connected using platinum wires. These wires are connected to the body of the sensing element and convey small changes in the current that passes through the sensing element. As shown in the smoke cross section view of the sensing element 2730, the nickel-chromium coil 2732 and aluminum oxide 2734 based ceramic form a heating system, while platinum wires 2736 and a coating of tin dioxide 2738 form a sensing system. When tin dioxide 2738 (semiconductor particles) is heated in air at high temperature, oxygen is absorbed on the surface. In clean air, donor electrons in tin dioxide are attracted toward oxygen, which is absorbed on the surface of the sensing material. This prevents electric current flow, and voltage is low. In the presence of smoke, the surface density of absorbed oxygen decreases as it reacts with the reducing gases. Electrons are then released into the tin dioxide 2738, allowing current to flow freely through the sensor, resulting in higher voltage. The smoke sensor circuit diagram 2750 depicts how the input voltage Vcc 2612 with GND 2614 is applied to the sensing element schematic circuit 2720, and corresponding output voltage is recorded through Vout 2754 through variable resistance RL 2752. The detection of smoke Vout 2754 can be either through digital analog AOUT 2616 or DOUT 2618 output as shown in the smoke sensor circuit diagram 2750. In presence of smoke, the digital and analog output goes high. In the case of analog AOUT 2616 output voltage, Vout 2754 provided by the sensor changes in proportion to the concentration of smoke. The greater the smoke concentration, the higher is the output voltage Vout 2754; while lesser smoke concentration results in low output voltage Vout 2754. The analog signal AOUT 2616 from the smoke sensor can be further fed internally to a high precision comparator to digitize the signal and provide the digital DOUT 2618 output. The smoke concentration parts per million (PPM) can be determined using the Rs/Ro V/S PPM smoke sensor graph 2800. The value of Ro is the value of resistance in fresh or clean air (or the air which is being compared), and the value of Rs is the value of resistance of the sensor exposed to gases. The sensor should be calibrated by finding the values of Ro in clean air and then using that value to find Rs using the mathematical formula:

$$\text{Resistance of sensor}(Rs) = (Vcc/VRL - 1) \times RL$$

Where Vcc 2612 is the positive power supply, VRL is the output voltage Vout 2754, and RL 2752 is variable resistance.

Once Rs and Ro are calculated, the ratio Rs/Ro can be determined, and using the smoke sensor graph 2800, the corresponding equivalent value of PPM for the smoke can be calculated.

The smoke sensor operating principle diagram 2900 illustrates the waste bin 600 exposed to the smoke element 2902.

The smart waste bin sensor device 300 smoke sensor 312 detects the smoke level value 616 inside or surrounding the waste bin 600. The smoke sensor 312 waste bin 600 smoke level value 616 is stored in the secure digital card 840 of the SBM 800.

5. Transmit the detected and measured smoke sensor 312 waste bin 600 smoke level value 616 to the cloud server 114 and store it in the database 5300.

6. Monitor the smoke sensor 312 waste bin 600 smoke level value 616 in the waste bin mobile application 110 and waste collection facility application 112.

FIGS. 30, 31, 32, 33 and 34 illustrate an example gas sensor 314, wherein the gas sensor 314 implements, operates, detects, measures, and monitors gas types inside or surrounding the waste bin 600.

FIG. 30 illustrates an example gas sensor pinout 3010 and a gas sensor wiring table 3050 describing the hardware wiring connection steps of a gas sensor pinout 3010 connected to the single board microcomputer 800 general purpose input output pinout 850 that can be utilized to implement various embodiments.

FIG. 31 illustrates an example gas sensor working principle diagram 3110 and a gas sensor circuit diagram 3150 that can be utilized to implement various embodiments.

FIG. 32 illustrates an example gas sensor RED sensor graph 3210 and an OX sensor graph 3250 that can be utilized to implement various embodiments.

Figure 33:
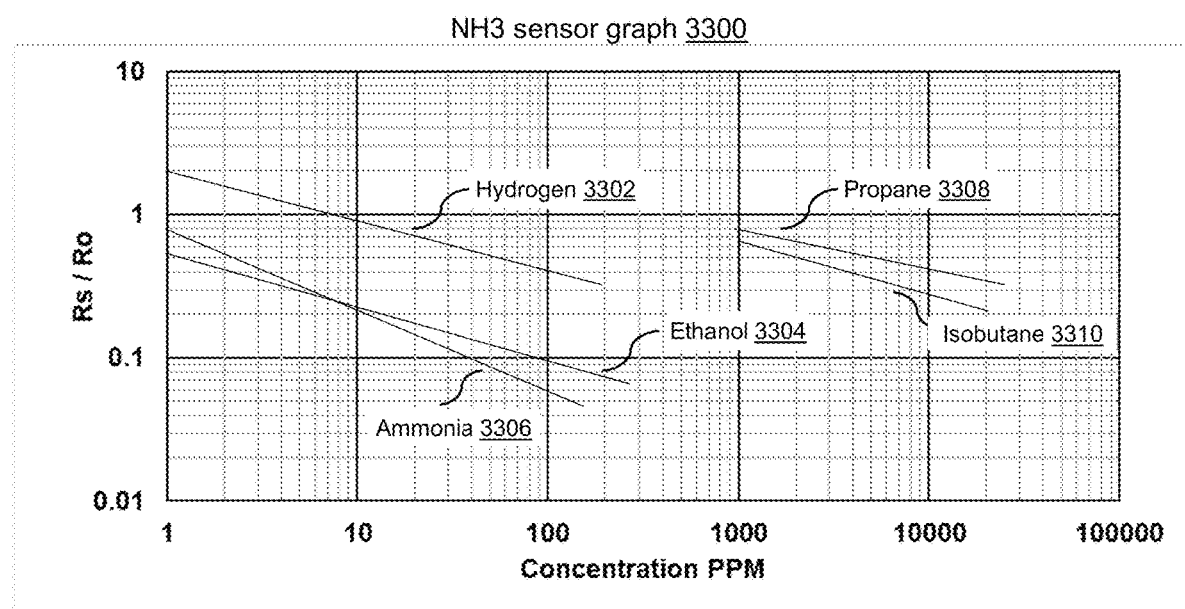
FIG. 33 illustrates an example gas sensor NH3 sensor graph that can be utilized to implement various embodiments.

FIG. 33 illustrates an example gas sensor NH3 sensor graph 3300 that can be utilized to implement various embodiments.

Figure 34:
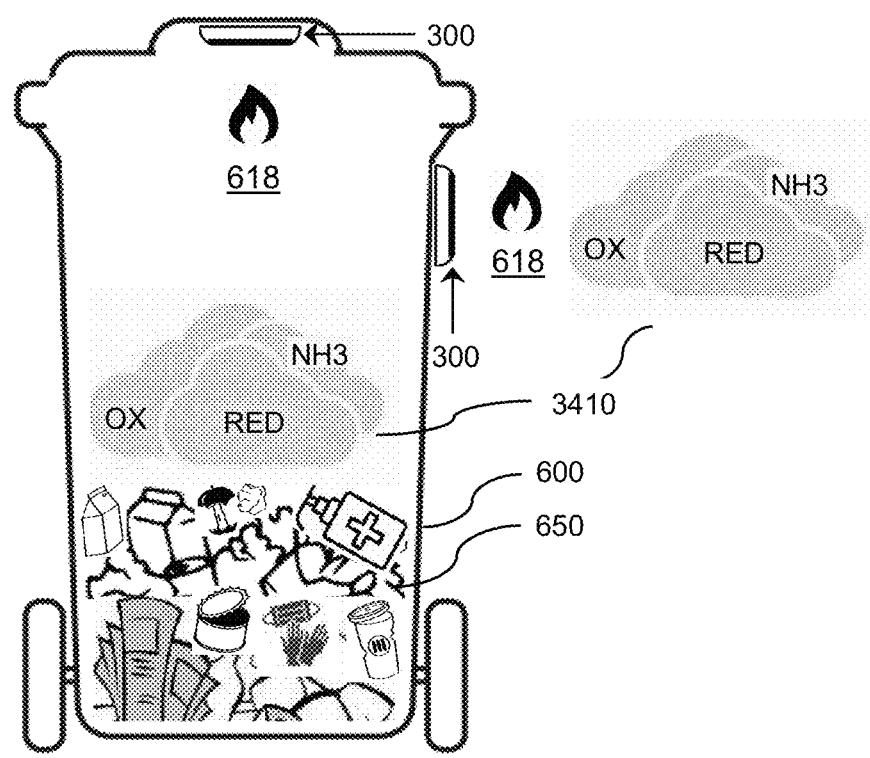
FIG. 34 illustrates an example gas sensor operating principle diagram that can be utilized to implement various embodiments.

FIG. 34 illustrates an example gas sensor operating principle diagram 3400 that can be utilized to implement various embodiments.

The gas sensor 314 implements, operates, detects, measures, and monitors the gas type value 618 inside or surrounding the waste bin 600 as follows:

1. Log in to the single board microcomputer 800 operating software and access general purpose input output pinout 850 settings. Assign and map the general purpose input output pinout 850 to be connected to a gas sensor pinout 3010. Save general purpose input output pinout 850 settings.

2. Connect the gas sensor pinout 3010 to a single board microcomputer 800 assigned general purpose input output pinout 850 as listed in the gas sensor wiring table 3050.

The hardware implementation of the gas sensor 314 is complete after the gas sensor pinout 3010 is connected to a single board microcomputer 800 general purpose input output pinout 850.

3. Prepare the single board microcomputer 800 operating software to communicate with the gas sensor 314 by loading the general purpose input output pinout 850 software library and installing the gas sensor 314 software driver.

4. Program, install, execute, and run the gas sensor 314 software on the single board microcomputer 800 operating software.

The gas sensor working principle diagram 3110 and gas sensor circuit diagram 3150 illustrate the functioning of the gas sensor 314 as follows:

The intended use of the gas sensor 314 is to detect, measure, and monitor the gas type either inside or surrounding the waste bin 600. The basic principle behind metal oxide gas sensors is that the resistance of the detecting layer in the sensor changes in the presence of the target gases RED, OX, and NH3 3114. The reducing and ammonia gases such as carbon monoxide or volatile organic compounds (VOC) remove some of the "insulative" oxygen species at the grain boundaries, thus causing the overall resistance to go down. Alternatively, oxidizing gases such as nitrogen dioxide add to the insulative oxygen species, causing the resistance to increase. The MEMS silicon metal oxide gas sensor is based on changes to the electrical resistance for different concentrations of varied gases.

In clean air, donor electrons in the tin dioxide 3118 are attracted toward oxygen, which adsorbs electrons 3116 on the surface of the sensing material tin dioxide 3118, preventing electric current flow. In the presence of reducing and ammonia gases, the surface density of adsorbed oxygen decreases as it reacts with the reducing gases. Electrons are then released into the tin dioxide 3118, which decreases resistance, allowing current to flow freely through the sensor. The oxidizing gases such as nitrogen dioxide add to the insulative oxygen to tin dioxide 3118, causing the resistance to increase and less current to flow. The gas sensor sensing elements comprise the heater 3122 element inside the alumina 3120. The VCC 3012 is used as a positive power supply to the circuit.

The gas sensor circuit diagram 3150 illustrates the metal oxide semiconductor (MOS) consisting of three fully independent sensing chips RED 3152, OX 3156, and NH3 3160. The silicon gas sensor structure consists of an accurately micro-machined diaphragm with an embedded heating resistor and the sensing layer on top. The resistors R1 3154, R2 3158, and R3 3162 are necessary to obtain the right temperatures on the three independent heaters while using a single VCC 3012 power supply and ground GND 3020. The sensor includes three sensor chips with independent heaters and sensitive layers. The sensor chip RED 3152 detects reducing (RED) gases, the sensor chip OX 3156 detects oxidizing gases, and the sensor chip NH3 3160 detects ammonia based on changes to the electrical resistance. The output can be read through RED OUT 3014, OX OUT 3016, and NH3 OUT 3018. The analog voltage readings that the sensor produces are read by an analog to digital converter (ADC) and then converted into resistances by the code. These resistances will range from low hundreds of ohms to tens of thousands of ohms and vary depending on the levels of each group of gases. The reducing and NH3 resistance readings will drop with increasing concentrations of the gases that they detect, and the oxidizing sensor will increase with increasing levels of nitrogen dioxide. The sensor reacts to the different gases as shown in the RED sensor graph 3210, OX sensor graph 3250, and NH3 sensor graph 3300.

The value of Ro is the value of resistance in clean air (or the air being compared) and the value of Rs is the value of resistance of the sensor exposed to gases. The sensor should be calibrated first by finding the values of Ro in fresh air and then using that value to find Rs using the mathematical formula:

$$\text{Resistance of sensor}(Rs) = (Vcc/VRL - 1) \times RL$$

Where Vcc 3012 is the positive power supply, VRL is the output voltage RED OUT 3014, OX OUT 3016, and NH3 OUT 3018 corresponding to RL variable resistance R1 3154, R2 3158, and R3 3162, respectively.

Once Rs and Ro are calculated, the ratio is determined, and then using the RED sensor graph 3210, OX sensor graph 3250, and NH3 sensor graph 3300, the equivalent value of parts per million (PPM) for RED, OX, and NH3 gas is calculated.

The detected gases are comprised as follows:

A reducing gas, wherein the reducing gas comprises: a carbon monoxide 3212, an ammonia 3214, an ethanol 3216, a hydrogen 3218, a methane 3220, a propane 3222, and an isobutane 3224.

An oxidizing gas, wherein the oxidizing gas comprises: a nitrogen dioxide 3252, a nitrogen oxide 3254, and a hydrogen 3256.

An ammonia, wherein the ammonia comprises: a hydrogen 3302, an ethanol 3304, an ammonia 3306, a propane 3308, and an isobutane 3310.

The gas sensor operating principle diagram 3400 illustrates the waste bin 600 exposed to the gas element 3410. The smart waste bin sensor device 300 gas sensor 314 detects the gas type value 618 inside or surrounding the waste bin 600. The gas type value 618 is stored in the secure digital card 840 of the SBM 800.

5. Transmit the detected and measured gas sensor 314 waste bin 600 gas type value 618 to the cloud server 114 and store it in the database 5300.

6. Monitor the gas sensor 314 waste bin 600 gas type value 618 in the waste bin mobile application 110 and waste collection facility application 112.

FIGS. 35, 36 and 37 illustrate an example ambient light sensor 316, wherein the ambient light sensor 316 implements, operates, detects, measures, and monitors the ambient light level inside or surrounding the waste bin 600.

FIG. 35 illustrates an example ambient light sensor pinout 3510 and an ambient light sensor wiring table 3550 describing the hardware wiring connection steps of an ambient light sensor pinout 3510 connected to the single board microcomputer 800 general purpose input output pinout 850 that can be utilized to implement various embodiments.

FIG. 36 illustrates an example ambient light sensor working principle diagram 3610 and an ambient light sensor circuit block diagram 3650 that can be utilized to implement various embodiments.

FIG. 37 illustrates an example ambient light sensor operating principle diagram 3700 that can be utilized to implement various embodiments.

The ambient light sensor 316 implements, operates, detects, measures, and monitors the ambient light level value 620 inside or surrounding the waste bin 600 per following procedure:

1. Log in to the single board microcomputer 800 operating software and access general purpose input output pinout 850 settings. Assign and map the general purpose input output pinout 850 to be connected to the ambient light sensor pinout 3510. Save general purpose input output pinout 850 settings.

2. Connect the ambient light sensor pinout 3510 to a single board microcomputer 800 assigned general purpose input output pinout 850 as listed in the ambient light sensor wiring table 3550. The hardware implementation of ambient light sensor 316 is complete after the ambient light sensor pinout 3510 is connected to a single board microcomputer 800 general purpose input output pinout 850.

3. Prepare the single board microcomputer 800 operating software to communicate with the ambient light sensor 316 by loading the general purpose input output pinout 850 software library and installing the ambient light sensor 316 software driver.

4. Program, install, execute, and run the ambient light sensor 316 software on the single board microcomputer 800 operating software.

The ambient light sensor working principle diagram 3610 illustrates measurement of ambient light as follows:

The intended use of the ambient light sensor 316 is to detect, measure, and monitor ambient light inside or surrounding the waste bin 600 to reduce power consumption and increase waste bin 600 battery life. Ambient light sensors are silicon monolithic circuits with an integrated light-sensitive semiconductor photodiode—a PN junction which converts light into an electrical signal. Light is necessary for the sense of sight. Light is a form of electromagnetic radiation. It carries energy in the form of small energy packets called photons. The energy in the photon is transferred to the objects when they come into contact with it. This characteristic of light is used in designing sensors that can detect light. These sensors, known as ambient light sensors, absorb the energy from light and change it into electricity with the help of the photoelectric effect. The electricity produced will be proportional to the intensity of light which falls on the sensor and sensor material. A photodiode can consist of three layers, p-type 3614, n-type 3618, and an intrinsic layer 3616. The p-type 3614 and n-type 3618 layers are heavily doped. On the other hand, the intrinsic layer 3616 is an undoped semiconductor material. When light or incident photon 3612 energy is applied to the PIN diode, a major part of the energy is observed by the intrinsic or depletion region because of the wide depletion width. As a result, many electron-hole pairs are generated. Free electrons 3620 generated in the intrinsic region move toward the n-side, whereas holes 3622 generated in the intrinsic region move toward the p-side. The free electrons and holes moved from one region to another region carry electric current. When free electrons and holes reach the n region and p region, they are attracted toward the positive and negative terminals of the battery.

The ambient light sensor circuit block diagram 3650 consists of a photodiode PD 3652 with approximately human eye response, which absorbs the energy from light and changes it into electricity with the help of the photoelectric effect. The amplifier AMP 3654 is responsible for converting the photodiode PD 3652 current to voltage. The integrated circuit analog to digital converter ADC 3656 converts the photo sensor's output to a digital signal. The logic and I2C interface 3658 are responsible for ambient light calculation and I2C bus interface. The frequency of oscillator 3660 oscillation is proportional to light intensity and is used to regulate output. The I2C SDA 3518 interface simplifies the circuitry in an application by removing the need for an external ADC and allows for direct connection to the I2C communication bus of a single board microcomputer 800 general purpose input output pinout 850. The other connected pins are VCC 3512, ADDR 3514, and GND 3516. Ambient light sensor ICs have an output current proportional to light (current sourcing) and can have a measurement range of 0 to ~65,535 lux. The ambient light sensor classification range is 0-100 (dark), 101-1,000 (dim), 1,001-10,000 (overcast), 10,001-25,000 (daylight), and 25,001-65,535 (sunlight).

The ambient light sensor operating principle diagram 3700 illustrates the waste bin 600 exposed to the sunlight element 3712, daylight element 3714, overcast element 3716, dim element 3718, and dark element 3720. The smart waste bin sensor device 300 ambient light sensor 316 detects the ambient light level value 620 inside or surrounding the waste bin 600. The ambient light level value 620 is stored in the secure digital card 840 of the SBM 800.

5. Transmit the detected and measured ambient light sensor 316 waste bin 600 ambient light level value 620 to the cloud server 114 and store it in the database 5300.

6. Monitor the ambient light sensor 316 waste bin 600 ambient light level value 620 in the waste bin mobile application 110 and waste collection facility application 112.

The smart waste bin sensor device 300 is in an inactive energy saving mode if the ambient light level value 620 based on illuminance inside or surrounding the waste bin 600 is dim or dark.

Ambient light sensor 316 information is used to conserve the battery during the night and/or other period of inactive use of the waste bin 600. For example, waste bin sensor arrangements and the single board microcomputer 800 can be set in a low-energy sleep mode during the night using the ambient light sensor 316.

FIG. 38 and FIG. 39 illustrate an example motion sensor 318, wherein the motion sensor 318 implements, operates, detects, measures, and monitors motion events inside or surrounding the waste bin 600.

FIG. 38 illustrates an example motion sensor pinout and a motion sensor wiring table describing the hardware wiring connection steps of a motion sensor pinout connected to the single board microcomputer 800 general purpose input output pinout 850 that can be utilized to implement various embodiments.

FIG. 39 illustrates an example motion sensor working principle diagram 3910 and a motion sensor operating principle diagram 3950 that can be utilized to implement various embodiments.

The motion sensor 318 implements, operates, detects, measures, and monitors motion events near the waste bin 600 per following procedure:

1. Log in to the single board microcomputer 800 operating software and access general purpose input output pinout 850 settings. Assign and map the general purpose input output pinout 850 to be connected to a motion sensor pinout 3810. Save general purpose input output pinout 850 settings.

2. Connect the motion sensor pinout 3810 to a single board microcomputer 800 assigned general purpose input output pinout 850 as listed in the motion sensor wiring table 3850. The hardware implementation of the motion sensor 318 is complete after the motion sensor pinout 3810 is connected to a single board microcomputer 800 general purpose input output pinout 850.

3. Prepare the single board microcomputer 800 operating software to communicate with the motion sensor 318 by loading the general purpose input output pinout 850 software library and installing the motion sensor 318 software driver.

4. Program, install, execute, and run the motion sensor 318 software on the single board microcomputer 800 operating software.

The motion sensor working principle diagram 3910 illustrates the functioning of the motion sensor 318 is as follows:

The intended use of the motion sensor 318 is to detect, measure, and monitor motion events inside or surrounding the waste bin 600. The passive infrared (PIR) motion sensor module 3912, as the name implies, is used for detecting the motion of a person or waste bin owner 104 in front of it. The motion sensor 318 works based on infrared technology, and it can automatically control by itself with high sensitivity and high reliability. Because of the minimum size and low-power operation mode, it is used in battery-powered smart waste bin sensor device 300 applications. The PIR motion sensor 318 consists of two main parts: a pyroelectric sensing element 3914 and a Fresnel lens 3916. The pyroelectric sensing element 3914 can detect infrared radiation. All objects with a temperature above absolute zero (0° Kelvin/−273.15° C.) emit heat energy in the form of infrared radiation (IR), including human bodies. A pyroelectric sensor has two rectangular slots in it made of a material that allows the infrared radiation to pass. Behind these, there are two separate infrared sensor electrodes, one responsible for producing a positive output and the other a negative output. Now if an animal, person, resident, waste bin owner 104, or pedestrian 106 passes through its detecting area 3918, also shown in the heat source movement 3920 diagram, opposite to its Fresnel lens 3916, the module will detect the change in the IR radiation (as the living body emits IR radiation), and as a response provides HIGH logic at the output OUT 3814 pin. This way the motion sensor 318 can be used to detect motion of living things in front of its lens. The on-board signal processing IC processes this signal and turns the output OUT 3814 pin of the sensor HIGH or LOW accordingly as shown in the output signal 3922.

The motion sensor operating principle diagram 3950 illustrates the waste bin 600 motion event detection when an animal, person, resident, waste bin owner 104, or pedestrian 106 passes through its detecting area. The smart waste bin sensor device 300 motion sensor 318 detects the motion event value 622 inside or surrounding the waste bin 600. The motion event value 622 is stored in the secure digital card 840 of the SBM 800.

5. Transmit the detected and measured motion sensor 318 waste bin 600 motion event value 622 to the cloud server 114 and store it in the database 5300.

6. Monitor the waste bin 600 motion sensor 318 motion event value 622 in the waste bin mobile application 110 and waste collection facility application 112.

The smart waste bin sensor device 300 motion sensor 318 detects if a person is at a specified distance from the waste bin 600, and if motion is detected, the motion sensor 318 can place the plurality of sensors in an active state and send motion alerts to the user.

Figure 42:
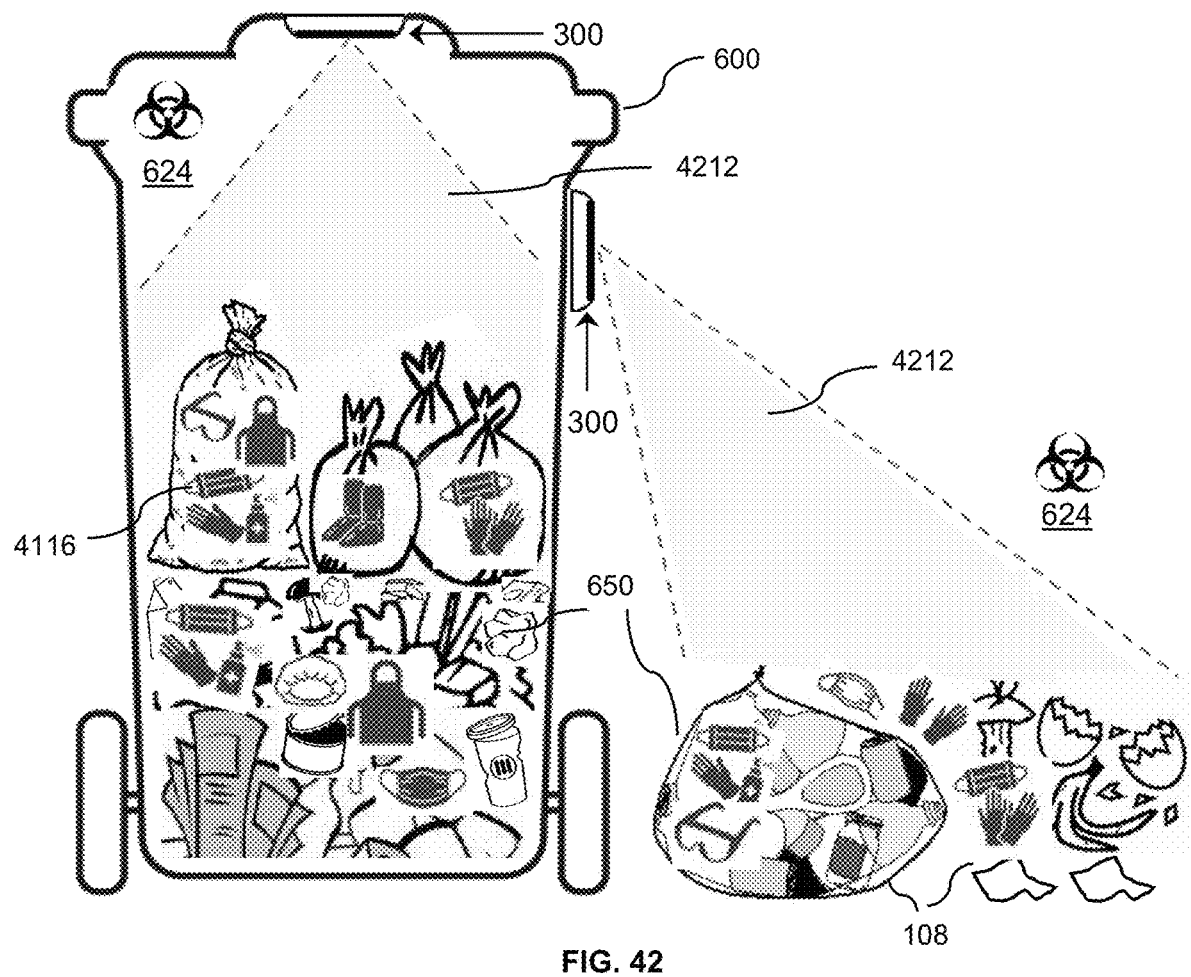
FIG. 42 illustrates an example waste and litter sensor operating principle diagram that can be utilized to implement various embodiments.

FIGS. 40, 41 and 42 illustrate an example waste and litter sensor 320, wherein the waste and litter sensor 320 implements, operates, and monitors waste, and the litter sensor implements, operates, detects, measures, and monitors a waste type, a waste volume, a litter type, a litter level, a biohazardous waste type, and a biohazardous waste level inside or surrounding the waste bin 600.

FIG. 40 illustrates an example waste and litter sensor camera pinout 4010 and a waste and litter sensor wiring table 4050 describing the hardware wiring connection steps of a waste and litter sensor pinout 4010 to the single board microcomputer 800 general purpose input output pinout 850 that can be utilized to implement various embodiments.

FIG. 41 illustrates an example waste and litter sensor working principle diagram 4100 comprising a waste and litter image processing module 4110 and a biohazardous waste bin 4150 that can be utilized to implement various embodiments.

FIG. 42 illustrates an example waste and litter sensor operating principle diagram 4200 that can be utilized to implement various embodiments.

The waste and litter sensor 320 functions per following procedure:

1. Log in to the single board microcomputer 800 operating software and access camera CSI port 822 settings. Assign and map the camera CSI port 812 to be connected to the waste and litter sensor camera pinout 4010. Save camera CSI port 812 settings.

2. Connect the waste and litter sensor pinout 4010 to a single board microcomputer 800 assigned camera CSI port 812 as listed in the waste and litter sensor wiring table 4050. The hardware implementation of the waste and litter sensor 320 is complete after the waste and litter sensor pinout 4310 is connected to a single board microcomputer 800 camera CSI port 812.

3. Prepare the single board microcomputer 800 operating software to communicate with the waste and litter sensor 320 by loading the general purpose input output pinout 850 software library and installing the waste and litter sensor 320 software driver.

4. Program, install, execute, and run the waste and litter sensor 320 software on the single board microcomputer 800 operating software.

The waste and litter sensor working principle diagram 4110 illustrates the functioning of the waste and litter sensor 320 as follows:

The waste and litter sensor 320 consists of a camera, a flash, and a digital image processing component to process photos and videos.

The waste and litter sensor processing module 4410 includes taking waste 650 and litter 108 photos and classification of the waste 650 and litter 108 based on machine learning algorithms. In the processing step image acquisition and enhancement 4112, waste 650 and litter 108 photos are taken, and an algorithm converts the photo into a digital format. In the case of videos, a video image processing system is used to process frames of the video clip. In processing step image feature extraction 4114, an initial set of the raw waste photo data and video frames is divided and reduced to more manageable groups. The input photo image and video frames are transformed into a reduced set of features. The processing step pattern recognition 4116 is the process of recognizing patterns by using a machine learning algorithm. The image pattern recognition involves classification of feature extracted data in recognizing the waste and litter objects. In the processing step waste and litter classification 4118, waste and litter objects are classified into waste types, waste volume, litter types, litter level, biohazardous waste types, and biohazardous waste level information in the waste bin 600. The waste in the biohazardous waste bin 4150 can contain syringes, tissue slides, blood tubes, pipetting tips, reagent bottles, and so on. The waste 650 and litter 108 videos are used to increase the sensitivity of the results using video processing using images as the data format to store the video frames.

When a smart waste bin sensor device 300 is installed inside the waste bin body, the waste and litter sensor 320 implements, operates, detects, measures, and monitors a waste type, a waste volume, a biohazardous waste type, and a biohazardous waste level inside the waste bin 600. The camera and flash take the photos and videos of the waste 650 inside the waste bin 600. The waste volume measurement working principle involves taking pictures and videos of the waste inside the waste bin 600 at a set frequency and producing a 3-dimensional (3D) depth map of the waste bin 600 content to further refine the waste bin 600 waste fill level and also provide waste type information. The waste volume can also be calculated by establishing a relationship between an image pixel and an area or virtual wireframe and waste in the waste bin 600.

When a smart waste bin sensor device 300 is installed outside the waste bin body, the waste and litter sensor 320 implements, operates, detects, measures, and monitors a litter type, a litter level, a biohazardous waste type, and a biohazardous waste level outside the waste bin 600. The camera and flash take photos and videos of the litter 108 surrounding the waste bin 600 and classify the waste and litter types.

The waste type classification inside the waste bin 600 comprises: a food waste, a garbage, a plastic container, a paper, a yard waste, a hazardous waste, and a biohazardous waste. The litter type classification surrounding the waste bin comprises: an aluminum can, a paper cup, a fast food wrapper, a cardboard box, a plastic bottle, a cigarette butt, a tire, an electrical appliance, electronics, a battery, and a biohazardous material. The waste and litter image processing module can be programmed to recognize any waste objects. The litter level measurement working principle involves measuring the density of litter 108 surrounding the waste bin 600 and assigning the litter level value based on a camera machine vision algorithm and neural net algorithm.

The waste and litter sensor operating principle diagram 4200 illustrates the waste bin 600 exposed to the light element 4212. The smart waste bin sensor device 300 waste and litter sensor 320 detects the waste types, waste volume, litter types, litter level, and biohazardous waste types and biohazardous waste level inside or surrounding the waste bin 600. The waste and litter sensor 320 values like a waste type, a waste volume, a litter type, a litter level, a biohazardous waste type, and a biohazardous waste level are stored in the secure digital card 840 of the SBM 800. One of the representative values measured and stored is represented as biohazardous waste level value 624.

5. Transmit the detected and measured waste and litter sensor 320 waste bin 600 waste 650 and litter 108 photo and video data comprising waste types, waste volume, litter types, litter level, biohazardous waste types, and biohazardous waste level to the cloud server 114 and store it in the database 5300.

6. Monitor the waste and litter sensor 320 waste bin 600 waste 650 and litter 108 photo and video data comprising waste types, waste volume, litter types, litter level, biohazardous waste types, and biohazardous waste level in the waste bin mobile application 110 and waste collection facility application 112.

The smart waste bin sensor device 300 sends a private biohazardous alert to the waste bin mobile application 110 installed on the mobile device of the waste bin owner 104, the waste collection operator 118, and the waste collection vehicle 120 driver when the biohazardous waste level is above the predetermined threshold level in the waste bin 600.

FIGS. 43, 44 and 45 illustrate an example pathogen biosensor 322, wherein the pathogen biosensor 322 implements, operates, detects, measures, and monitors pathogen type and biosafety level, and further comprises a sterilizer to kill a set of pathogens inside or surrounding the waste bin 600.

FIG. 43 illustrates an example pathogen biosensor pinout 4310 and a pathogen biosensor wiring table 4350 describing the hardware wiring connection steps of a pathogen biosensor pinout 4310 connected to the single board microcomputer 800 general purpose input output pinout 850 that can be utilized to implement various embodiments.

FIG. 44 illustrates an example pathogen biosensor optical sensing working principle diagram 4410 and a pathogen biosensor ultrasound working principle diagram 4450 that can be utilized to implement various embodiments.

FIG. 45 illustrates an example set of pathogens 4510 and a biosensor operating principle diagram 4550 that can be utilized to implement various embodiments.

The set of pathogens 4510 can be a bacterium or bacteria 4512, a fungi or fungus 4514, and a virus or viruses 4516. The most common pathogens 4510 found in the waste comprise:

Bacteria comprising *Salmonella, Escherichia coli, Streptococcus, Shigella, Pseudomonas aeroginosa, mycobacterium, Giardia Lamblia, Yersinia,* and *Klebsiella,*

Fungus comprising ringworm, dermatophytes, yeast *candida,* and

Viruses comprising SARS-CoV-2, Dengue, Ebola, hepatitis A, Norovirus, Rotavirus, Adenoviruses, and Astroviruses.

The pathogen biosensor 322 implements, operates, detects, measures, and monitors pathogen type and biosafety level and further comprises a sterilizer to kill a set of pathogens inside or surrounding the waste bin 600 per following procedure:

1. Log in to the single board microcomputer 800 operating software and access general purpose input output pinout 850 settings. Assign and map the general purpose input output pinout 850 to be connected to a pathogen biosensor pinout 4310. Save general purpose input output pinout 850 settings.

2. Connect the pathogen biosensor pinout 4310 to a single board microcomputer 800 assigned general purpose input output pinout 850 as listed in the pathogen biosensor wiring table 4350. The hardware implementation of the pathogen biosensor 322 is complete after the pathogen biosensor pinout 4310 is connected to a single board microcomputer 800 general purpose input output pinout 850.

3. Prepare the single board microcomputer 800 operating software to communicate with the pathogen biosensor 322 by loading the general purpose input output pinout 850 software library and installing the pathogen biosensor 322 software driver.

4. Program, install, execute, and run the pathogen biosensor 322 software on the single board microcomputer 800 operating software.

The pathogen biosensor working principle diagram comprising a pathogen biosensor optical sensing working principle diagram 4410 and a pathogen biosensor ultrasound working principle diagram 4450 illustrate the functioning of the pathogen biosensor 322 as follows:

The intended use of the pathogen biosensor 322 is to detect, measure, and monitor pathogen types and levels, and kill pathogens inside or surrounding the waste bin 600. The pathogens can be bacteria, fungi, viruses, and so on. The pathogen biosensor 322 consists of a transmitter 4412, a receiver 4414, and a sterilizer 4416. The transmitter 4412 is capable of transmitting light energy as well as ultrasound signals. The receiver 4414 can receive the reflected light and reflected ultrasound signals. The sterilizer 4416 can transmit antipathogen electromagnetic radiation 4426 and antipathogen ultrasound energy 4464.

The pathogen biosensor optical working principle diagram 4410 illustrates the detection and killing of pathogens 4490 using optical light. The pathogen detection involves analysis of the reflection pattern of incident laser light from the pathogens 4510. The transmitter 4412 transmits light energy 4420 of a certain wavelength. Some of the light penetrates the body of the pathogen and is transmitted or absorbed 4422 by the pathogen. The reflected light energy 4424 received by the receiver 4414 has a unique spectral mapping signature wavelength of a given pathogen. The method used can be LSPR, localized surface plasmon resonance, or SERS, surface-enhanced Raman scattering. The pathogens are killed or sterilized by the safe antimicrobial sterilizer 4416 of the pathogen biosensor 322. The antipathogen electromagnetic radiation 4426 destroys the pathogens' cell covering, protein, or nucleic acids by killing or inactivating the pathogens 4510. The antipathogen electromagnetic radiation 4426 suitable for waste sterilization can be ionizing or nonionizing radiation. The nonionizing radiation to kill pathogens using ultraviolet light is more suitable for home waste bins.

The pathogen biosensor ultrasound working principle diagram 4450 illustrates the detection and killing of pathogens using ultrasound energy. The pathogens' detection involves analysis of a high-resolution imaging technique that uses sound waves to detect pathogens. The transmitter 4412 sends a transmitted ultrasound signal 4460 of a certain wavelength. The reflected ultrasound signal 4462 received by the receiver 4414 has a unique ultrasound image of a given pathogen. The method used is interaction of sound waves with the pathogen to produce a signature image of a pathogen. The pathogens 4510 are killed or sterilized by the sterilizer 4416 of the pathogen biosensor 322. The high frequency antipathogen ultrasound energy 4464 suitable for waste sterilization is used for cell disruption to kill pathogens 4510.

The pathogen biosensor 322 optical and ultrasound sensing allow easy-to-use, rapid, portable, multiplexed, and cost-effective detection of pathogens 4510 in waste.

The pathogen biosensor operating principle diagram 4550 illustrates the waste bin 600 exposed to the waste 650 containing pathogens 4510. The smart waste bin sensor device 300 pathogen biosensor 322 detects the pathogen types and a biosafety level value 626 inside or surrounding the waste bin 600. The sterilizer 4416 can transmit antipathogen electromagnetic radiation 4426 and antipathogen ultrasound energy 4464 to kill pathogens 4510. The pathogen biosensor 322 pathogen type and biosafety level value 626 are stored in the secure digital card 840 of the SBM 800.

5. Transmit the detected and measured waste bin 600 pathogen biosensor 322 pathogen type and biosafety level value 626 to the cloud server 114 and store them in the database 5300.

6. Monitor the waste bin 600 pathogen biosensor 322 pathogen type and biosafety level value 626 in the waste bin mobile application 110 and waste collection facility application 112.

The smart waste bin sensor device 300 sends a private biosafety alert to the waste bin mobile application 110 installed on the mobile device of the waste bin owner 104, the waste collection operator 118, and the waste collection vehicle 120 driver when the biosafety level is above a predetermined threshold level in the waste bin 600.

The smart waste bin sensor device 300 sends an illegal dumping alert to the waste bin mobile application 110 installed on the mobile device of the waste bin owner 104, the waste collection operator 118, and the waste collection vehicle 120 driver when an illegal item is dumped in the waste bin 600.

The smart waste bin sensor device pathogen biosensor 322 comprises a sterilizer 4416, wherein the sterilizer 4416 kills a set of pathogens 4510 in the waste 650 inside or surrounding the waste bin.

The pathogen biosensor 322 sterilizer 4416 kills pathogens. In case when the biohazardous waste level or biosafety level is still above a predetermined threshold level in the waste bin 600, the waste bin owner 104 can take appropriate sterilization methods like incineration, autoclaving, gas sterilization, irradiation, and thermal inactivation measures to ensure the waste 650 and/or litter 108 is safe to pick up. The waste collection operator 118 and the waste collection vehicle 120 driver may choose not to pick up the waste 650 or litter 108 or may decide to send a special biohazardous waste collection vehicle 120 and ensure that vehicle driver has appropriate personal protective equipment to pick up the waste 650 or litter 108.

FIG. 46 illustrates an example accelerometer sensor working principle diagram 4610 and an accelerometer sensor operating principle diagram 4650 that can be utilized to implement various embodiments.

An accelerometer sensor 808 implements, operates, detects, measures, and monitors the waste bin 600 tilt position.

The intended use of the accelerometer sensor 808 is to measure the movement of the waste bin 600 when the waste bin 600 is tipped, flipped upside down, or emptied, and can be used to set the waste fill level status to zero. The accelerometer sensor 808 sends real-time acceleration data and tilt position to the cloud server 114.

The accelerometer sensor working principle diagram 4610 illustrates the functioning of the accelerometer sensor 808 as follows:

The accelerometer sensor 808 working principle involves measurement of acceleration in one, two, or three orthogonal axes. Accelerometer sensors 808 are typically used in one of three modes. In the case of 1 dimension as an inertial measurement of velocity and position, as a sensor of inclination, tilt, or orientation in 2 or 3 dimensions, as referenced from the acceleration of gravity (1g=9.8 m/s$^2$). As an example, the dual axis tilt sensing object at rest diagram 4620 shows +X axis, +Y axis, and 1g gravity. When the object moves, the projection of the gravity vector on the +X axis produces output acceleration equal to the sine of the angle θ 4632 between the accelerometer +X axis and the horizon, as shown in dual axis tilt sensing object at the inclination diagram 4630, with an ideal value of 1g for gravity. The +Y axis acceleration, due to the orthogonality, is proportional to the cosine of the angle of inclination. The object is the waste bin 600. The dual axis tilt calculation is as follows:

$$Ax.\text{out}[g]=1g\times\sin\theta$$

$$Ay.\text{out}[g]=1g\times\cos\theta$$

Applying a trigonometric function to identify by using the ratio of the values results in the following:

$$Ax.\text{out}[g]/Ay.\text{out}[g]=1g\times\sin\theta/1g\times\cos\theta=\tan\theta$$

$$\theta=\tan-1[Ax.\text{out}/Ay.\text{out}]$$

Where the waste bin 600 inclination angle, θ, is in radians.

The accelerometer sensor operating principle diagram 4650 shows when the waste collection vehicle 120 picks up the waste bin 600 and tilts it to collect the waste. The smart waste bin sensor device 300 accelerometer sensor 808 measures the movement of the waste bin 600, and when the waste bin 600 is tipped, flipped upside down, or emptied, the inclination angle can be used to set the waste fill level status to zero.

The smart waste bin sensor device 300 accelerometer sensor 808 sets the waste fill level of the waste bin 600 to zero when the waste bin 300 is mechanically tipped over.

FIG. 47 illustrates an example weight sensor 4710, waste bin weight sensor circuit block diagram 4720, and a waste sensor operating principle diagram 4750 that can be utilized to implement various embodiments.

A weight sensor 4710 installed inside the bottom of the waste bin 300 implements, operates, detects, measures, and monitors the waste weight, wherein the weight sensor 4710 sends and receives signals through a wireless network to the smart waste bin sensor device 300. The weight sensor 4710 can be configured to send the sensor data to the cloud server 114.

A weight sensor 4710 or load cell is a transducer. The intended use of the weight sensor 4710 is to detect, measure, and monitor the weight of waste inside the waste bin 600. The working principle of the weight sensor 4710 depends on the conversion of a load into an electronic signal. The signal can be a change in voltage or current based on the load or waste 650 weight. The load is waste 650 disposed by the waste bin owner 104.

The weight sensor circuit block diagram 4720 illustrates the functioning of the weight sensor 4710. When the waste 650 is put on the weight sensor top end 4722, the weight sensing element 4724 measures the weight, and the analog signal, which can be voltage or current based on the waste 650 weight, is converted to digital by the microcontroller board 4726, and the onboard Wi-Fi 4728 sends the waste weight inside the waste bin 600 to the smart waste bin sensor device 300, smart waste bin mobile application 110, and cloud server 114.

The weight sensor operating principle diagram 4750 illustrates the weight sensor 4710 installed inside the bottom of the waste bin 600. When the waste 650 is thrown inside the waste bin 600, the weight sensor 4710 detects, measures, and monitors the waste weight.

The smart waste bin sensor device installed outside the waste bin body 550, wherein the weight sensor 4710 is installed inside the bottom of the waste bin 600, wherein the weight sensor 4710 waste weight is used to calculate the waste fill level inside the waste bin 600.

The standard weight to volume conversion tables are used based on the type of waste to convert the waste weight to waste volume. Next, waste volume information is used to calculate the waste fill level based on the waste bin 600 dimensions. The waste weight and waste volume are very important measurements for the waste collection vehicle 120 driver. The waste bin 600 or containers are of standard sizes with designated allowable waste volume and weight. At times, the weight of the waste might exceed capacity due to the dumping of concrete, heavy industrial metals, and so on, which will not allow the waste collection vehicle 120 to pick up the waste. Monitoring of the waste weight also avoids exceeding the weight limitation of the waste bin 600, or possibly causing damage to the waste bin 600. The waste bin 600 waste weight value can be recorded at the time of waste pickup by the waste collection vehicle 120, allowing for accurate aggregate waste weight from all the waste bins 600 from which waste was picked up. Waste bin 600 waste weight data can be used by the waste collection operator 118 and waste collection facility 122 to track and trend the amount of waste generated for the performance management process.

Figure 48:
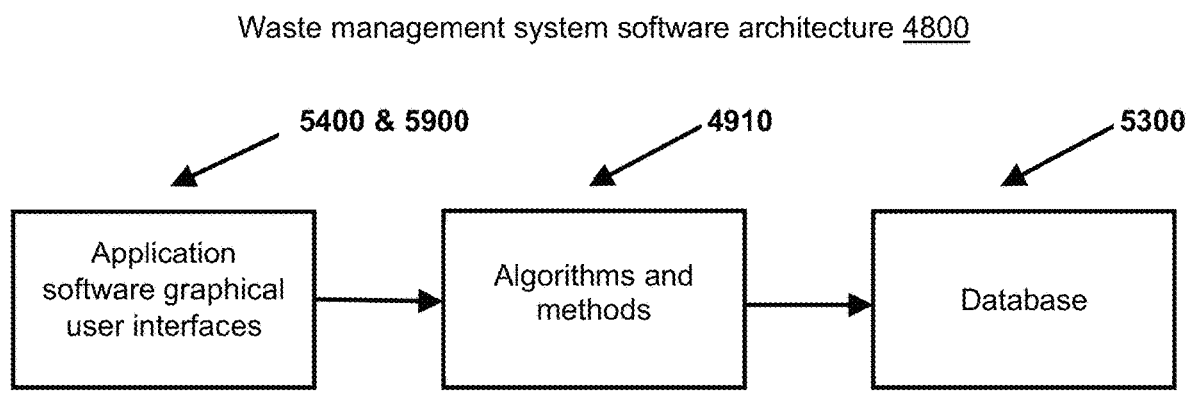
FIG. 48 illustrates an example waste management system application software architecture comprising a set of application software graphical user interfaces, a set of algorithms and methods, and a database, according to some embodiments.

FIG. 48 illustrates an example waste management system software architecture 4800 comprising a set of application software graphical user interfaces 5400 and 5900, a set of algorithms and methods 4910, and a database 5300, according to some embodiments.

The waste management system software architecture 4800 can process the collected sensor data stored in the database 5300 using a set of algorithms and methods 4910. The application software graphical user interfaces 5400 and 5900 can be accessed through the waste bin mobile application 110 and the waste collection facility application 112.

Figure 49:
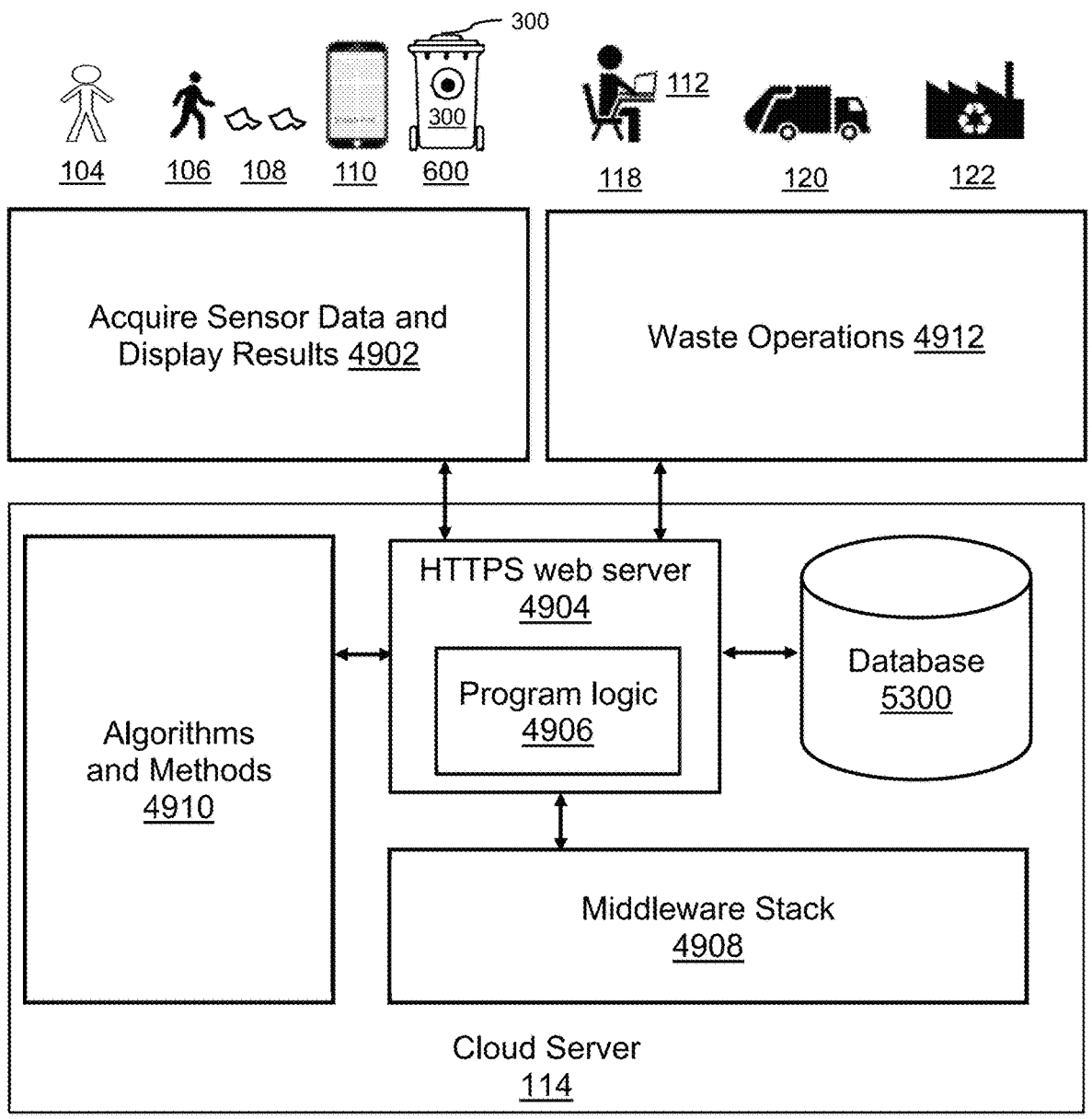
FIG. 49 illustrates an example waste management system software computing environment, according to some embodiments.

FIG. 49 illustrates an example waste management system software computing environment 4900, according to some embodiments.

The processing step acquire sensor data and display results 4902 is responsible for collecting and sending the waste bin's 600 smart waste bin sensor device 300 waste bin 600 data to the cloud server 114. The data collected is the environmental conditions inside or outside the waste bin 600 of the waste bin owner 104. The pedestrian 106 is responsible for taking photos and videos of litter 108 and uploading them through the waste bin mobile application 110. The waste collection facility's 122 waste collection operator 118 can send a waste collection vehicle 120 driver to collect the litter 108. The smart waste bin sensor device 300 sensor data values results can be displayed in the waste bin mobile application 110.

The processing step HTTPS web server 4904 is used for secure communication over a computer network between a client and server. The program logic 4906 performs decision making based on sensor data and allows branching to different parts of the waste bin mobile application 110 and waste collection facility application 112. The program logic 4906 is responsible for sending the information about methods to be executed to algorithms and methods 4910 based on the user request. The middleware stack 4908 acts as a bridge between the operating system, database 5300, and the application software like the waste bin mobile application 110 and waste collection facility application 112 to display the data rapidly.

In processing step algorithms and methods 4910, the sensor data is processed through the waste management system cloud server 114 and sent to the database 5300 system to be stored. The algorithms and methods 4910 are responsible for following activities:

1. Perform the waste bin's 600 smart waste bin sensor device 300 data analysis and evaluation
2. Create the waste bin's 600 smart waste bin sensor device 300 clusters
3. Assign optimal waste collection vehicle 120 routes
4. Make real-time updates to the waste collection vehicle 120 route based on the waste bin's 600 status.

Processing step algorithms and methods 4910 can analyze and process collected sensor data stored in the database 5300 and implement a waste collection system operating method, a real-time waste collection service method, and a set of waste management performance statistics methods.

In processing step waste operations 4912, the waste collection operators 118 using the waste collection facility application 112 are responsible for assigning and sending waste collection vehicles 120 to pick up waste 650 from waste bins 600 or litter 108 around them. The waste is segregated, sorted, recycled, and disposed at the waste collection facility 122. The waste management system performance data monitoring, trending, and reporting are done through the waste bin mobile application 110 and waste collection facility application 112.

Figure 50:
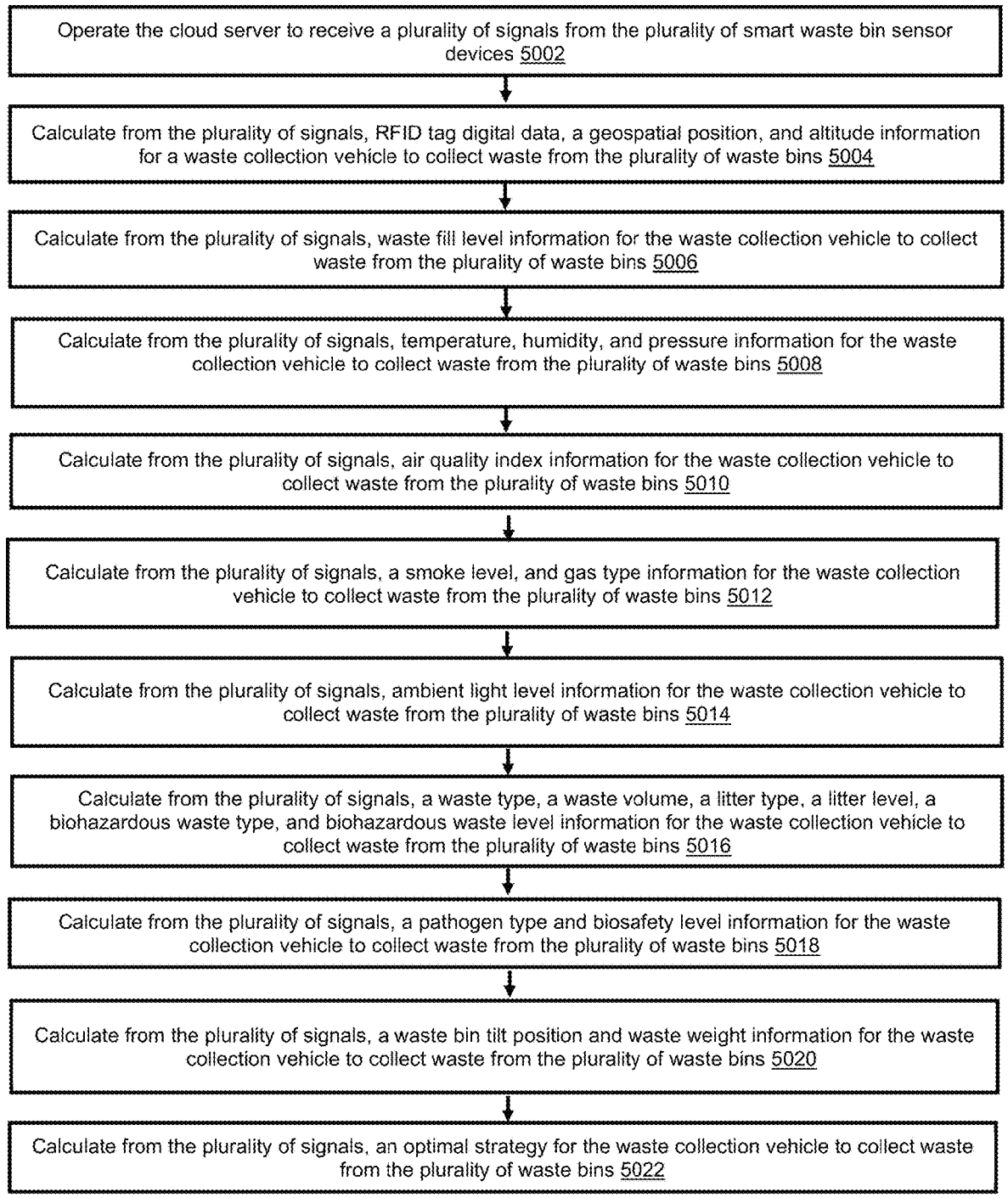
FIG. 50 illustrates an example waste collection system operating method for an optimal strategy for the waste collection vehicle to collect waste from the plurality of waste bins by one or several waste collection vehicles, according to some embodiments.

FIG. 50 illustrates an example waste collection system operating method 5000 for an optimal strategy for the waste collection vehicle 120 to collect waste from the plurality of waste bins 600 by one or several waste collection vehicles 120, according to some embodiments.

The waste collection system operating method 5000 comprises a plurality of several waste bins 600 that receive waste and the cloud server 114 that receives signals through a wireless network by a set of sensors of the smart waste bin sensor devices 300 installed on the plurality of waste bins 600 to sense the status of one or several of the waste bins 600, wherein the method steps include:

In processing step 5002, operating the cloud server 114 to receive a plurality of signals from the plurality of smart waste bin sensor devices 300.

In processing step 5004, calculating from the plurality of signals RFID tag digital data, geospatial position, and altitude information for the waste collection vehicle 120 to collect waste from the plurality of waste bins 600.

In processing step 5006, calculating from the plurality of signals waste fill level information for the waste collection vehicle 120 to collect waste from the plurality of waste bins 600.

In processing step 5008, calculating from the plurality of signals temperature, humidity, and pressure information for the waste collection vehicle 120 to collect waste from the plurality of waste bins 600.

In processing step 5010, calculating from the plurality of signals air quality index information for the waste collection vehicle 120 to collect waste from the plurality of waste bins 600.

In processing step 5012, calculating from the plurality of signals smoke level and gas type information for the waste collection vehicle 120 to collect waste from the plurality of waste bins 600.

In processing step 5014, calculating from the plurality of signals ambient light level information for the waste collection vehicle 120 to collect waste from the plurality of waste bins 600.

In processing step 5016, calculating from the plurality of signals a waste type, a waste volume, a litter type, a litter level, a biohazardous waste type, and biohazardous waste level information for the waste collection vehicle 120 to collect waste from the plurality of waste bins 600.

In processing step 5018, calculating from the plurality of signals pathogen type and biosafety level information for the waste collection vehicle 120 to collect waste from the plurality of waste bins 600.

In processing step 5020, calculating from the plurality of signals waste bin tilt position and waste weight information for the waste collection vehicle 120 to collect waste from the plurality of waste bins 600.

In processing step 5022, calculating from the plurality of signals an optimal strategy for the waste collection vehicle 120 to collect waste from the plurality of waste bins 600.

Optimal strategy can be achieved by using linear programming technique for the optimization of a linear objective function, subject to linear equality and linear inequality constraints. Linear programming or linear optimization is a method can be used to achieve the best outcome such as maximum profit or lowest cost for waste collection service operations in a mathematical model whose requirements are represented by linear relationships.

Linear programming method can be used to maximize the use of resources such as waste collection vehicles 120 and drivers. Linear programming can provide optimal values to assign waste collection vehicles 120 and drivers to save on fuel and time including the shortest waste collection route.

Linear programming can also be used to minimize waste collection service cost. Linear programming analysis may utilize finite number of waste bin 600 sensor 302-322, 808, and 4710 values linear constraints. In constructing the optimal strategy in real time during a collection of the waste 650 from the plurality of waste bins 600 by waste collection vehicle 120 for the waste collection facility 122, the objective function minimizes the overall waste collection service cost.

The mathematical form of the objective function f to minimize the waste bin 600 waste 650 collection cost is given by:

$$\text{Minimize } f(S_1, S_2, \ldots, S_n) = c_1 S_1 + c_2 S_2 + \ldots + c_n S_n$$

where:

$c_1, c_2, \ldots, c_n$ are real cost coefficients $S_1, S_2, \ldots, S_n$ are decision sensor variables to be determined The mathematical form consists of a set of "m" sensor value constraints of inequality form:

$$a_{11}S_1 + a_{12}S_2 + \ldots + a_{1n}S_n \geq b1$$

$$a_{21}S_1 + a_{22}S_2 + \ldots + a_{2n}S_n \geq b2$$

$$a_{31}S_1 + a_{32}S_2 + \ldots + a_{mn}S_n \geq bm$$

where $a_{ij}$, $b_j$, $c_j$ are real sensor value constants and $S_j \geq 0$

Combining the objective function to reduce the operating cost and the sensor value constraints, the linear programming model can be written in a concise notation form as follows:

Minimize objective function $\Sigma_{j=1}^n (c_j S_j)$

Subject to constraints $\Sigma_{j=1}^n (a_{ij} S_j) \geq b_i$ for all "$i$"

Where $S_j \geq 0$ for all "j"

By solving the linear programming problem, the optimal waste collection cost and the corresponding sensor value constraints can be found.

The waste collection facility can set the sensor value constraints. For example, some of the basic sensor values constraints to pick up the waste 650 in the waste bin 600 can be assigned as shown in Table 1:

TABLE 1

| Sensor value type | Basic sensor values constraint |
|---|---|
| Fill level | FL ≥ 80 |
| Temperature | T ≥ 45 |
| Humidity | H ≥ 70 |
| Pressure | P ≤ 95 |
| Air quality index | AQI ≥ 151 |
| Smoke level | SL ≥ 3 |
| Waste weight | WW ≥ 90 |
| Litter level | LL ≥ 3 |
| Biohazardous waste level | BWL ≥ 3 |
| Biosafety level | BSL ≥ 3 |

A real cost coefficient can be assigned to each of the above variables based on waste facility collection operations. The sensor value constraints of inequality can be defined for multiple sensors.

Figure 51:
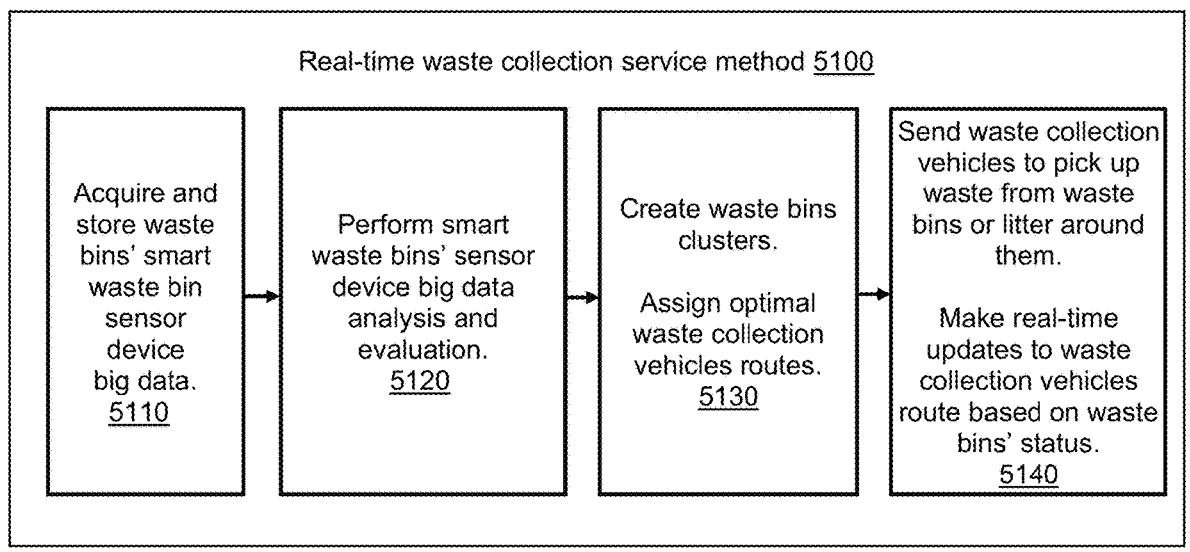
FIG. 51 illustrates an example real-time waste collection service method, for an optimal real-time waste collection vehicle route for the waste collection vehicle to collect waste from the plurality of waste bins and litter around the waste bins by one or several waste collection vehicles, according to some embodiments.

FIG. 51 illustrates an example real-time waste collection service method 5100, for an optimal real-time waste collection vehicle 120 route for the waste collection vehicle 120 to collect waste from the plurality of waste bins 600 and litter 108 around the waste bins 600 by one or several waste collection vehicles 120, according to some embodiments.

The real-time waste collection service method 5100 comprising and providing the waste collection vehicle 120 with a set of waste bin statistics for each waste bin 600 of the plurality of waste bins 600 to modify the current optimal waste collection vehicle route in real time during a collection of the waste 650 from the plurality of waste bins 600 for the waste collection facility 122 to reduce the operating cost.

The real-time waste collection system service method 5100 processing steps are as follows:

In processing step 5110, acquire and store waste bins' 600 smart waste bin sensor device 300 big data.

In processing step 5120, perform smart waste bin sensor devices 300 data analysis and evaluation.

In processing step 5130, create waste bins 600 clusters and assign optimal waste collection vehicle 120 routes. The waste bins 600 cluster is updated based on clustering algorithms as described in a waste collection vehicle routes initial waste bins cluster graph 5210 and a waste collection vehicle routes real-time waste bins cluster graph 5250.

In processing step 5140, send waste collection vehicles 120 to pick up waste from waste bins 600 or litter 108 around them and make real-time updates to waste collection vehicle 120 routes based on the waste bins' 600 status. The waste collection vehicle 120 route update is made when any of the waste bin 600 in the close proximity of the waste collection vehicle 120 crosses the waste pickup threshold for example additional waste disposed of by the waste bin owner 104.

The optimal waste collection vehicle route can be based on linear programming method.

FIG. 52 illustrates a waste collection vehicle routes initial waste bins cluster graph 5210 and a waste collection vehicle routes real-time waste bins cluster graph 5250, according to some embodiments. The cluster graph X axis is geospatial longitude and Y axis is geospatial latitude specifying the geospatial location and altitude of the waste bin 600.

The algorithms and methods are responsible for initially creating a waste bins cluster graph routes based on zip codes, waste types, waste collection vehicles 120, and so on before the waste collection vehicle 120 leaves the waste collection facility 122. The waste collection vehicle routes initial waste bins cluster graph 5210 created for the example contains Route1 5212, Route2 5214, and RouteN 5215.

As the waste collection vehicle 120 is collecting waste, real-time updates to waste collection vehicle 120 routes are made as shown in the waste collection vehicle routes real-time waste bins cluster graph 5250. As can be seen, the additional waste bins 600 appear in the Route1 5252, Route2 5254, and RouteN 5256 as the waste bin 600 pickup threshold is above the predetermined level.

The real-time update to waste bin clusters can comprise: a set of residential waste collection vehicle 120 routes containing private waste bin clusters, a set of public waste collection vehicle 120 routes containing public waste bin clusters, and a set of commercial waste collection vehicle 120 routes containing commercial waste bin clusters.

Figure 53:
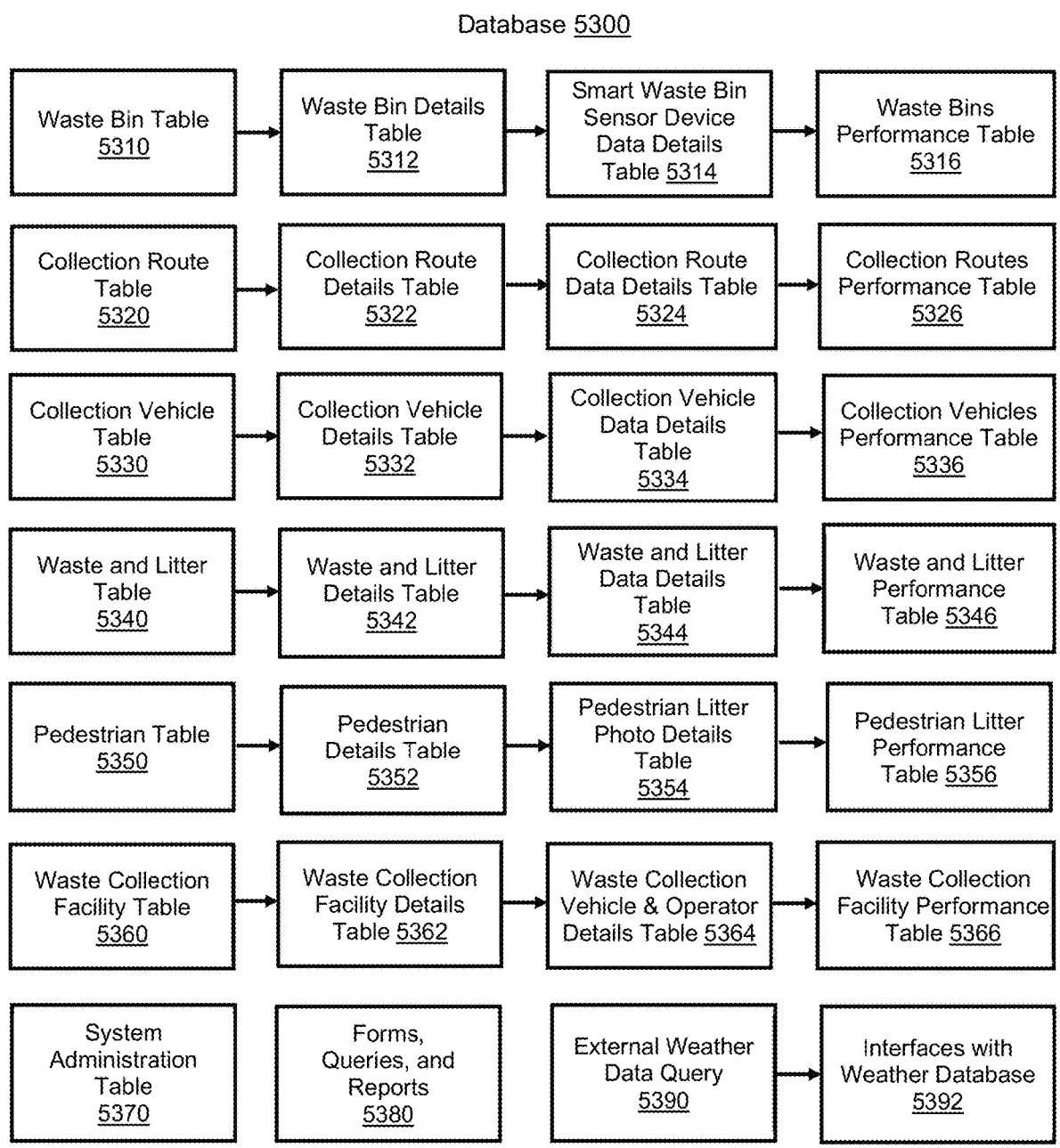
FIG. 53 illustrates an example block diagram of a waste management database design, according to some embodiments.

FIG. 53 illustrates an example block diagram of a waste management system database 5300 design, according to some embodiments.

The waste management system database 5300 design can correspond to the waste management system software architecture 4800 and waste management system software computing environment 4900.

A waste bin table 5310 comprises a waste bin details table 5312, a smart waste bins sensor device data details table 5314, and a waste bin performance table 5316. It stores complete data associated with the waste bins 600.

A collection routes table 5320 comprises a collection route details table 5322, a collection route data details table 5324, and a collection route performance table 5326. It stores complete data associated with the waste bin owner 104 profile, address, waste collection vehicle 120 routes, and waste bin 600 details.

A collection vehicle table 5330 comprises a collection vehicle details table 5332, a collection vehicle data details table 5334, and a collection vehicle performance table 5336. It stores the complete data associated with the waste collection vehicles 120.

A waste and litter table 5340 comprises a waste and litter details table 5342, a waste and litter data details table 5344, and a waste and litter performance table 5346. It stores complete data associated with the waste bins' 600 waste and litter types.

A pedestrian table 5350 comprises a pedestrian details table 5352, a pedestrian litter photo details table 5354, and a pedestrian performance table 5356. It stores complete data associated with the pedestrian 106 profile, address, litter 108 photo details, and reward points.

A waste collection facility table 5360 comprises a waste collection facility details table 5362, a waste collection vehicles and operator details table 5364, and a waste collection facility performance table 5366. This allows for continuous monitoring and measuring of the waste collection data.

A system administration table 5370 stores information regarding the waste bin owner 104 and system administrator login and password and audit trail records. There are interactive forms, queries, and reports 5380 which allow the waste bin owner 104 to manually query, edit any data, and generate waste bin 600 performance reports.

An external weather data query 5390 interfaces with the weather database 5392 to display the external weather data information. The communication is two way, where through the application programming interface (API), the waste bin mobile application 110 and waste collection facility application 112 can query and populate their data with external weather data.

Figure 54:
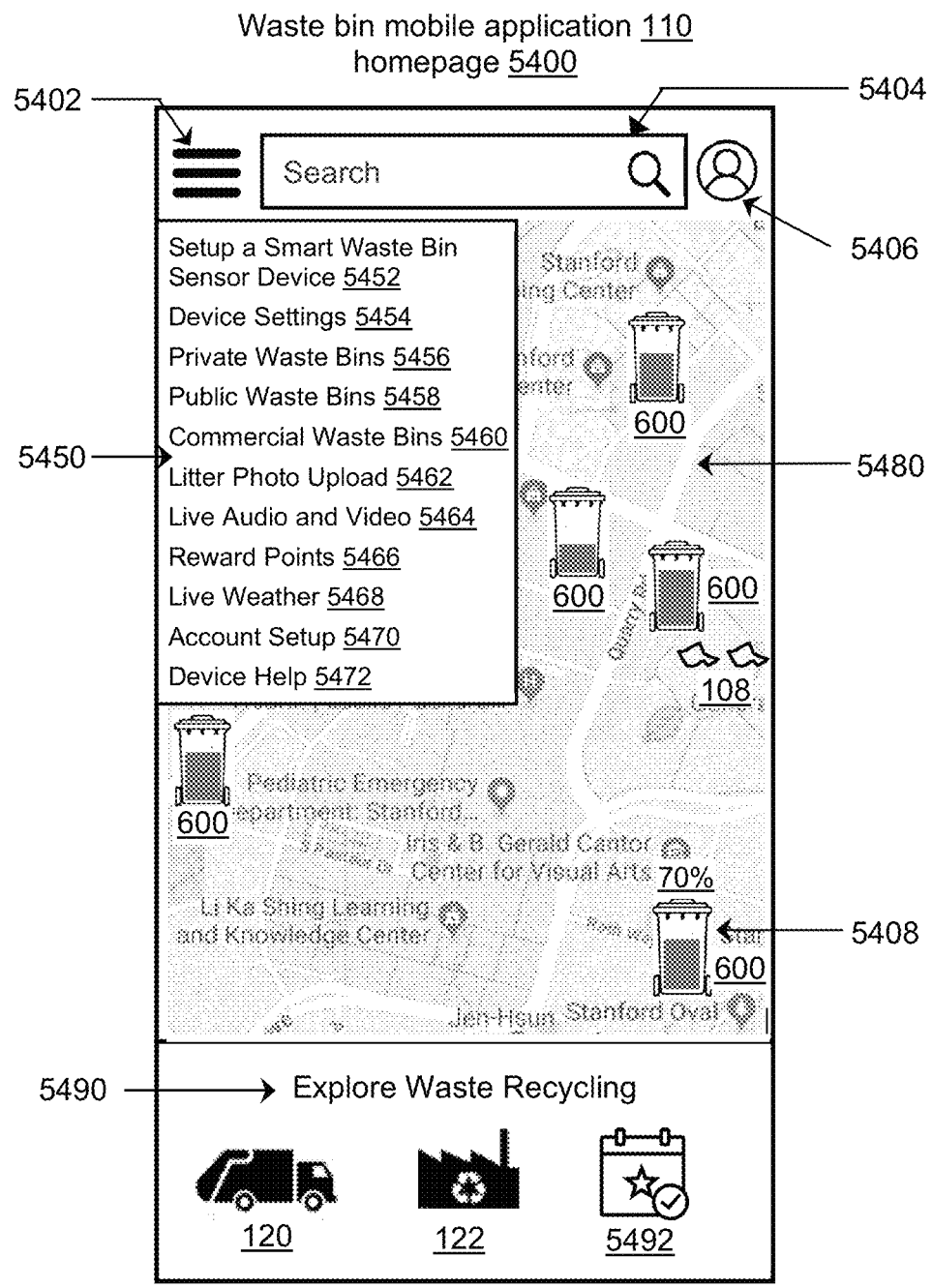
FIG. 54 illustrates an example waste bin mobile application homepage, according to some embodiments.

FIG. 54 illustrates an example waste bin mobile application homepage 5400, according to some embodiments.

FIG. 54 illustrates the waste bin mobile application 110 homepage 5400 comprising a set of graphical user interface (GUI) functionalities, wherein the set of GUI functionalities comprises:

A real-time street view map 5480 functionality, wherein the real-time street view map 5480 functionality comprises a waste bin icon 600, wherein the waste bin icon 600 displays the waste fill level at the geospatial position.

A search box 5404 functionality, wherein the search box 5404 functionality is used to search a term.

A person icon 5406 functionality, wherein the person icon 5406 functionality, when selected, displays the waste bin owner 104 profile.

A waste collection vehicle 120 icon functionality, wherein the waste collection vehicle 120 icon functionality, when selected, displays a real-time location of the waste collection vehicle 120.

A waste collection facility 122 icon functionality, wherein the waste collection facility 122 icon functionality, when selected, displays a location of the waste collection facility 122.

A waste collection event 5482 icon functionality, wherein the waste collection event 5482 icon functionality, when selected, displays a waste collection event 5482 calendar.

A main menu drop-down list 5402, wherein the main menu drop-down list 5402 comprises a set of graphical user interface (GUI) functionalities, wherein the set of GUI functionalities comprises:

A setup a smart waste bin sensor device 5452 functionality, wherein the setup a smart waste bin sensor device 5452 functionality, when selected, allows the waste bin owner 104 to set up and connect the smart waste bin sensor device 300 to the Wi-Fi network.

A device settings 5454 functionality, wherein the device settings 5454 functionality comprise a device settings drop-down list.

A private waste bins 5456 functionality, wherein the private waste bins 5456 functionality, when selected, displays the plurality of waste bins data results page.

A public waste bins 5458 functionality, wherein the public waste bins 5458 functionality, when selected, displays the waste fill level and the geospatial position of the waste bin 600 to correctly dispose waste in the public waste bins 5458.

A commercial waste bins 5460 functionality, wherein the commercial waste bins 5460 functionality, when selected, displays the plurality of waste bins 600 data results page.

A litter photo upload 5462 functionality, wherein the litter photo upload 5462 functionality, when selected, allows a pedestrian 108 to take digital photo and video of litter 108 and upload them to the cloud server 114.

A live audio and video 5464 functionality, wherein the live audio and video 5464 functionality, when selected, allows the waste bin owner 104 to turn on a live two-way audio and video connection and communicate with a person near the smart waste bin sensor device 300.

A reward points 5466 functionality, wherein the reward points 5466 functionality, when selected, displays reward points to the person to apply towards a utility bill, a recycling bill, a garbage bill, and a local city service bill;

A live weather 5468 functionality, wherein the live weather 5468 functionality, when selected, displays live weather data that comprises: a temperature, a humidity, an air quality index, an ultraviolet light index, a pollen count, a wind speed, a wind direction, and precipitation data from open weather Application Programming Interfaces.

An account setup 5470 functionality, wherein the account setup 5470 functionality, when selected, allows the waste bin owner to create the waste bin mobile application 110 user account.

A device help 5472 functionality, wherein the help 5472 functionality, when selected, displays a version number of the waste bin mobile application 110 and the smart waste bin sensor device installation instructions.

Figure 55:
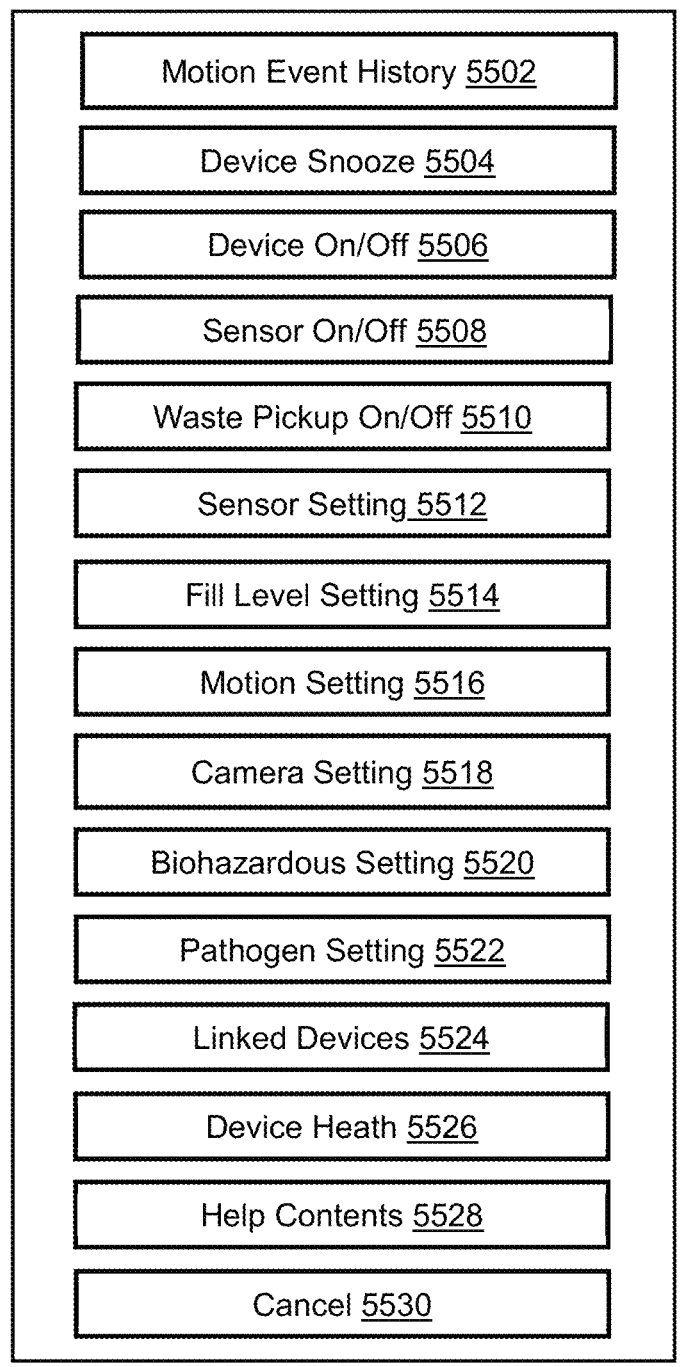
FIG. 55 illustrates an example waste bin mobile application device settings drop-down list, according to some embodiments.

FIG. 55 illustrates an example waste bin mobile application 110 device settings drop-down list 5500, according to some embodiments.

FIG. 55 illustrates the waste bin mobile application 110 device settings drop-down list 5500, comprising a set of graphical user interface (GUI) functionalities, wherein the set of GUI functionalities comprises:

A motion event history 5502 functionality, wherein the motion event history 5502 functionality, when selected, displays recent motion events inside or surrounding the smart waste bin sensor device.

A device snooze 5504 functionality, wherein the device snooze 5504 functionality, when selected, enables the waste bin owner 104 to disable alerts from the smart waste bin sensor device 300 for a specific period of the time.

A device on/off 5506 functionality, wherein the device on/off 5506 functionality, when selected, enables the waste bin owner 104 to power the smart waste bin sensor device 300 in an on state or an off state.

A sensor on/off 5508 functionality, wherein the sensor on/off 5508 functionality, when selected, enables the waste bin owner 104 to set the plurality of sensors 302-322 and 808 in an active on state or an inactive off state.

A waste pickup on/off 5510 functionality, wherein the waste pickup on/off 5510 functionality, when selected, enables the waste bin owner 104 to set a waste bin pickup flag to a yes state or a no state irrespective of the amount of waste 650 in the waste bin 600.

A sensor setting 5512 functionality, wherein the sensor setting 5512 functionality, when selected, enables the waste bin owner 104 to configure the smart waste bin sensor device 300, comprising: an alert threshold, a reportable range, and a unit.

A fill level setting 5514 functionality, wherein the fill level setting 5514 functionality, when selected, enables the waste bin owner 104 to define a specific waste fill zone for the smart waste bin sensor device 300 fill level sensor 304 to cover while ignoring everything outside a specific waste fill zone.

A motion setting 5516 functionality, wherein the motion setting 5516 functionality, when selected, enables the waste bin owner 104 to define a specific motion zone for the smart waste bin sensor device 300 motion sensor 318 to cover while ignoring everything outside a specific motion zone.

A camera setting 5518 functionality, wherein the camera setting 5518 functionality, when selected, enables the waste bin owner 104 to define a specific waste fill zone or a litter zone for the smart waste bin sensor device 300 waste and litter sensor 320 to take photos and videos while ignoring everything outside a specific waste fill zone or the litter zone.

A biohazardous setting 5520 functionality, wherein the biohazardous setting 5520 functionality, when selected, enables the waste bin owner 104 to define and add a set of biohazardous materials to detect.

A pathogen setting 5522 functionality, wherein the pathogen setting 5522 functionality, when selected, enables the waste bin owner 104 to define and add a set of pathogens 4510 type to detect and kill.

A linked devices 5524 functionality, wherein the linked devices 5524 functionality, when selected, enables the waste bin owner 104 to connect a set of smart waste bin sensor devices 300 together and begin working as a group whenever any one of them is activated.

A device health 5526 functionality, wherein the device health 5526 functionality, when selected, enables the waste bin owner 104 to access a control panel of the smart waste bin sensor device, comprising: an operational power, a network, and sensor device details.

A help contents 5528 functionality, wherein the help contents 5528 functionality, when selected, enables a waste bin owner 104 to access the smart waste bin sensor device instructions for use.

A cancel 5530 functionality, wherein the cancel 5530 functionality, when selected, enables a waste bin owner 104 to cancel the current device settings drop-down list 5500.

Figure 56:
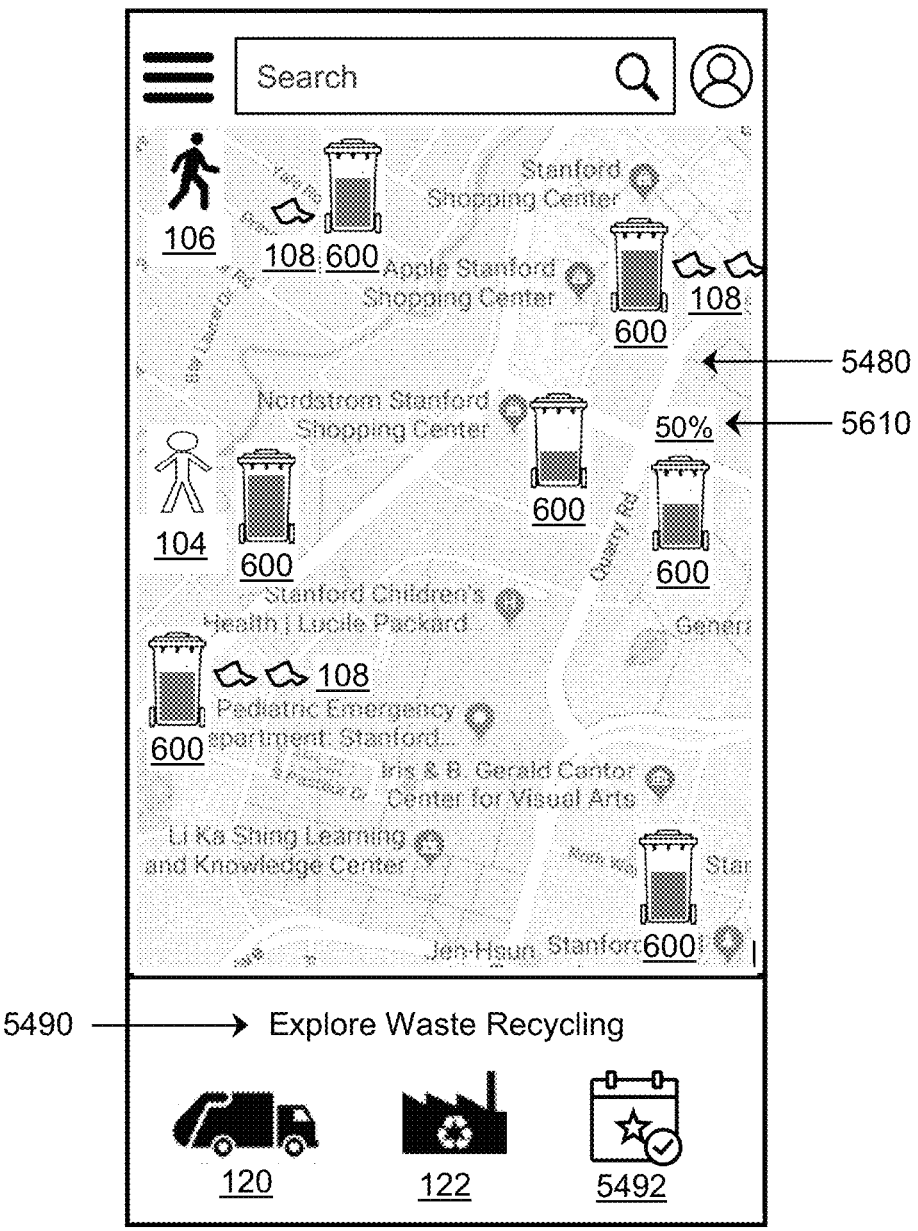
FIG. 56 illustrates an example waste bin mobile application real-time street view map showing waste bins' location and a waste fill level status, according to some embodiments.

FIG. 56 illustrates an example waste bin mobile application 110 real-time street view map 5600 showing the waste bin 600 location and waste fill level status, according to some embodiments.

The real-time street view map 5600 allows the waste bin owner 104 to see the status of waste bins 600 owned by them and public waste bins 600. The status of public waste bins 600 allows the waste bin owner 104 or pedestrian 106 to correctly dispose the waste 650 into available public waste bins 600. The pedestrian 106 can also take photos and videos of the litter 108 and upload them to the cloud server 114.

Figure 57:
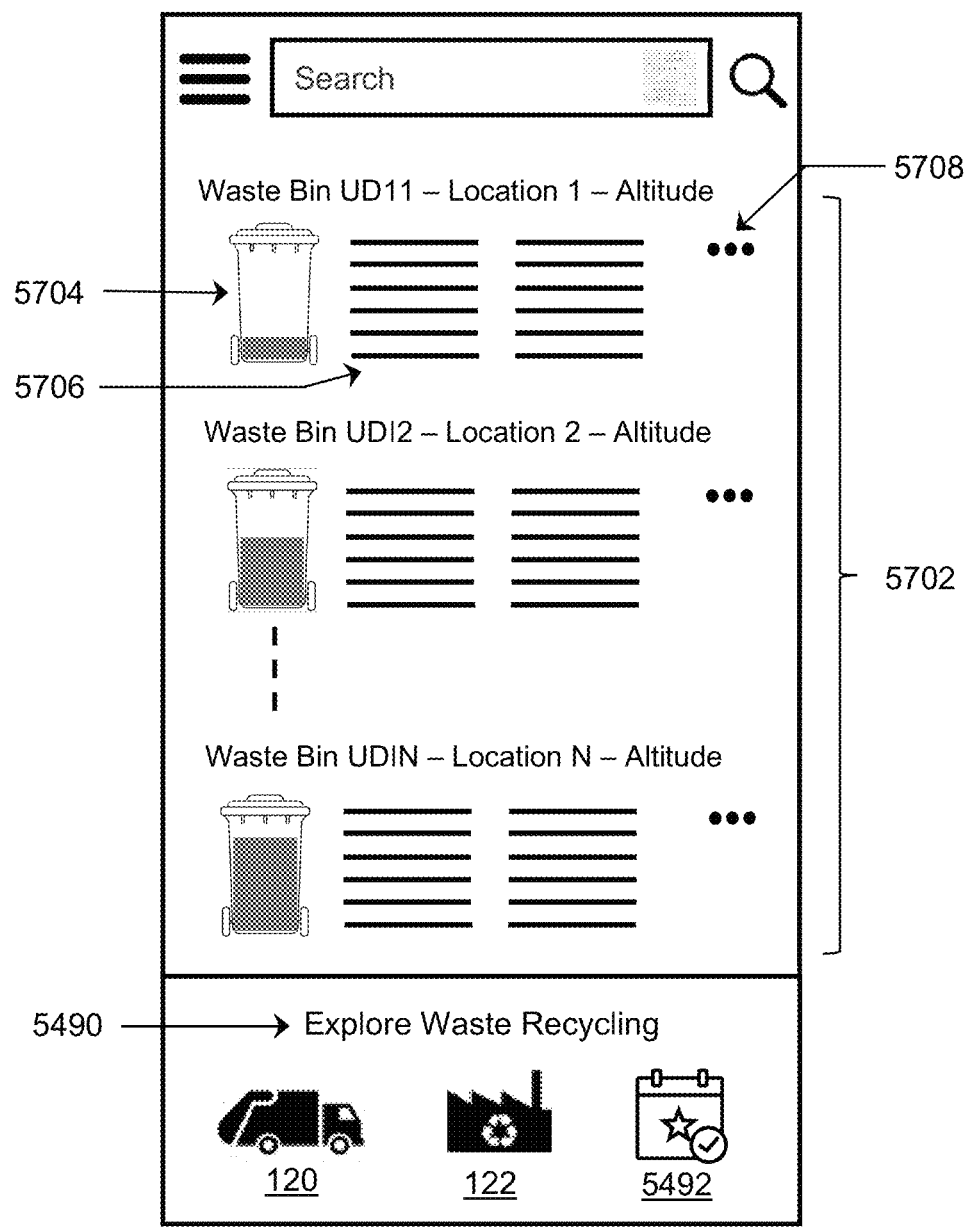
FIG. 57 illustrates an example waste bin mobile application data results page, according to some embodiments.

FIG. 57 illustrates an example waste bin mobile application 110 data results page 5700, according to some embodiments.

The data results page 5700 contains a summary information element 5702 about waste bins 600 of the waste bin owner 104. The waste bin icon's 5704 light grey area shows the amount of waste in the waste bin 600. The smart waste bin sensor device data element 5706 provides each smart waste bin sensor device 300 data results. Clicking on the dot element 5708 provides waste bin 600 waste performance data to the waste bin owner 104. The waste performance data can be monitored, trended, reported, and exported for further analysis by the waste bin owner 104.

FIG. 58 illustrates an example waste bin mobile application 110 detail data results page 5800, according to some embodiments.

The data results page details 5800 correspond to the summary information element 5702. The example page contains detail information for each of the smart waste bin sensor devices 300 for three waste bins 5810, 5820, and 5830.

The waste bin mobile application 110 comprises a detail data results page 5800, wherein the detail data results page 5800 comprises:

A fill level element, wherein the fill level element comprises a percentage value, wherein the percentage value is reported in the range of 0% to 100%.

A waste bin icon element, wherein the waste bin icon element color comprises: a green=0%≤fill level≤50%, an orange=50%<fill level≤80%, and a red=80%<fill level≤100%.

A waste bin unique device identifier (UDI) element, wherein the waste bin UDI element comprises: a smart waste bin sensor device identifier and a production identifier.

A location element of the waste bin, wherein the location element of the waste bin comprises: a street address, and a waste bin altitude, wherein the waste bin altitude is reported in meters.

A temperature element, wherein the temperature element comprises a degrees Celsius (C) value, wherein the degrees Celsius (C) value is reported in the range of −50 degree C. to 125 degree C.

A humidity element, wherein the humidity element comprises a percentage value, wherein the percentage value is reported in the range of 0% to 100%.

A pressure element, wherein the pressure element comprises a kilopascal (kPa) value.

An air quality index element, wherein the air quality index element comprises a level of health concern number, wherein the level of health concern number is reported in the range of 0 to 500, comprising: a 0 to 50 (good), a 51 to 100 (moderate), a 101 to 150 (unhealthy for sensitive groups), a 151 to 200 (unhealthy), a 201 to 300 (very unhealthy), and a 301 to 500 (hazardous).

A smoke level element, wherein the smoke level element comprises a smoke opacity number, wherein the smoke opacity number is reported in the range of 1 to 5, comprising: a 1 (white), a 2 (slightly grey), a 3 (grey), a 4 (dark grey), and a 5 (black).

A gas type element, wherein the gas type element comprises following gas elements:

1. A reducing gas element, wherein the reducing gas element comprises: a carbon monoxide, an ammonia, an ethanol, a hydrogen, a methane, a propane, and an isobutane.

2. An oxidizing gas element, wherein the oxidizing gas element comprises: a nitrogen dioxide, a nitrogen oxide, and a hydrogen.

3. An ammonia element, wherein the ammonia element comprises: a hydrogen, an ethanol, an ammonia, a propane, and an isobutane.

A waste weight element, wherein the waste weight element comprises a kg value.

An ambient light level element, wherein the ambient light level element comprises an illuminance number, wherein the illuminance number is reported in the range of 1 to 5, comprising: a 1 (dark), a 2 (dim), a 3 (overcast), a 4 (daylight), and a 5 (sunlight).

A motion event element, wherein the motion event element comprises a motion event number, wherein the motion event number is associated with the detection of a moving object within a distance of 0 to 7 meters and a 110×70 detection zone.

A waste type element, wherein the waste type element inside the waste bin comprises: a food waste, a garbage, a plastic container, a paper, a yard waste, a hazardous waste, and a biohazardous waste.

A litter type element, wherein the litter type element surrounding the waste bin comprises: an aluminum can, a paper cup, a fast food wrapper, a cardboard box, a plastic bottle, a cigarette butt, a tire, an electrical appliance, electronic devices, a battery, and a biohazardous material.

A litter level element, wherein the litter level element based on an amount of litter surrounding the waste bin and comprises a litter number, wherein the litter number is reported in the range of 1 to 4, comprising: a 1 (none), a 2 (low), a 3 (medium), and a 4 (high).

A biohazardous waste type element, wherein the biohazardous waste type element inside or surrounding the waste bin comprises: a solid biohazardous waste, a liquid biohazardous waste, a sharp biohazardous waste, a pathological biohazardous waste, a microbiological waste, and a pharmaceutical waste.

A biohazardous waste level element, wherein the biohazardous waste level element based on an amount of biohazardous waste inside or surrounding the waste bin comprises a biohazardous waste level number, wherein the biohazardous waste level number is reported in the range of 1 to 4, comprising: a 1 (none), a 2 (low), a 3 (medium), and a 4 (high).

A pathogen type element, wherein the pathogen type element inside or surrounding the waste bin comprises: a bacteria type, a fungus type, and a virus type.

A biosafety level element, wherein the biosafety level element based on risk of exposure to a pathogen present inside or surrounding the waste bin comprises a biosafety level number, wherein the biosafety level number reported is in the range of BSL-1 to BSL-4, comprising: a BSL-1, a BSL-2, a BSL-3, and a BSL-4.

FIG. 59 illustrates an example waste collection facility application 112 main menu drop-down list 5900, according to some embodiments.

The waste collection facility application 112 comprises a main menu drop-down list 5900, wherein the main menu drop-down list 5900 comprises a set of graphical user interface (GUI) functionalities, wherein the set of GUI functionalities comprises:

A waste management system performance 6000 functionality, wherein the waste management system performance 6000 functionality comprises: a waste bins waste fill level status summary 6012, an all routes waste volume and weight summary 6014, a waste collection routes waste bins efficiency 6016, a waste collection vehicles efficiency 6018, a litter hotspots 6020, and a pathogen hotspots 6022, wherein the waste management system performance statistics are used to generate an optimal waste management strategy for the waste collection facility to reduce the operating cost.

A real-time street view map 6100 functionality, wherein the real-time street view map 6100 functionality comprises: a set of waste bin 600 icons, and a set of waste collection vehicles 120. wherein the waste bin 600 icons display the waste fill level status at the geospatial position and the altitude.

A waste collection routes waste bins clusters 6200 functionality, wherein the waste collection routes waste bins clusters 6200 functionality comprises: a zip code boundary line 6212, a cluster circle with number of waste bins 6214, and a real-time position of the waste collection vehicle 120.

A waste collection routes waste bins summary 6300 functionality, wherein the waste collection routes waste bins summary 6300 functionality comprises: a route waste bins status 6310, and a route waste bins data summary 6312.

A biohazardous waste performance summary 6400 functionality, wherein the biohazardous waste performance summary 6400 functionality comprises: a list of biohazardous waste type amount collected 6410 and a list of waste bins biohazardous waste type details 6412.

A pathogen waste performance summary 6500 functionality, wherein the pathogen waste performance summary 6500 functionality comprises: a list of pathogen types detected 6510, and a list of waste bins pathogen type details 6512.

A waste collection vehicles performance 5902 functionality, wherein the waste collection vehicles performance 5902 functionality comprises: waste collection vehicle fuel consumption and service data.

A litter performance 5904 functionality, wherein the litter performance 5904 functionality comprises: a set of litter hotspots by zip codes, a set of pedestrian names, a set of litter photos and videos uploaded, and a reward point.

A system administrator 5906 functionality, wherein the system administrator 5906 functionality comprises a user account setup functionality.

A log out 5908 functionality, wherein the log out 5908 functionality terminates the waste collection facility application session comprises: an ok button and a cancel button.

Figure 60:
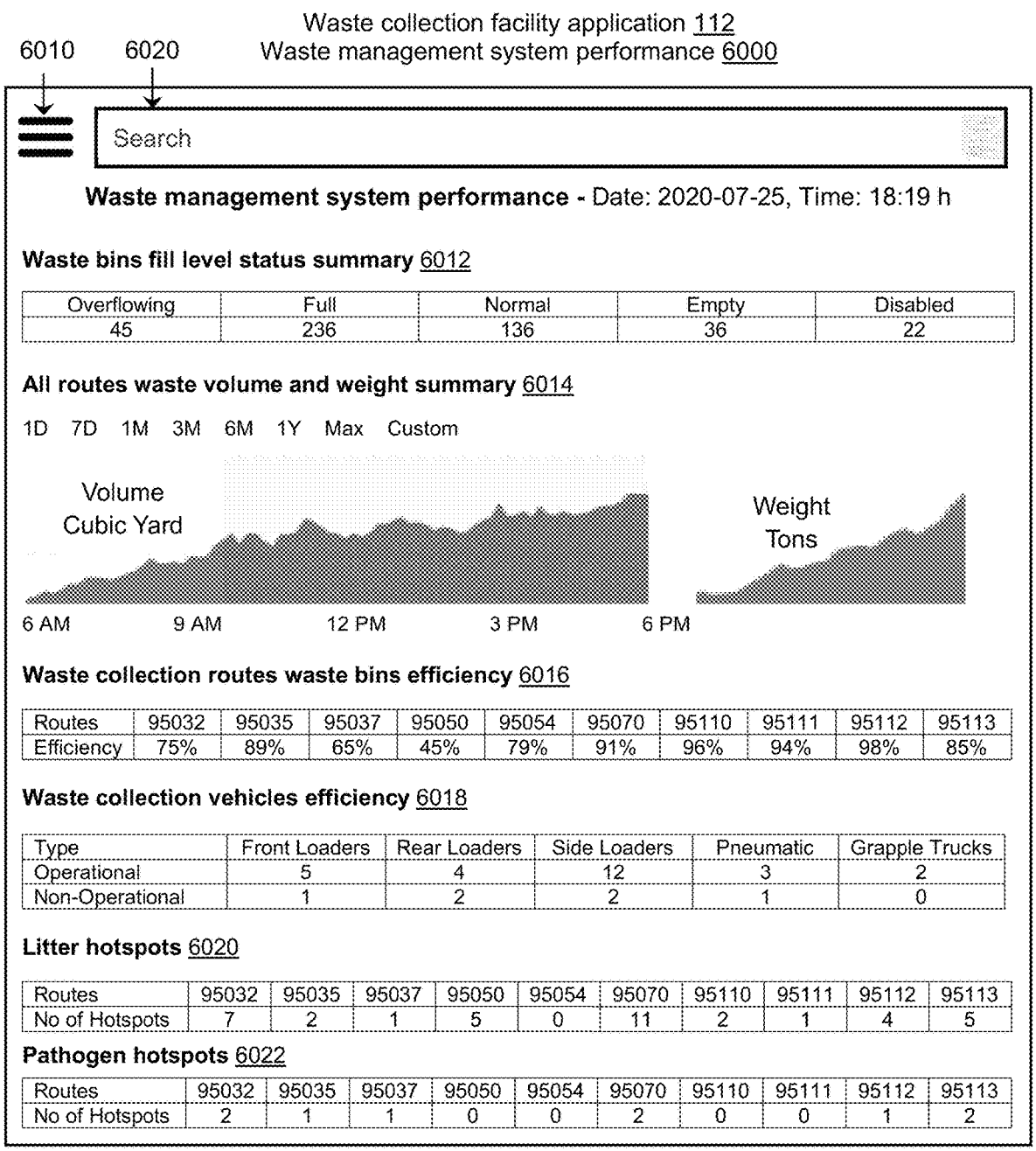
FIG. 60 illustrates an example waste collection facility application waste management system performance page, according to some embodiments.

FIG. 60 illustrates an example waste collection facility application 112 waste management system performance 6000 page, according to some embodiments.

The menu icon 6010 allows access to the menu icon drop-down list 5900. The search box 6020 allows search of a term. The waste management system performance statistics allow the waste collection facility to reduce the operating cost.

Figure 61:
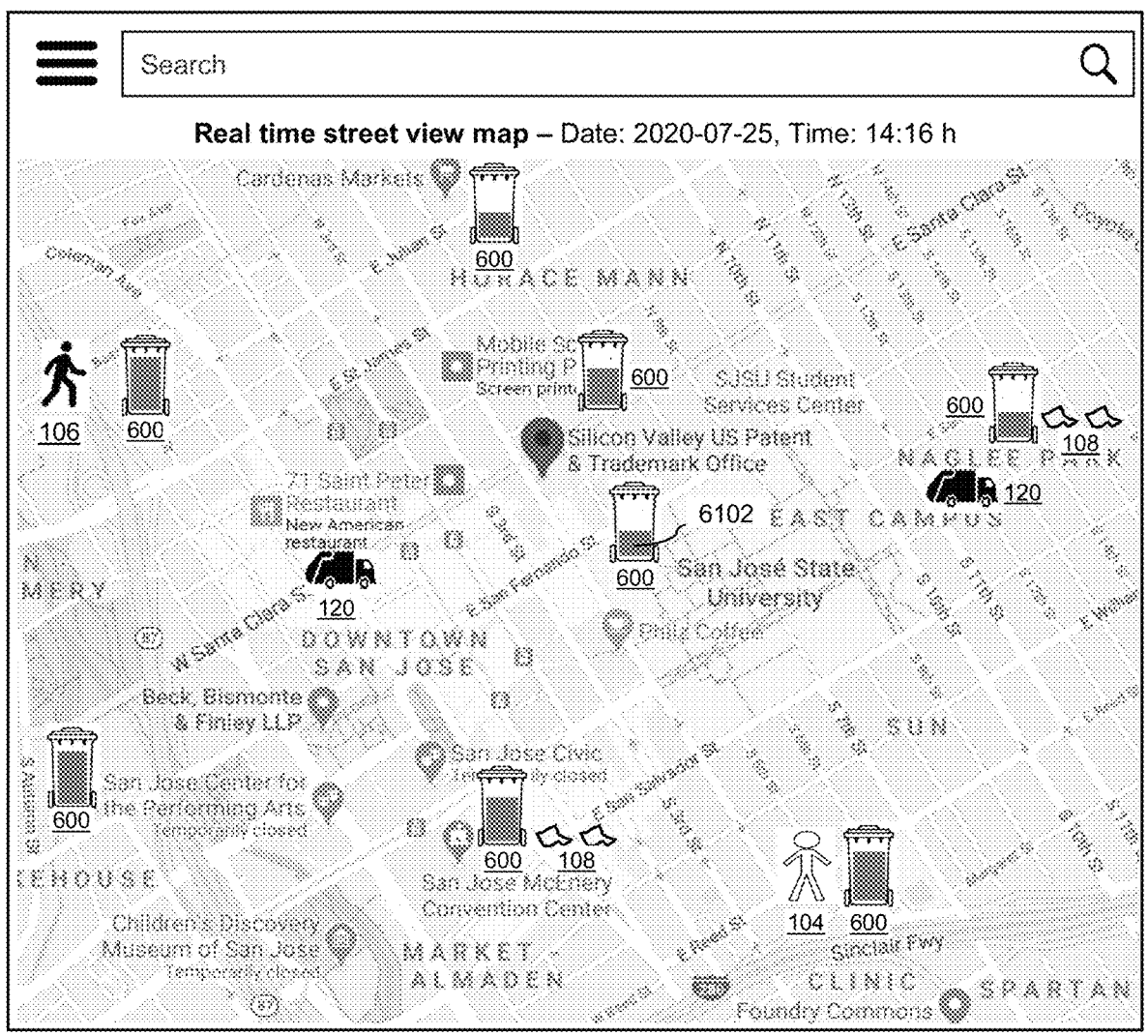
FIG. 61 illustrates an example waste collection facility application real-time street view map page showing waste bins' location and waste fill level status, according to some embodiments.

FIG. 61 illustrates an example waste collection facility application 112 real-time street view map 6100 showing waste bin 600 location and waste fill level status, according to some embodiments.

The real-time street view map 6100 comprises: a set of waste bin icons 600, a set of waste collection vehicles 120, wherein the waste bin icons 600 display the waste bin 600 waste fill level status at a geospatial position and an altitude. When a user hovers over the icon, a complete set of waste bin 600 details is provided. The real-time street view map 6100 also includes litter 108 hotspots and waste bin 600 fill status.

Figure 62:
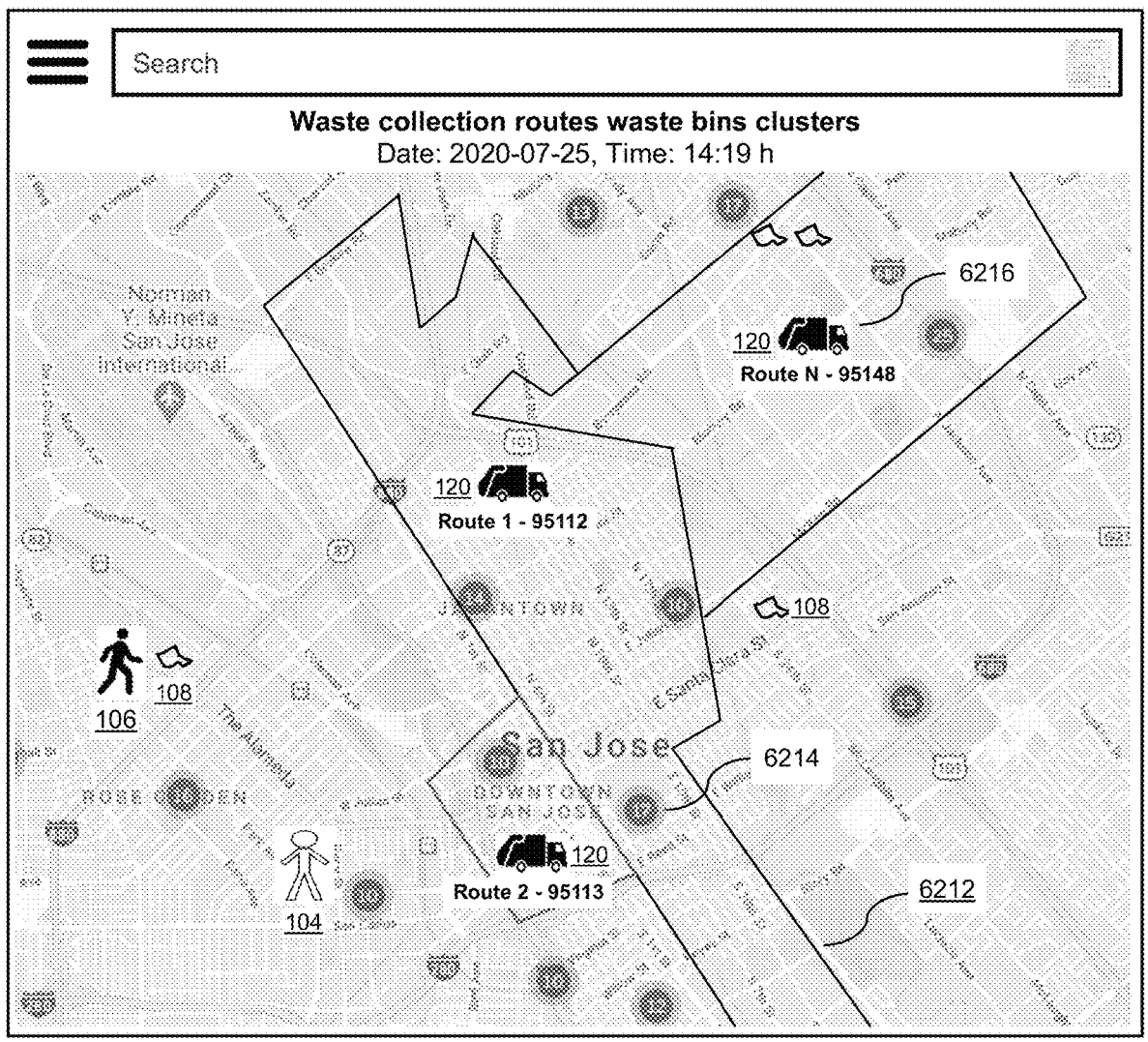
FIG. 62 illustrates an example waste collection facility application waste collection routes waste bins clusters, according to some embodiments.

FIG. 62 illustrates an example waste collection facility application 112 waste collection routes waste bins clusters 6200, according to some embodiments.

The waste collection routes waste bins clusters 6200 comprises: a zip code boundary line 6212, a cluster circle with the number of waste bins 6214, and a real-time position of the waste collection vehicle 120.

The map shows the zip code Route1—95112, Route 2—95113, and Route N—95148 zip code boundary line 6212. Inside each of the zip code boundary lines 6212 there is a set of cluster circles with numbers of waste bins 6214. The waste collection vehicle 120 picks up the waste based on the waste collection system operating method.

FIG. 63 illustrates an example waste collection facility application 112 waste collection routes waste bins summary 6300, according to some embodiments.

The waste collection routes waste bins summary 6300 comprises: a route waste bins status 6310 and a route waste bins data summary 6312.

Figure 64:
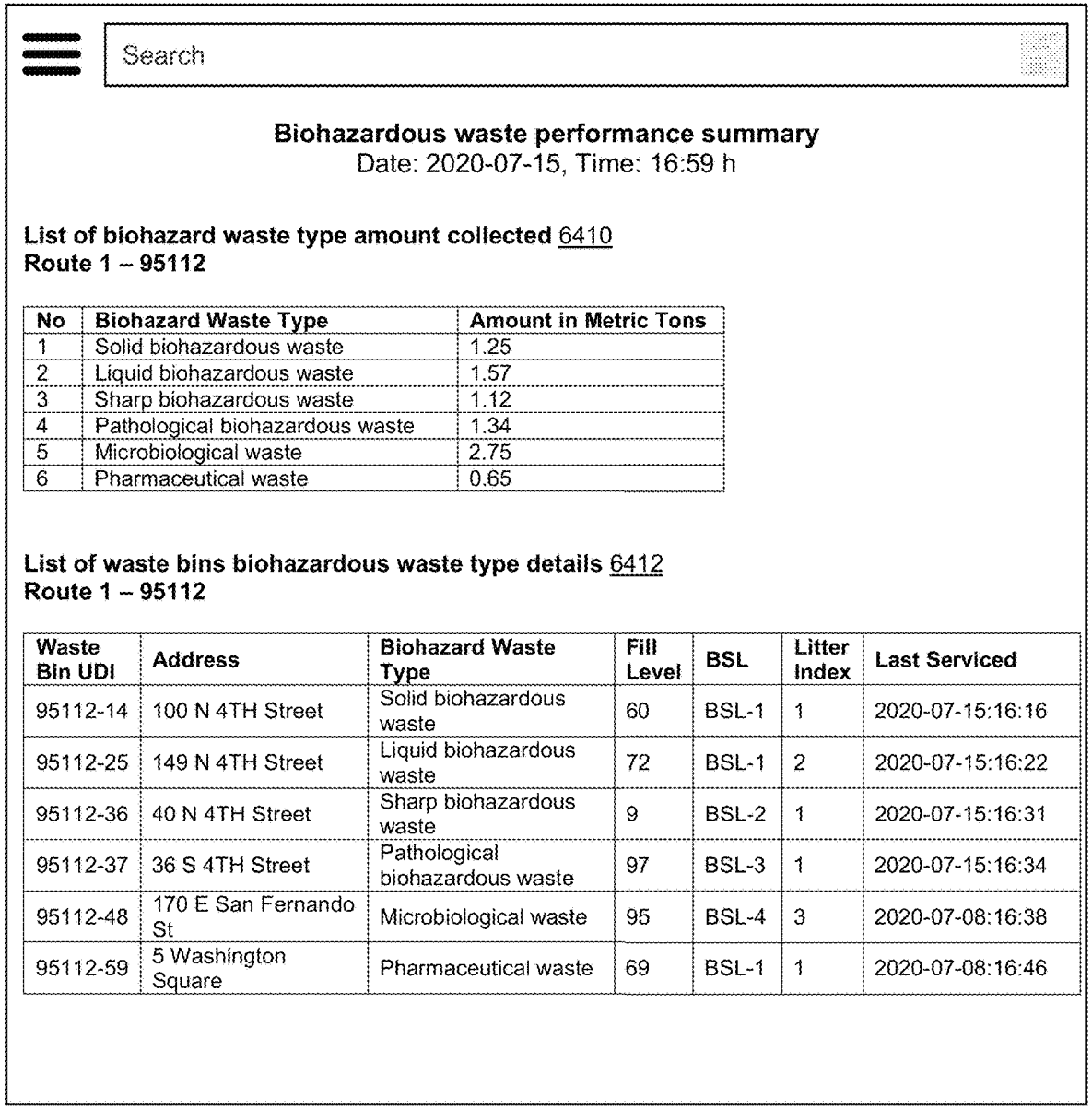
FIG. 64 illustrates an example waste collection facility application biohazardous waste performance summary, according to some embodiments.

FIG. 64 illustrates an example waste collection facility application 112 biohazardous waste performance summary 6400, according to some embodiments.

The biohazardous waste performance summary 6400 page contains information about a list of biohazard waste types and amount collected 6410 for Route 1—95112 and list of waste bin UDIs with biohazardous waste type 6412. The biohazardous waste type and biohazardous waste level information of each individual waste bin 600 enable the waste collection vehicle 120 driver to use personal protective equipment while picking up biohazardous waste.

FIG. 65 illustrates an example waste collection facility application 112 pathogen waste performance summary 6500, according to some embodiments.

The pathogen waste performance summary 6500 page contains information about a list of pathogen types detected 6510 for Route 1—95112 and list of waste bin UDIs with pathogen type 6512 and biosafety level. The pathogen type and pathogen level information of each individual waste bin 600 enable the waste collection vehicle 120 driver to use personal protective equipment while picking up pathogenic waste.

The comprehensive information available for each individual waste bin 600 to the waste collection vehicle 120 driver through the waste collection facility application 112 allows the driver to send an unable to collect waste notification to the waste bin mobile application 110 of the waste bin owner 104.

The waste collection vehicle 120 driver, using a waste collection facility application 112, sends an unable to collect waste notification to the waste bin mobile application 110 of the waste bin owner 104, wherein the unable to collect waste notification comprises one or more of the following messages:

A message "A biohazardous waste or chemicals or other hazardous materials were placed out for the collection".

A message "A pathogenic waste containing pathogens with high biosafety level was placed out for the collection".

A message "A gate was locked or inaccessible when our crew arrived".

A message "Waste bins or carts in the street with wheels were not against the curb".

A message "Waste bins or carts were over the waste weight limit".

A message "Waste bins were overflowing or there were extra bags on the top of or next to the cart".

A message "Do not put plastics other than plastic bottles and jars #1 through #7 with curbside recyclables".

A message "Do not place window, auto glass, mirrors, ceramics, Pyrex, porcelain, or crystal with curbside recyclables".

A message "Do not place garbage or yard trimming materials in the recycling cart".

A message "Tied cardboards bundles were longer than 30"×30"×30"".

A message "Motor oil was not in a one-gallon plastic jug with screw top lid".

A message "Motor oil was mixed with other liquids". or

A message other.

wherein the message other is a custom message written by the waste collection vehicle 120 driver.

CONCLUSION

A waste management system comprises a waste bin storing waste, wherein the waste bin comprises a smart waste bin sensor device installed on the waste bin of a waste bin owner. The smart waste bin sensor device comprises a set of sensors that sends and receives signals through a wireless network to a cloud server. The set of sensors inside the smart waste bin sensor device comprises an RFID tag sensor, a location sensor, a fill level sensor, a temperature sensor, a humidity sensor, a pressure sensor, an air quality sensor, a smoke sensor, a gas sensor, an ambient light sensor, a waste and litter sensor, a pathogen biosensor, and an accelerometer sensor. The set of sensors implements, operates, detects, measures, and monitors environmental conditions inside or outside the waste bin. The waste and litter sensor detects, measures, and monitors a waste type, a waste volume, a litter type, a litter level, a biohazardous waste type, and a biohazardous waste level. The pathogen biosensor detects, measures, and monitors a pathogen type and a biosafety level. The pathogen biosensor comprises a sterilizer to kill pathogens. A waste bin mobile application comprises a set of functionalities to set up, control, and display results of the smart waste bin sensor device. A waste collection facility application comprises a set of functionalities to monitor, optimize, and service the waste bin. A neighborhood public biohazardous waste alert is sent to the waste bin mobile application installed on a mobile devices of the set of waste bin owners within a specified distance of the waste bin in which a biohazardous waste level is above a predetermined threshold level. A neighborhood public biosafety alert is sent to the waste bin mobile application installed on a mobile devices of the set of waste bin owners within a specified distance of the waste bin in which a biosafety level is above a predetermined threshold level. A method of operating a waste collection system in which a plurality of several waste bins receive waste. The cloud server creating with the signals from the set of sensors a set of waste bin statistics for the waste bin, wherein the cloud server uses the set of waste bin statistics to generate an optimal strategy for a real-time waste collection service of the waste bin by one or several waste collection vehicles. A method further provides the waste collection vehicle with a set of waste bins statistics for each waste bin of the plurality of waste bins to modify the current optimal waste collection vehicle route in real-time during a collection of the waste from the plurality of waste bins for the waste collection facility to reduce the operating cost.

The COVID-19 pandemic and local, state, and governmental policies to contain the spread of virus have generated an enormous amount of biohazardous waste or healthcare waste. The healthcare waste composition is greatly influenced by disposable plastic-based personal protective equipment (PPE), COVID-19 test kits, hand sanitizer containers, and single-use plastics. The use of PPEs, COVID-19 test kits, hand sanitizer containers, and single-use plastics during the pandemic not only increases the quantity of medical waste but also alters the average density of the medical waste. The current rapid surge in healthcare waste due to the COVID-19 pandemic is further exacerbating the problem, and there is an immediate threat that the impacts of unsafe disposal of healthcare waste will spill over into a crisis of environmental pollution. Unsafe disposal of healthcare waste not only pollutes the environment but also is conducive to the spread of infectious diseases such as COVID-19, hepatitis, HIV/AIDS, cholera, typhoid, and respiratory complications. The present invention reduces the environmental pollution and spread of infectious diseases by sterilizing the waste in the waste bin using a sterilizer to kill pathogens.

Although the present embodiments have been described about specific example embodiments, different modifications can be made to these without changing or taking away from the broader objective of the design. For example, additional sensors, devices, modules, or alterations in the software can be operated to improve the system.

In addition, it can be appreciated that the various operations, processes, and methods disclosed herein can be embodied in a machine readable medium and/or a machine accessible medium compatible with a data processing system and can be performed in any order. Accordingly, the specification and drawings are to be regarded in an illustrative rather than a restrictive sense. In some embodiments, the machine-readable medium can be a non-transitory form of machine-readable medium.

The invention claimed is:

1. A waste management system comprising:
a waste bin storing a waste, wherein the waste bin comprises a smart waste bin sensor device installed on the waste bin;
wherein the smart waste bin sensor device comprises a set of sensors, wherein the set of sensors sends and receives signals through a wireless network to a cloud server;
a waste bin mobile application, wherein the waste bin mobile application comprises a set of functionalities to set up, control, and display data results of the smart waste bin sensor device;
a waste collection facility application, wherein the waste collection facility application comprises a set of functionalities to monitor waste management system performance, display waste collection routes, and service the waste bin;
a waste recycling facility, wherein the waste recycling facility comprises a set of waste collection vehicles and a waste collection facility;
a neighborhood public biohazardous waste alert, wherein the neighborhood public biohazardous waste alert is sent to the waste bin mobile application installed on a mobile device within a specified distance of the waste bin in which a biohazardous waste level number is higher than a predetermined threshold level;
wherein the biohazardous waste level number of equal to or greater than 3 is configured to indicate a biohazardous waste which results in an injury due to release of a chemical in a harmful amount;
a neighborhood public biosafety alert, wherein the neighborhood public biosafety alert is sent to the waste bin mobile application installed on the mobile device within a specified distance of the waste bin in which a biosafety level number is higher than a predetermined threshold level;
wherein the biosafety level number of equal to or greater than 3 is configured to indicate a pathogenic waste which results in a disease outbreak due to release of a pathogen;
wherein the cloud server comprises a cloud server memory, wherein the cloud server memory comprises a waste bin model, wherein the waste bin model comprises a set of waste bin attributes;
wherein the cloud server creates with a signal from the set of sensors a set of waste bin statistics for the waste bin, wherein the cloud server uses the set of waste bin statistics to generate an optimal strategy for a real-time waste collection service of the waste bin by the waste collection vehicle; and wherein the set of waste bin statistics is used by the waste collection facility for reducing the operating cost; and
wherein the smart waste bin sensor device comprises:
a front side with a set of sensors;
a rear side with a smart waste bin sensor device installation instruction comprising an instruction for use symbol, a battery symbol, a waste bin with the smart waste bin sensor device installed inside the bottom of the waste bin lid symbol, and a waste bin with the smart waste bin sensor device installed outside the waste bin body symbol;
a single board microcomputer programmed with a waste bin model information; and
a battery to power the smart waste bin sensor device; and
wherein the smart waste bin sensor device set of sensors comprises:
an RFID tag sensor, wherein the RFID tag sensor implements, operates, detects, measures, and monitors an RFID tag digital data of the waste bin;
a location sensor, wherein the location sensor implements, operates, detects, measures, and monitors a geospatial position and an altitude of the waste bin;
a fill level sensor, wherein the fill level sensor implements, operates, detects, measures, and monitors a waste fill level inside the waste bin;
a temperature, humidity, and pressure sensor, wherein the temperature, humidity, and pressure sensor implements, operates, detects, measures, and monitors a temperature inside or surrounding the waste bin;
wherein the temperature, humidity, and pressure sensor is configured to provide a preventive measure to service the waste bin and prevent formation of a highly flammable gas due to the temperature;
the temperature, humidity, and pressure sensor, wherein the temperature, humidity, and pressure sensor implements, operates, detects, measures, and monitors a humidity inside or surrounding the waste bin;
wherein the temperature, humidity, and pressure sensor is configured to provide the preventive measure to service the waste bin and prevent growth of the pathogen, a foul order, an unpleasant smell, and an infectious disease due to the humidity;
the temperature, humidity, and pressure sensor, wherein the temperature, humidity, and pressure sensor implements, operates, measures, and monitors a pressure inside or surrounding the waste bin;
wherein the temperature, humidity, and pressure sensor is configured to provide the preventive measure to service the waste bin and prevent a gas seeping out from the waste bin into the air due to the pressure;
an air quality sensor, wherein the air quality sensor implements, operates, detects, measures, and monitors an air quality index inside or surrounding the waste bin;
wherein an air quality index value is configured to provide a preventive measure to service the waste bin and prevent air pollution due to illegal burning;
a smoke sensor, wherein the smoke sensor implements, operates, detects, measures, and monitors a smoke level inside or surrounding the waste bin;
wherein the smoke sensor is configured to provide a preventive measure to service the waste bin and prevent fire during a high temperature day;

a gas sensor, wherein the gas sensor implements, operates, detects, measures, and monitors a gas type inside or surrounding the waste bin;
  wherein the gas sensor is configured to provide a preventive measure of wearing a personal protective equipment before servicing the waste bin;
an ambient light sensor, wherein the ambient light sensor implements, operates, detects, measures, and monitors an ambient light level inside or surrounding the waste bin;
  wherein the ambient light sensor is configured to reduce the power consumption and increase battery life of the smart waste bin sensor device;
a motion sensor, wherein the motion sensor implements, operates, detects, measures, and monitors a set of motion events inside or surrounding the waste bin;
a waste and litter sensor,
  wherein the smart waste bin sensor device is installed inside the waste bin body, wherein the waste and litter sensor implements, operates, detects, measures, and monitors a waste type, a waste volume, a biohazardous waste type, and a biohazardous waste level number;
    wherein the biohazardous waste level number is reported in the range of 1 to 4, comprising: a 1 (none), a 2 (low), a 3 (medium), and a 4 (high); and
    wherein the biohazardous waste level number is configured to provide information on use of a personal protective equipment to service the waste bin;
  wherein the smart waste bin sensor device is installed outside the waste bin body, wherein the waste and litter sensor implements, operates, detects, measures, and monitors a litter type, a litter level, a biohazardous waste type, and a biohazardous waste level number;
    wherein the biohazardous waste level number is reported in the range of 1 to 4, comprising: the 1 (none), the 2 (low), the 3 (medium), and the 4 (high); and
    wherein the biohazardous waste level number is configured to provide information on use of the personal protective equipment to service the waste bin;
a pathogen biosensor, wherein the pathogen biosensor implements, operates, measures, and monitors a pathogen type and the biosafety level number inside or surrounding the waste bin;
  wherein the biosafety level number is reported in the range of BSL-1 to BSL-4, comprising: a BSL-1, a BSL-2, a BSL-3, and a BSL-4; and
  wherein the biosafety level number is configured to provide information on use of a personal protective equipment to service the waste bin;
an accelerometer sensor, wherein the accelerometer sensor implements, operates, detects, measures, and monitors a waste bin tilt position;
  wherein the accelerometer sensor inclination angle sets a waste fill level of the waste bin to zero when the waste bin is mechanically tipped over; and
  wherein the set of sensors sends and receives signals through a wireless network to the cloud server.

2. The waste management system of claim 1, wherein the smart waste bin sensor device sends a private biohazardous alert to the waste bin mobile application installed on the mobile device when the biohazardous waste level number is above the predetermined threshold level in the waste bin.

3. The waste management system of claim 2, wherein the smart waste bin sensor device sends a private biosafety alert to the waste bin mobile application installed on the mobile device when the biosafety level number is above the predetermined threshold level in the waste bin.

4. The waste management system of claim 3, wherein the smart waste bin sensor device sends an illegal dumping alert to the waste bin mobile application installed on the mobile device when an illegal item is dumped in the waste bin.

5. The waste management system of claim 4, wherein the smart waste bin sensor device pathogen biosensor comprises a sterilizer, wherein the sterilizer kills a set of pathogens in the waste inside or surrounding the waste bin.

6. The waste management system of claim 5, wherein the waste bin mobile application comprises a homepage, wherein the homepage comprises a set of graphical user interface (GUI) functionalities, wherein the set of GUI functionalities comprises:
  a real-time street view map functionality, wherein the real-time street view map functionality comprises a waste bin icon, wherein the waste bin icon displays the waste fill level at the geospatial position;
  a search box functionality, wherein the search box functionality is used to search a term;
  a person icon functionality, wherein the person icon functionality, when selected, displays a profile;
  a waste collection vehicle icon functionality, wherein the waste collection vehicle icon functionality, when selected, displays a real-time location of the waste collection vehicle;
  a waste collection facility icon functionality, wherein the waste collection facility icon functionality, when selected, displays a location of the waste collection facility;
  a waste collection event icon functionality, wherein the waste collection event icon functionality, when selected, displays a waste collection event calendar;
  a main menu drop-down list, wherein the main menu drop-down list comprises a set of graphical user interface (GUI) functionalities, wherein the set of GUI functionalities comprises:
    a setup a smart waste bin sensor device functionality, wherein the setup a smart waste bin sensor device functionality, when selected, allows set up and connection of the smart waste bin sensor device to a Wi-Fi network;
    a device settings functionality, wherein the device settings functionality, when selected, comprises a device settings drop-down list;
    a private waste bins functionality, wherein the private waste bins functionality, when selected, displays the plurality of waste bins data results page;
    a public waste bins functionality, wherein the public waste bins functionality, when selected, displays the waste fill level and the geospatial position of the waste bin to correctly dispose waste in the public waste bins;
    a commercial waste bins functionality, wherein the commercial waste bins functionality, when selected, displays the plurality of waste bins data results page;
    a litter photo upload functionality, wherein the litter photo upload functionality, when selected, allows a pedestrian to take a digital photo and a video of litter and upload them to the cloud server;

a live audio and video functionality, wherein the live audio and video functionality, when selected, allows turning on a live two-way audio and video connection and communicating with a person near the smart waste bin sensor device;

a reward points functionality, wherein the reward points functionality, when selected, displays reward points to the person to apply towards a utility bill, a recycling bill, a garbage bill, and a local city service bill;

a live weather functionality, wherein the live weather functionality, when selected, displays live weather data comprising: a temperature, a humidity, an air quality index, an ultraviolet light index, a pollen count, a wind speed, a wind direction, and a precipitation data from an open weather Application Programming Interfaces;

an account setup functionality, wherein the account setup functionality, when selected, allows creation of a waste bin mobile application user account; and a device help functionality, wherein the device help functionality, when selected, displays a version number of the waste bin mobile application and the smart waste bin sensor device installation instructions.

7. The waste management system of claim 6, wherein the waste bin mobile application device settings drop-down list comprises a set of graphical user interface (GUI) functionalities, wherein the set of GUI functionalities comprises:

a motion event history functionality, wherein the motion event history functionality, when selected, displays recent motion events inside or surrounding the smart waste bin sensor device;

a device snooze functionality, wherein the device snooze functionality, when selected, enables disabling alerts from the smart waste bin sensor device for a specific period of time;

a device on/off functionality, wherein the device on/off functionality, when selected, enables powering the smart waste bin sensor device in an on state or an off state;

a sensor on/off functionality, wherein the sensor on/off functionality, when selected, enables setting a plurality of sensors in an active on state or an inactive off state;

a waste pickup on/off functionality, wherein the waste pickup on/off functionality, when selected, enables setting a waste bin pickup flag to a yes state or a no state irrespective of the amount of waste in the waste bin;

a sensor setting functionality, wherein the sensor setting functionality, when selected, enables configuring the smart waste bin sensor device, comprising: an alert threshold, a reportable range, and a unit;

a fill level setting functionality, wherein the fill level setting functionality, when selected, enables defining a specific waste fill zone for the smart waste bin sensor device fill level sensor to cover while ignoring everything outside the specific waste fill zone;

a motion setting functionality, wherein the motion setting functionality, when selected, enables defining a specific motion zone for the smart waste bin sensor device motion sensor to cover while ignoring everything outside the specific motion zone;

a camera setting functionality, wherein the camera setting functionality, when selected, enables defining a specific waste fill zone or a litter zone for the smart waste bin sensor device waste and litter sensor to take photos and videos while ignoring everything outside the specific waste fill zone or litter zone;

a biohazardous setting functionality, wherein the biohazardous setting functionality, when selected, enables defining and adding a set of biohazardous materials to detect;

a pathogen setting functionality, wherein the pathogen setting functionality, when selected, enables defining and adding a set of pathogen types to detect and kill;

a linked devices functionality, wherein the linked devices functionality, when selected, enables connecting a set of smart waste bin sensor devices together and begin working as a group whenever any one of them is activated;

a device health functionality, wherein the device health functionality, when selected, enables accessing a control panel of the smart waste bin sensor device, comprising: an operational power, a network, and a sensor device details;

a help contents functionality, wherein the help contents functionality, when selected, enables accessing the smart waste bin sensor device instructions for use; and a cancel functionality, wherein the cancel functionality, when selected, enables canceling the current device settings drop-down list.

8. The waste management system of claim 7, wherein the waste bin mobile application comprises a detail data results page, wherein the detail data results page comprises:

a fill level element, wherein the fill level element comprises a percentage value, wherein the percentage value is reported in the range of 0% to 100%;

a waste bin icon element, wherein the waste bin icon element color comprises: a green=0%≤fill level≤50%, an orange=50%<fill level≤80%, and a red=80%<fill level≤100%;

a waste bin unique device identifier (UDI) element, wherein the waste bin UDI element comprises: a smart waste bin sensor device identifier and a production identifier;

a location element of the waste bin, wherein the location element of the waste bin comprises: a street address and a waste bin altitude, wherein the waste bin altitude is reported in meters;

a temperature element, wherein the temperature element comprises a degrees Celsius (C) value, wherein the degrees Celsius (C) value is reported in the range of −50 degree C. to 125 degree C.;

a humidity element, wherein the humidity element comprises a percentage value, wherein the percentage value is reported in the range of 0% to 100%;

a pressure element, wherein the pressure element comprises a kilopascal (kPa) value;

an air quality index element, wherein the air quality index element comprises a level of health concern number, wherein the level of health concern number is reported in the range of 0 to 500, comprising: a 0 to 50 (good), a 51 to 100 (moderate), a 101 to 150 (unhealthy for sensitive groups), a 151 to 200 (unhealthy), a 201 to 300 (very unhealthy), and a 301 to 500 (hazardous);

a smoke level element, wherein the smoke level element comprises a smoke opacity number, wherein the smoke opacity number is reported in the range of 1 to 5, comprising: a 1 (white), a 2 (slightly grey), a 3 (grey), a 4 (dark grey), and a 5 (black);

a gas type element, wherein the gas type element comprises:
  a reducing gas, wherein the reducing gas comprises: a carbon monoxide, an ammonia, an ethanol, a hydrogen, a methane, a propane, and an isobutane;

an oxidizing gas, wherein the oxidizing gas comprises:
a nitrogen dioxide, a nitrogen oxide, and a hydrogen; and
an ammonia, wherein the ammonia comprises: a hydrogen, an ethanol, an ammonia, a propane, and an isobutane;
a waste weight element, wherein the waste weight element comprises a kilogram (kg) value;
an ambient light level element, wherein the ambient light level element comprises an illuminance number, wherein the illuminance number is reported in the range of 1 to 5, comprising: a 1 (dark), a 2 (dim), a 3 (overcast), a 4 (daylight), and a 5 (sunlight);
a motion event element, wherein the motion event element comprises a motion event number, wherein the motion event number is associated with a detection of a moving object within a distance of 0 to 7 meters;
a waste type element, wherein the waste type element inside the waste bin comprises: a food waste, a garbage, a plastic container, a paper, a yard waste, a hazardous waste, and a biohazardous waste;
a litter type element, wherein the litter type element surrounding the waste bin comprises: an aluminum can, a paper cup, a fast food wrapper, a cardboard box, a plastic bottle, a cigarette butt, a tire, an electrical appliance, an electronic device, a battery, and a biohazardous material;
a litter level element, wherein the litter level element is based on an amount of litter surrounding the waste bin and comprises a litter number, wherein the litter number is reported in the range of 1 to 4, comprising: a 1 (none), a 2 (low), a 3 (medium), and a 4 (high);
a biohazardous waste type element, wherein the biohazardous waste type element inside or surrounding the waste bin comprises: a solid biohazardous waste, a liquid biohazardous waste, a sharp biohazardous waste, a pathological biohazardous waste, a microbiological waste, and a pharmaceutical waste;
a biohazardous waste level element, wherein the biohazardous waste level element based on an amount of biohazardous waste inside or surrounding the waste bin comprises a biohazardous waste level number, wherein the biohazardous waste level number is reported in the range of 1 to 4, comprising: a 1 (none), a 2 (low), a 3 (medium), and a 4 (high);
a pathogen type element, wherein the pathogen type element inside or surrounding the waste bin comprises: a bacteria type, a fungus type, and a virus type; and
a biosafety level element, wherein the biosafety level element based on risk of exposure to pathogen present inside or surrounding the waste bin comprises a biosafety level number, wherein the biosafety level number is reported in the range of BSL-1 to BSL-4, comprising: a BSL-1, a BSL-2, a BSL-3, and a BSL-4.

9. The waste management system of claim 8, wherein the waste collection facility application comprises a main menu drop-down list, wherein the main menu drop-down list comprises a set of graphical user interface (GUI) functionalities, wherein the set of GUI functionalities comprises:
a waste management system performance functionality, wherein the waste management system performance functionality comprises: a waste bins waste fill level status summary, an all routes waste volume and weight summary, a waste collection routes waste bins efficiency, a waste collection vehicles efficiency, a litter hotspots, and a pathogen hotspots, wherein the waste management system performance statistics are used to generate an optimal waste management strategy for the waste collection facility to reduce the operating cost;
a real-time street view map functionality, wherein the real-time street view map functionality comprises: a set of waste bin icons and a set of waste collection vehicles; wherein the waste bin icons display the waste fill level status at the geospatial position and the altitude;
a waste collection routes waste bins clusters functionality, wherein the waste collection routes waste bins clusters functionality comprises: a zip code boundary line, a cluster circle with number of waste bins, and a real-time position of the waste collection vehicle;
a waste collection routes waste bins summary functionality, wherein the waste collection routes waste bins summary functionality comprises: a route waste bins status and a route waste bins data summary;
a biohazardous waste performance summary functionality, wherein the biohazardous waste performance summary functionality comprises: a list of biohazardous waste type amount collected and a list of waste bins biohazardous waste type details;
a pathogen waste performance summary functionality, wherein the pathogen waste performance summary functionality comprises: a list of pathogen type detected and a list of waste bins pathogen type details;
a waste collection vehicles performance functionality, wherein the waste collection vehicles performance functionality comprises: a waste collection vehicle fuel consumption and service data;
a litter performance functionality, wherein the litter performance functionality comprises: a set of litter hotspots by zip codes, a set of pedestrian names, a set of litter photos and videos uploaded, and a reward point;
a system administrator functionality, wherein the system administrator functionality comprises a user account setup functionality; and
a log out functionality, wherein the log out functionality terminates the waste collection facility application session and comprises: an ok button and a cancel button.

10. The waste management system of claim 9, wherein the waste collection facility application sends an unable to collect waste notification to the waste bin mobile application, comprising:
a message "A biohazardous waste or chemicals or other hazardous materials were placed out for the collection";
a message "A pathogenic waste containing pathogens with high biosafety level was placed out for the collection";
a message "A gate was locked or inaccessible when our crew arrived";
a message "Waste bins or carts in the street with wheels were not against the curb";
a message "Waste bins or carts were over the waste weight limit";
a message "Waste bins were overflowing or there were extra bags on the top of or next to the cart";
a message "Do not put plastics other than plastic bottles and jars #1 through #7 with curbside recyclables";
a message "Do not place window, auto glass, mirrors, ceramics, Pyrex, porcelain or crystal with curbside recyclables";
a message "Do not place garbage or yard trimming materials in the recycling cart";
a message "Tied cardboards bundles were longer than 30"×30"×30";

a message "Motor oil was not in a one-gallon plastic jug with screw top lid";
a message "Motor oil was mixed with other liquids";
a message other; or
wherein the message is a custom message.

\* \* \* \* \*